US012588736B2

(12) United States Patent
Stockbridge et al.

(10) Patent No.: US 12,588,736 B2
(45) Date of Patent: Mar. 31, 2026

(54) FOAMED SOLE COMPONENTS AND METHOD FOR MAKING A SOLE WITH FOAMED SOLE COMPONENTS

(71) Applicant: Skechers U.S.A., Inc. II, Manhattan Beach, CA (US)

(72) Inventors: Kurt Stockbridge, Palos Verdes Estates, CA (US); Chih Hsiang Hsu, Taoyuan (TW); Anthony Dean, Kennesaw, GA (US)

(73) Assignee: Skechers U.S.A., Inc. II, Manhattan Beach, CA (US)

( * ) Notice: Subject to any disclaimer, the term of this patent is extended or adjusted under 35 U.S.C. 154(b) by 0 days.

(21) Appl. No.: 19/334,858

(22) Filed: Sep. 20, 2025

(65) Prior Publication Data

US 2026/0013596 A1 Jan. 15, 2026

Related U.S. Application Data

(60) Continuation of application No. 18/365,925, filed on Aug. 4, 2023, which is a division of application No.
(Continued)

(51) Int. Cl.
*A43B 13/04* (2006.01)
*A43B 13/18* (2006.01)
(Continued)

(52) U.S. Cl.
CPC ............ *A43B 13/187* (2013.01); *A43B 13/04* (2013.01); *B29C 44/02* (2013.01); *B29D 35/0054* (2013.01); *B29D 35/122* (2013.01);

*B29D 35/142* (2013.01); *C08J 9/122* (2013.01); *B29C 43/02* (2013.01); *B29K 2023/083* (2013.01);
(Continued)

(58) Field of Classification Search
CPC ....... A43B 13/187; A43B 13/04; B29C 44/02; B29C 43/02; B29D 35/0054; B29D 35/122; B29D 35/142; C08J 9/122; C08J 2203/06; C08J 2203/08; C08J 2207/00; C08J 2323/08; C08J 2331/04; B29K 2023/083; B29L 2031/504
See application file for complete search history.

(56) References Cited

U.S. PATENT DOCUMENTS

| | | | | |
|---|---|---|---|---|
| 2004/0080070 | A1* | 4/2004 | Liu | B29C 44/348 264/54 |
| 2005/0183287 | A1* | 8/2005 | Schindler | A43B 13/187 36/29 |

(Continued)

FOREIGN PATENT DOCUMENTS

| | | | | |
|---|---|---|---|---|
| CN | 106750852 | A * | 5/2017 | C08J 9/103 |

*Primary Examiner* — K. B Boyle
(74) *Attorney, Agent, or Firm* — Marshall A. Lerner; Steven J. Kim; Daniel J. Malkin

(57) ABSTRACT

A sole for footwear and a method of manufacturing them comprising at least one polymeric foam expanded through supercritical fluid (SCF). The polymeric foam may have a plurality of holes or cavities introduced into the first surface of the polymer material prior to supercritical fluid expansion, wherein a relative proportion of the plurality of holes or cavities increases with a thickness of the polymer material. A portion of the polymeric foam having at least one hole or cavity may be translucent.

23 Claims, 40 Drawing Sheets

Related U.S. Application Data

16/675,086, filed on Nov. 5, 2019, now Pat. No. 12,458,103.

(60) Provisional application No. 62/728,549, filed on Sep. 7, 2018.

(51) Int. Cl.

| | |
|---|---|
| *B29C 44/02* | (2006.01) |
| *B29D 35/00* | (2010.01) |
| *B29D 35/12* | (2010.01) |
| *B29D 35/14* | (2010.01) |
| *C08J 9/12* | (2006.01) |
| *B29C 43/02* | (2006.01) |
| *B29K 23/00* | (2006.01) |
| *B29L 31/50* | (2006.01) |

(52) U.S. Cl.
CPC ..... *B29L 2031/504* (2013.01); *C08J 2203/06* (2013.01); *C08J 2203/08* (2013.01); *C08J 2207/00* (2013.01); *C08J 2323/08* (2013.01); *C08J 2331/04* (2013.01)

(56) References Cited

U.S. PATENT DOCUMENTS

| | | | | |
|---|---|---|---|---|
| 2013/0276333 | A1* | 10/2013 | Wawrousek | A43B 13/141 |
| | | | | 36/102 |
| 2014/0259329 | A1* | 9/2014 | Watkins | B29C 37/0025 |
| | | | | 264/492 |
| 2016/0345666 | A1* | 12/2016 | Kohatsu | A43B 13/146 |
| 2017/0120484 | A1* | 5/2017 | Farris | B29C 64/182 |
| 2017/0267850 | A1* | 9/2017 | Baghdadi | C08L 23/0815 |

* cited by examiner

*FIG. 3C*
*FIG. 3D*
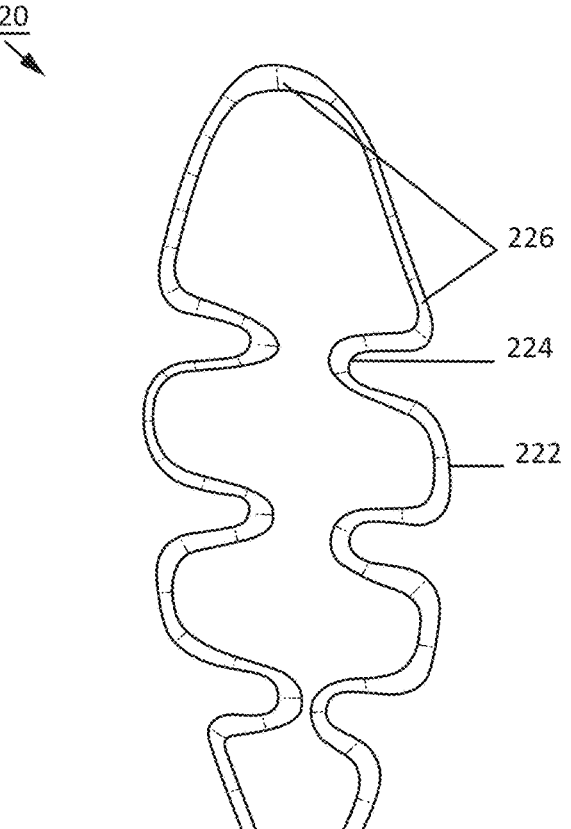
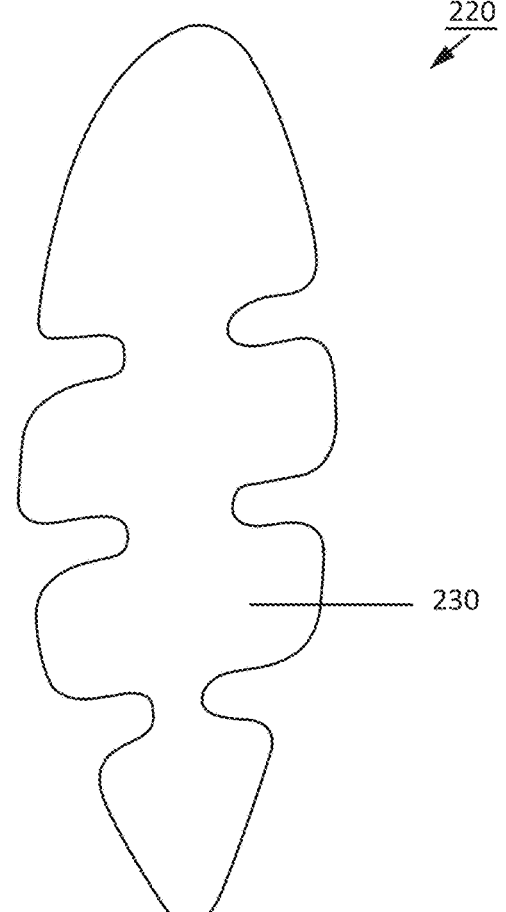

*FIG. 4A*
*FIG. 4B*
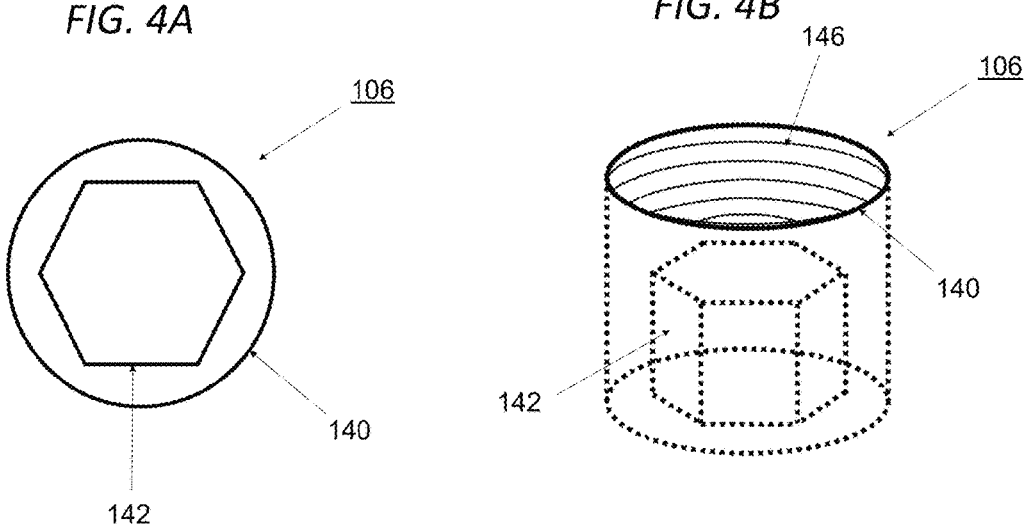
*FIG. 4C*
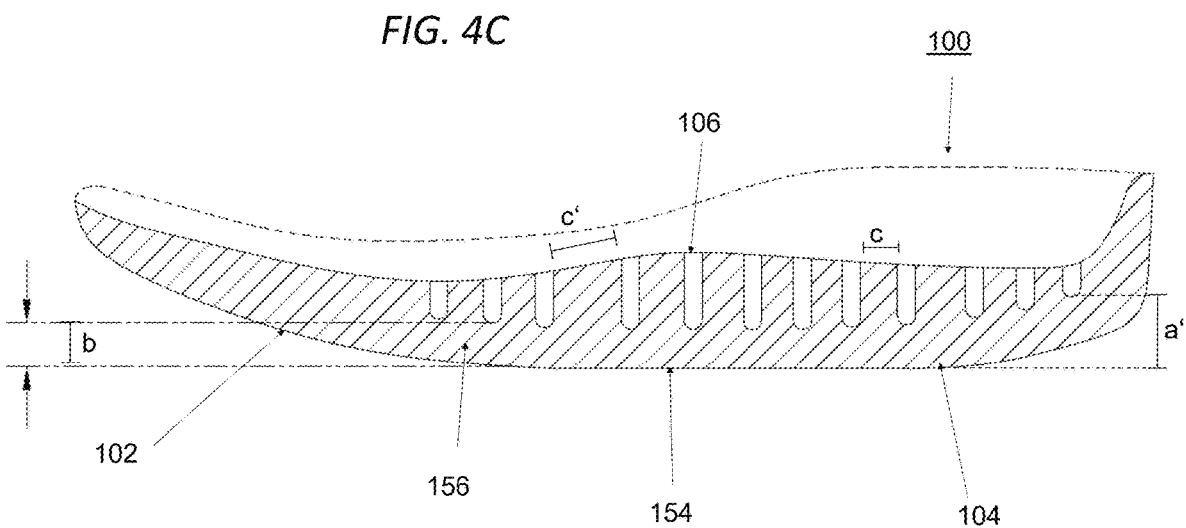

FIG. 13A
FIG. 13B
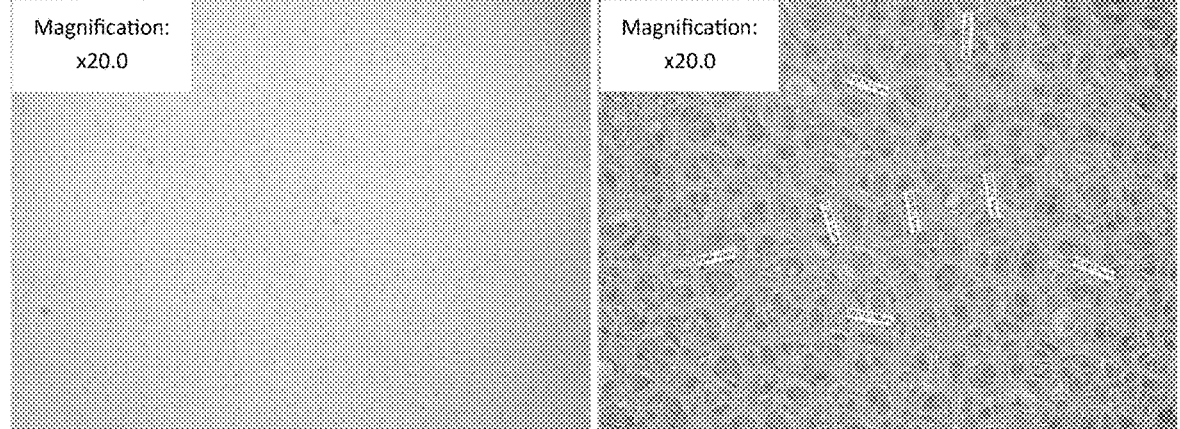
FIG. 13C
FIG. 13D
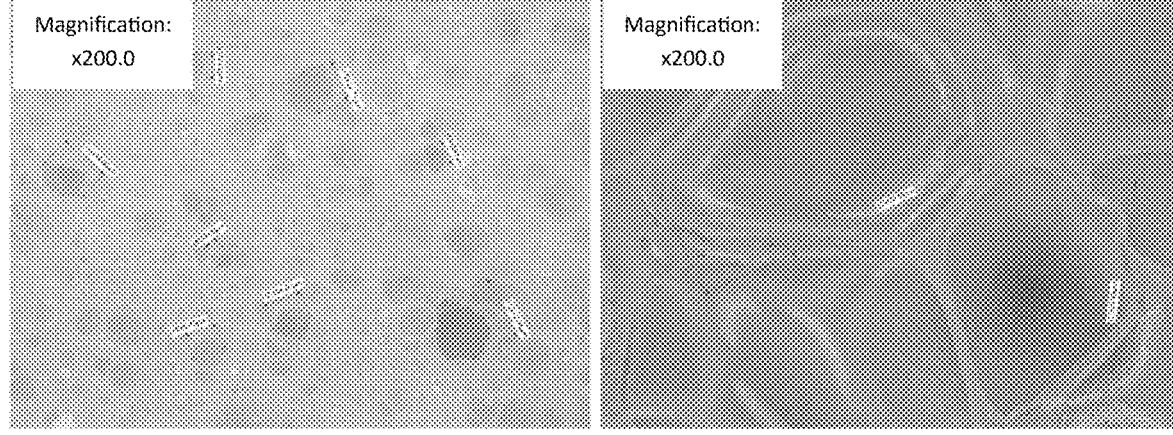

FOAMED SOLE COMPONENTS AND METHOD FOR MAKING A SOLE WITH FOAMED SOLE COMPONENTS

CROSS-REFERENCE TO RELATED APPLICATION

This application is a continuation application of U.S. Nonprovisional application Ser. No. 18,365,925, filed on Aug. 4, 2023, which is a divisional of No. 16/675,086, filed Nov. 5, 2019, which claims the benefit of priority to U.S. Provisional Application No. 62/728,549, filed Sep. 7, 2018, and each of which are hereby incorporated by reference in their entirety.

FIELD OF THE INVENTION

The present invention pertains to an article of footwear, and more particularly, to a foamed component of footwear and methods for making it.

BACKGROUND OF THE INVENTION

Elastomers are natural or synthetic polymers with viscoelastic properties and weak intermolecular forces. Elastomers are usually thermosets, polymers which become irreversibly hardened upon being cured, but may also be thermoplastics, which can generally be re-melted and reshaped. A thermoplastic is a polymer that becomes pliable or moldable above a specific temperature and solidifies upon cooling. Thermoplastics are typically used to produce a variety of products through polymer processing techniques which may include injection molding, compression molding, and extrusion.

Polymer foams, also referred to as foamed, expanded, or sponge plastics, generally consist of a minimum of two phases, a solid polymer matrix, and a gaseous phase derived traditionally from a blowing agent. The solid polymer phase may be inorganic, organic, or organometallic. The solid polymer phase may include more than one solid phase, which can be composed of a polymer blend based on two or more polymers; an interpenetrating polymer network, which can consist of at least two crosslinked polymer networks; or a pseudo interpenetrating polymer network from a combination of at least one or more linear polymers with crosslinked polymers not linked by covalent bonds. Common polymer foams include: ethylene vinyl acetate (EVA) foam, low-density polyethylene (LDPE) foam, nitrile rubber (NBR) foam, polychloroprene foam, polyimide foam, polypropylene (PP) foam, polystyrene (PS) foam, polyurethane (PU) foam, polyethylene foam, polyvinyl chloride (PVC) foam, silicone foam, and microcellular foam.

Polymer foams may be flexible or rigid, which generally depends on whether their glass transition temperature ($T_g$) is below or above room temperature. The $T_g$ depends upon chemical composition, degree of crystallinity, and degree of crosslinking. Polymer foams can be described as either closed cell or open cell foams. In closed cell foams, the foam cells are isolated from each other and cavities are surrounded by complete cell walls. In open cell foams, cells are connected to each other. Cell geometry, size, and shape affect the foam properties.

Polymer foams can be produced in a variety of densities, ranging from approximately 1.6 kg/m³ to over 961 kg/m³. Foam density is generally proportional to its mechanical-strength properties. Common EVA foams used in sole components may have an Asker C hardness of 15 to 80 with densities that range from 0.033 g/cm³ to 0.28 g/cm³. Some of these common EVA foams used in sole components have a resiliency of 40% to 60%.

Polymer foams can be produced by either mechanical, chemical, or physical means. Chemical blowing agents are usually reactive species that decompose and give off a high gas volume in the foaming process. Examples include azodicarbonamide, 5-pheyltetrazole, and triazoles. Physical blowing agents are usually inert gases or low boiling liquids which volatilize during the foaming process. Examples of inert gases used include argon, nitrogen, and carbon dioxide. Examples of low boiling liquids include alkanes (butanes and pentanes) and compounds containing chlorine and/or fluorine. Additives may be added to promote nucleation for a blowing agent, and/or a more uniform pore/cell size distribution. Traditional methods involving the use of blowing agents may be incorporated into an Injection Phylon process.

The use of supercritical fluid (SCF), especially compounds that do not participate in atmospheric photochemistry, as a physical blowing agent has several advantages. One advantage of using such SCFs lacking photochemical reactivity, as compared to using volatile organic compounds (VOCs) and ozone depleting substances (ODSs), includes reduced harm to the environment. SCFs also provide more cost effective and safer alternatives from other foaming or extracting agents. The use of SCFs in foaming processes has been known to improve impact strength and toughness of the resulting foam products. The resulting foam product may also have improved surface appearance, a low dielectric constant, improved thermal insulation, and greater mechanical properties. Such foams may provide for both savings on material and weight reduction. SCFs also have a higher diffusion rate than traditional blowing agents.

SCF foamed materials have recently been used in the production of footwear and footwear components. The publication CN 109385058 describes a method of preparing a "moldless" three-dimensional foaming system involving forming an unfoamed plastic part, and then placing the plastic part into a pressurized "tank" wherein supercritical fluid is introduced into the tank absorbed into the plastic part. Upon release of the pressure, the plastic part is foamed to an expanded product size and approximated physical properties.

However, the prior art has not appreciated that three-dimensional foaming materials having a greater pre-expanded size or thickness using SCF expansion which can result in varied curing and non-uniform expansion of cells within the material. Such a phenomenon may result in a sole component that has varying degrees of hardness, density, resilience, and bonding to other components which may be desired in some embodiments, but detrimental to others. The prior art has also failed to appreciate the benefits of conducting post compression molding to further modify such physical properties. Furthermore, the prior art has not appreciated the use incorporating a three-dimensional SCF foamed material with other sole components to produce a composite sole used for specific types of footwear.

Given the above, the present disclosure provides a novel method and product for preparing a SCF foamed structure that solves one or more of the existing problems in the art.

BRIEF SUMMARY OF THE INVENTION

The present invention is a shoe sole, and more particularly a foamed sole or foamed component of a sole. Disclosed are a method and a product for making a foamed sole or foamed component from a pre-expanded polymer material with or without apertures through a three-dimensional SCF expansion of the pre-expanded polymer material, and for fusing an SCF-expanded polymer material thereof to other components including other SCF-expanded polymer materials.

BRIEF DESCRIPTION OF THE DRAWINGS

By way of example only, selected embodiments and aspects of the present invention are described below. Each description refers to a figure ("FIG.") which shows the described matter. Some figures shown in drawings or photographs that accompany this specification may be for footwear that is for either the left or right foot. Each figure includes one or more identifiers for one or more part(s) or elements(s) of the invention.

Various embodiments are described with reference to the drawings, in which:

FIG. 2C is a perspective view of the pre-expanded sole of FIG. 2A.

FIG. 2D is a top view of the embodiment of FIG. 2C.

FIG. 2E is a bottom view of the embodiment of FIG. 2C.

FIG. 3C is a top view of a customized shape die-cut from an expanded polymer material.

FIG. 3D is a bottom view of the customized shape die-cut from expanded polymer material shown in FIG. 3C.

FIG. 4A is a top plan view of a drawing of an aperture used in the midsole or shoe component.

FIG. 4B is a top perspective view of a drawing of an aperture used in the midsole or shoe component.

FIG. 4C is a side view of a drawing of a longitudinal cross-section of a sole component

Figure 7E:
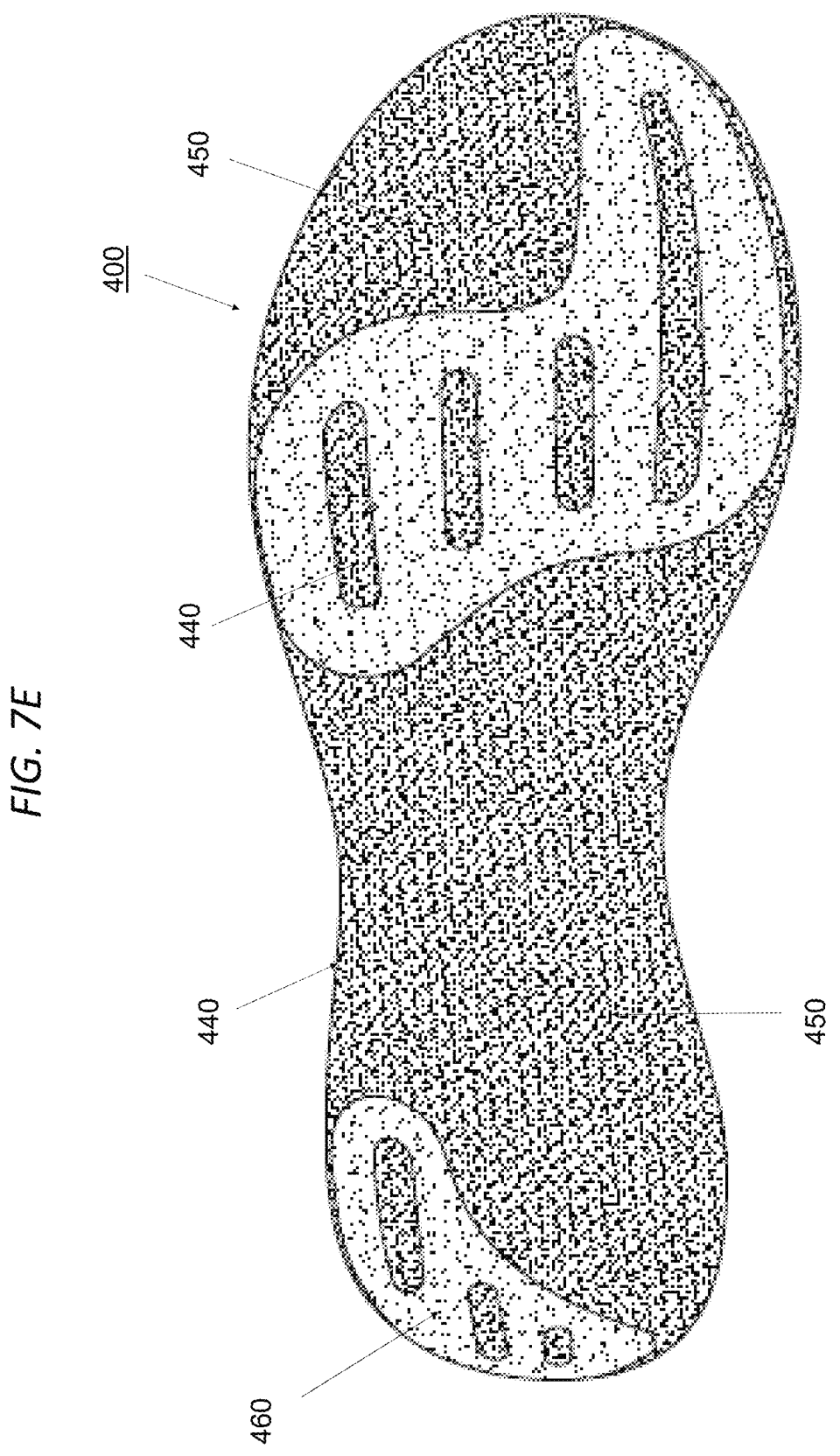

FIG. 7E is a bottom view of the bottom layer of the composite sole of FIG. 7A.

Figure 8D:
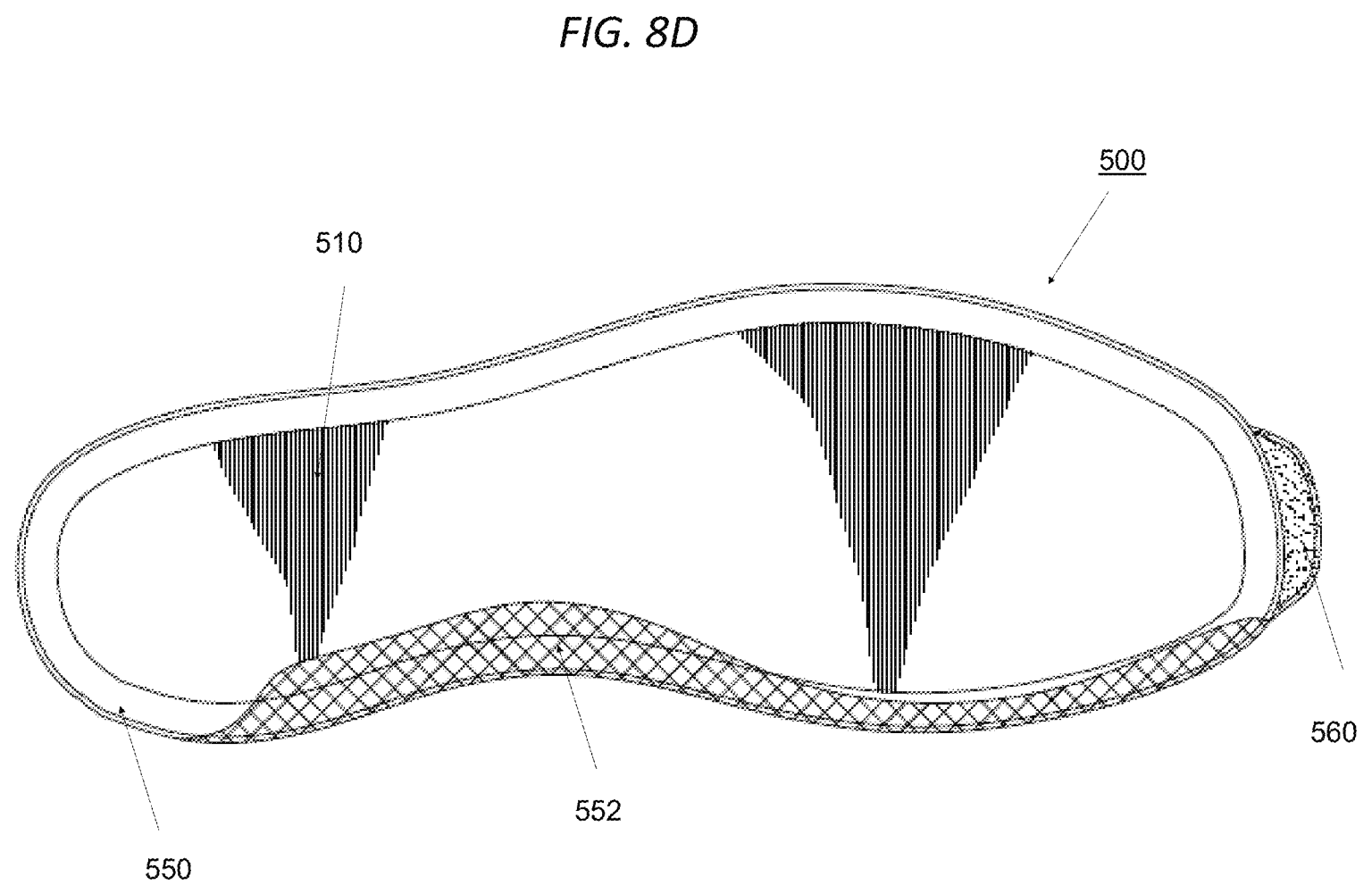

FIG. 8D is a top view of the composite sole of FIG. 8A.

Figure 11C:
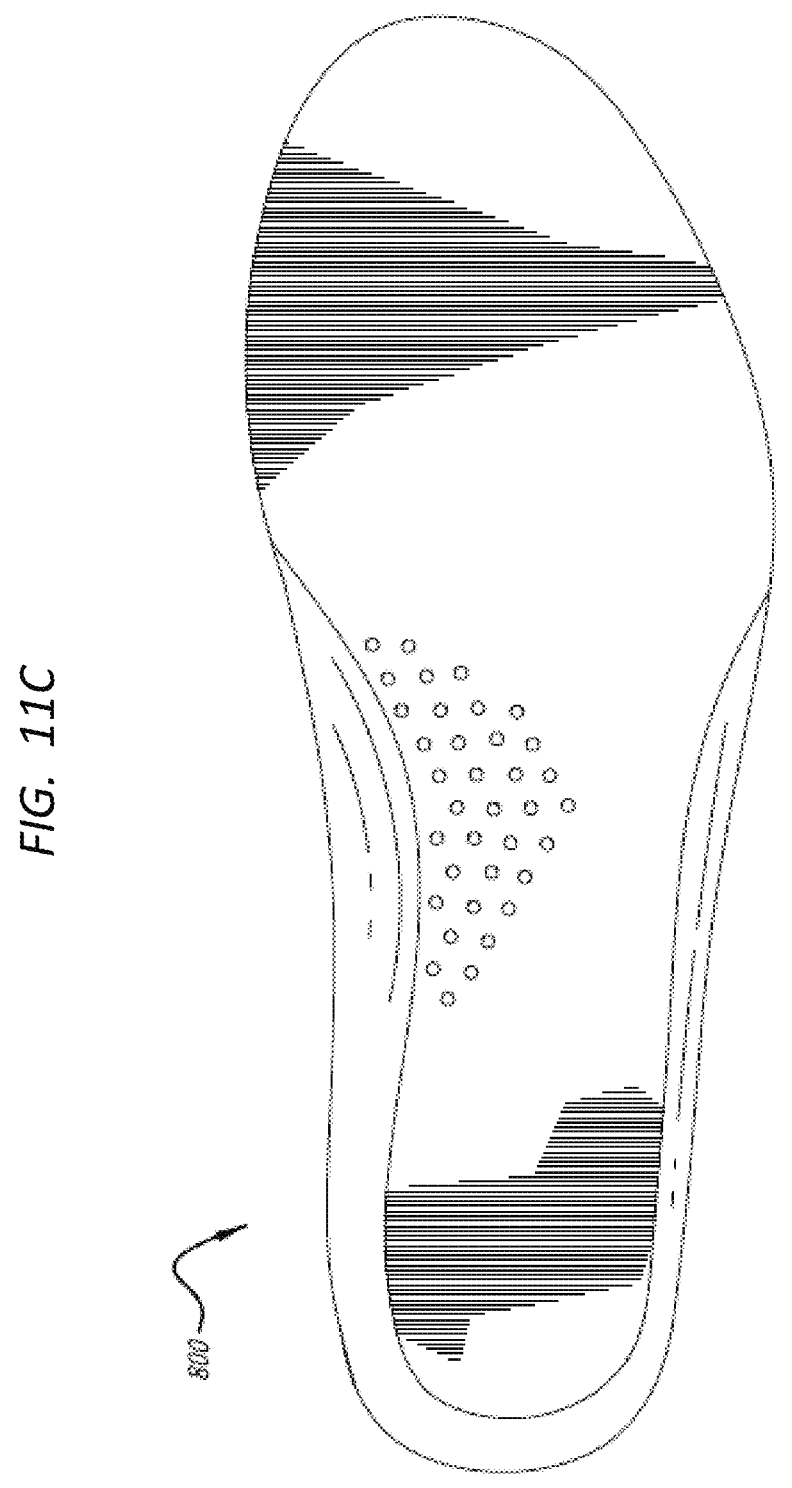

FIG. 11C is a bottom view of the embodiment of 11A.

Figure 12A:
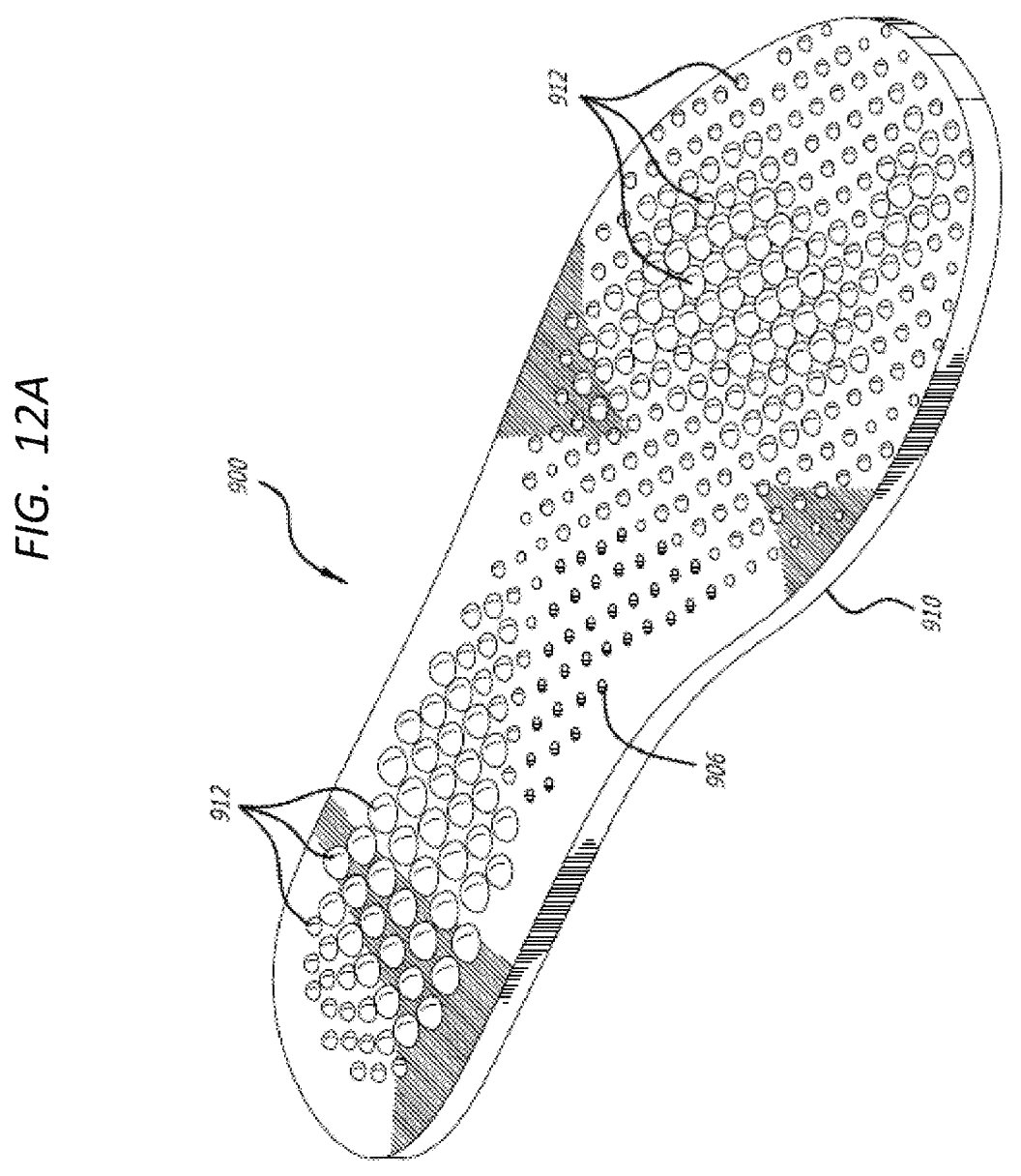

FIG. 12A is a top perspective view of an insole.

FIG. 13A is a photograph taken under a microscope at ×20.0 magnification of a chemically expanded EVA.

FIG. 13B is a photograph taken under a microscope at ×20.0 magnification of a polymer material expanded under an exemplary process.

FIG. 13C is a photograph taken under a microscope at ×200.0 magnification of a chemically expanded EVA.

FIG. 13D is a photograph taken under a microscope at ×200.0 magnification of a polymer material expanded under an exemplary process.

DETAILED DESCRIPTION OF THE INVENTION

Figure 1:
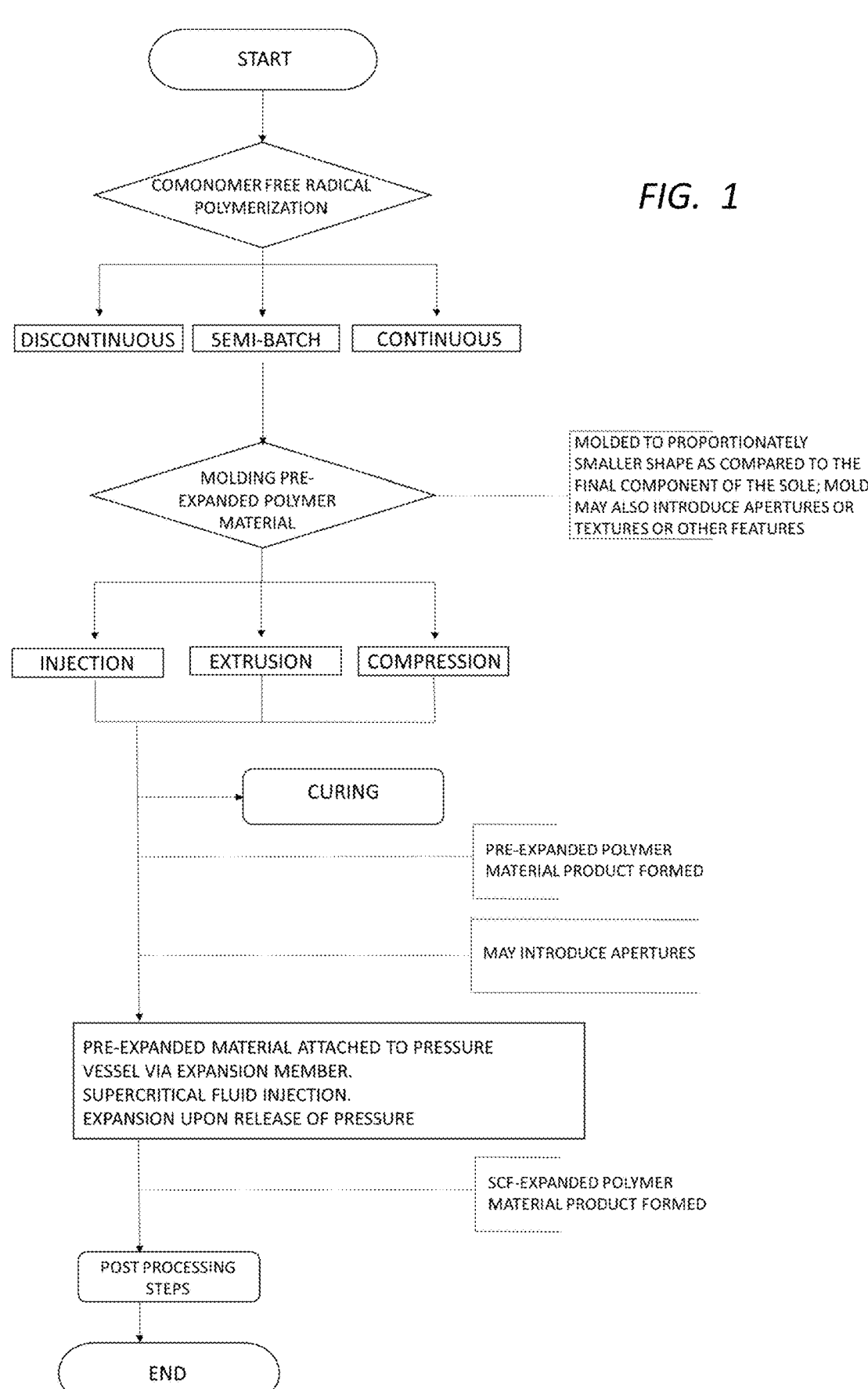
FIG. 1 is a flow chart of an exemplary process of manufacture.

Ethylene Vinyl Acetate. Ethylene vinyl acetate (EVA) or polymeric ethylene vinyl acetate elastomer (EVM or ASTM designation AEM) is produced by high pressure, high temperature, free radical polymerization of ethylene and vinyl acetate monomers. The reaction may be carried out in any ratio of comonomers and the distribution of the comonomers along the polymer chain is random. Other monomers may be copolymerized with ethylene and vinyl acetate such as $\alpha$-Olefins, unsaturated acids, nitriles, and amides. Other monomers may also include propene, isobutene, 1-Octene, acrylic acid, methacrylic acid, crotonic acid, maleic acid, itaconic acid, acrylonitrile, N-methylol acrylamide, acrylamide, ethylene sulfonic acid, allyl sulfonic acid, versatic acid vinyl esters, vinyl ethers, N-vinylpyrrolidone, vinyl chloride, and vinylidene chloride. The term "EVA based materials" may refer to any copolymer and/or other polymer blends that includes EVA.

Common industrial methods of free radical polymerization include solution polymerization, suspension polymerization, emulsion polymerization, or bulk polymerization. Other methods of radical polymerization include template polymerization, plasma polymerization, and sonication. In bulk polymerization, the reaction mixture generally includes an initiator, monomer, and no solvent. In solution polymerization, the reaction mixture generally includes an initiator, monomer, and solvent. In suspension polymerization, the reaction mixture generally includes an aqueous phase, a water-insoluble monomer, and an initiator soluble in the monomer droplets. In emulsion polymerization, the reaction mixture generally includes an aqueous phase, a water-insoluble monomer, an initiator soluble in the aqueous phase, and an emulsifying agent. Further auxiliaries such as chain transfer agents, buffers, acids, bases, anti-aging agents, biocides, and other additives known in the art may also be added to the reaction mixture.

Free radical polymerization forms polymers by successive addition of free radical building blocks. The versatility of this polymerization method is mainly due to the relatively non-specific nature of free radical chemical interactions. Free radical initiators may include azo compounds or peroxides. The choice of polymerization initiator depends mainly on its solubility and its decomposition temperature. Radicals may be generated by thermal or ambient redox conditions. Initiator decomposition rates may vary with pH and the presence of amines. Commonly used initiators include 2,2'-azobisisobutyronitrile (AIBN), or benzoyl peroxide (BPO). These molecules have a strong tendency to split, and thus the pair of electrons in the broken bond will separate. These initiating free radicals then react with the carbon-carbon double bond in the monomer unit, thereby creating a growing polymer chain. For EVA polymerization, 2,2'-Azobis(4-methoxy-2,4-dimethyl valeronitrile) may be used as an initiator.

If the polymerization is performed in an organic solvent, the initiator should be soluble in that solvent and the initiator's decomposition temperature must be at or below the boiling point of the solvent. Commonly, 2,2'-Azobis(2-methylpropionitrile) and BPO suit these requirements. For emulsion polymerization or polymerization in an aqueous system, a water soluble initiator, such as potassium persulfate, or an organic water soluble initiator, such as 4,4'-Azobis(4-cyanovaleric acid), may be used.

Stopping the polymerization reaction may involve the use of a polymerization inhibitor. After the inhibitor is added to the reaction, the untreated ethylene gas may be evaporated and removed from the solution. Further, unreacted vinyl acetate may be extracted from the copolymer solution. Eventually, methanol may also be recovered by precipitation with a water-containing separating and purifying solution.

Generally, there are three types of chemical polymerization processes, categorized by the method in which reactants are added to the reaction vessel: batch, also known as a discontinuous process, semi-batch process, and continuous process. The polymerization temperature of EVA and some EVA based materials are in the range of 50-80° C. The ethene pressure is 2-8 MPa. In the case of a continuous polymerization process, the average residence time should be in the range of 3-4 hours.

In a batch process, reactants are added to the reaction vessel prior to the start of the polymerization. No material is added or removed from the reaction vessel during operation. In a batch process, there is less control over the polymerization if there is more than one type of monomer because the relative consumption rates of the different monomers are governed by their respective reactivities, which may result in broad copolymer composition distributions and an inhomogeneous product. In a batch process, molecular weight distribution drift is a common phenomenon and may lead to very broad distributions in the final product because the reactant concentrations change throughout the polymerization.

A semi-batch process is similar to a batch process, except that the reactants can be added, and the products can be removed during the polymerization. Reactants may be added after the polymerization is initiated to control for a desired property, such as molecular weight distribution or copolymer composition distribution, or reaction rate. Copolymer composition drift may be reduced by maintaining a near constant concentration ratio of the respective monomers in the reaction vessel. The semi-batch process is commonly used in emulsion polymerization.

In a continuous process, all the reactants are fed continuously to the process, and unconsumed reactants and products are removed continuously. The process may take place in a single reaction vessel or in a series of reaction vessels in which the monomer conversion is gradually increased. Most continuous processes are operated at steady state conditions, meaning all reactant concentrations and process conditions, such as temperature and pressure, are time-invariant. There is no molecular weight distribution drift because the reactant concentrations are constant.

Polyolefins. Further to the use of EVA, other polyolefins may be used instead of or in combination with EVA. Polyolefins are formed by the polymerization of olefin monomer units such as ethylene, butene, octene, hexane, or propylene. Commercial polyolefins may be produced by catalyzed polymerization such as Zieglar-Natta catalyst or metallocene catalyst. Common thermoplastic polyolefins include polyethylene (PE), polypropylene (PP), polymethylpentene (PMP), and polybutene-1 (PB-1). Polyolefin elastomers (POEs) may be formed by the polymerization of ethylene in conjunction with a comonomer such as butene or octene. Common POEs include EVA, polyisobutylene (PIB), ethylene propylene rubber (EPR), ethylene propylene diene monomer (EPDM) rubber. Commercial POEs emerged with recent advances in metallocene polymerization catalysts. Metallocene catalysts have a constrained transition metal, such as titanium, zirconium, or hafnium, sandwiched between one or more cyclopentadienyl ring structures to form a sterically hindered polymerization site. Metallocene catalysts provide a single polymerization site instead of multiple sites of conventional catalysts. Metallocene catalysts allow the capability to tailor the molecular architecture of ethylene copolymers.

TPE. Thermoplastic elastomers (TPE) are soft and flexible like thermoset rubber and are melt-processable and re-processable like thermoplastics. Generally, TPEs are polymers, polymer blends, or compounds, which above their melt temperatures exhibit thermoplastic character. Generic classes of commercial TPEs include: thermoplastic vulcanizers (TPV), styrene block copolymers (SBC), polyolefin blends (TPO), elastomeric alloys (TPV), thermoplastic polyurethane (TPU), thermoplastic copolyester (COPE), and thermoplastic polyamide (PEPA).

Plastic Additives. Various additives may be added to polymers. Accelerators, also called promoters, speed up the chemical reaction or the curing of the polymers into the final plastic. Antifoaming agents, also called defoamers, stop foaming during processing. Foaming can cause processing problems and weak spots in the final product. Antidegradants slow deterioration due to oxidation, ozone, or light.

Antidegradants include antioxidants, antiozonants, and UV stabilizers. Blowing agents, also called chemical foaming agents, are used to release gas into the plastic or resin. Flame retardants may be used to inhibit flammability of the finished product. Dyes and colorant may be used for aesthetic purposes or to alter physical properties of the product, such as to repel light.

Stearates. Stearic acid and its metallic salts are used for many different applications depending on the polymer system. Stearates may be used to act as lubricants, acid scavengers, anti-tack compounds, vulcanization promoters/accelerators, or mold release agents.

Crosslinkers. Crosslinkers may be used to stabilize bubbles during foam expansion, enhance the resistance of the cellular product to thermal collapse, and improve the mechanical properties (such as, but not limited to, anti-creep ability, weatherability, impact absorption) of the final foamed product. Polyolefins may be crosslinked by peroxide, irradiation, or silane crosslinking methods. Common peroxides such as dicumyl peroxide (DCP) or di-t-butyl peroxide are used to cross-link polyolefins. DCP is commonly used to crosslink low density polyethene (LDPE), ethylene propylene rubber (EPR), ethylene-prylene-diene rubber (EPDM), and polar ethylene copolymers like EVA, ethylene-methyl acrylate (EMA), ethylene-ethyl acrylate (EEA), and ethylene-butyl acrylate (EBA).

Plasticizers. Plasticizers may be added to improve processing behavior and or increase polymer flexibility and softness. Plasticizers may reduce polymer melt viscosity. Plasticizers are usually organic non-volatile liquids, such as esters, with high boiling points. Other plasticizers include adipates, azelates, stearates, chlorinated hydrocarbons, phosphates, phthalates, and sebacates.

Stabilizers. Stabilizers are additives added to polymeric material to inhibit or retard their degradation. Various degradation processes include oxidation, UV-damage, thermal degradation, ozonolysis, and photo-oxidation. This may lead to chain scission, which may affect the polymer's mechanical properties such as strength, malleability, appearance, and color.

Antioxidants. Antioxidants may be used as a stabilizer which inhibits autoxidation when the polymer reacts with atmospheric oxygen. Oxidation of the final product may cause discoloration, scratching, and loss of product strength, flexibility, stiffness, or gloss. Common antioxidants include: organophosphites, sterically hindered phenols, amines, and thioesters.

Polymer blends are macroscopically homogenous mixtures of two or more polymeric species. The blends may be either compatible or incompatible. Most polymer blends are incompatible. Polymer blends can be broadly divided into three categories: miscible, compatible, and immiscible. A miscible polymer blend can form a single phase over certain ranges of temperature, pressure, and composition. Also, blends may be formulated to be thermodynamically stable or metastable and exhibit a single $T_g$ or optical clarity. Such properties of the polymer blend may be modified based generally by the proportional ratio of the two polymers in the blend. In the alternate, the polymer blend may exhibit macroscopically uniform physical properties wherein the heterogenous immiscible polymers are considered compatible. The macroscopically uniform properties are usually caused by sufficiently strong interactions between the component polymers. In the case of two polymers, two glass transition temperatures may be observed.

Formation of Pre-Expanded Polymer Material for a Sole Component

Polymer compounding is the mixing of a polymer with either other polymers, supplementary agents or additives such as plasticizers, stabilizers, antistatic agents, colorants, antioxidants, initiators, flame retardants, biocides, and/or other additives that impart certain specific properties to the final product. The polymer compound may be in the shape of pellets, beads, or particles. The pellets, beads, or particles may have a regular or irregular shape with or without uniform widths or diameters along an axis. The overall shape may have imperfections and irregularities, such as bumps, dents, imperfectly aligned edges, corners, or sides.

One exemplary compound may be an EVA based material which may include 60% by weight EVA and 20% by weight of one or more types of POEs such as an ethylene butene copolymer. The EVA may have a melt index (also called a melt flow index or melt flow rate) from approximately 0.5 grams/10 min. to approximately 150 grams/10 min. (190° C., 2.16 kg) as measured using ASTM D1238 procedure. Nonlimiting examples of suitable commercially available EVA may include Ateva® from Celanese and Elvax® from DuPont. Other components may include an elastomer, preferably ethylene propylene diene monomer (EPDM) rubber. Further components may include a thermoplastic elastomer, preferably styrene ethylene butylene styrene (SEBS). The remaining composition may include crosslinkers, initiators, plasticizers, and/or pigments.

EVA based materials may contain a vinyl acetate content of at least 10%, preferably from 15% to 30% by weight. EPDM may contain an ethylene content of at least 45%, preferably from 60% to 85% by weight. The EVA particles and other polymer particles such as POE may be compounded into pellets, beads, particles, or other pieces through a mixer machine. Compounding conditions may be performed at a temperature of 110° C. and a pressure of 8 bar.

In a preferred embodiment, the EVA content may range from 40 to 60 phr. The EVA content may be formed by adding a blend of various EVA based beads that vary in its original percentages of vinyl acetate. The EVA based material may be prepared by bulk polymerization. The reaction process may be a batch process. POE may further be combined from 20 to 30 phr. Other remaining components may include EPDM, SEBS, crosslinkers, initiators, and plasticizers.

Once the compounded particles are formed, the particles are processed into a mold to form the pre-expanded polymer material. Plastic molding processes include injection molding and compression molding.

Injection molding involves melting the polymer or polymer compound pellets, beads, or particles followed by injecting it under pressure into a mold cavity, wherein the plastics are thermally crosslinked or solidified by cooling. The polymer or polymer compound is introduced into the injection unit via a hopper. The injection unit heats and melts the plastic. The hot melt is injected under pressure through a runner system into a cavity of the mold, also called a die. Towards the end of the filling stage, the pressure is increased because of the increasing length of the flow path. The pressure is then held to reduce volume loss due to cooling of the melt which also helps avoid marks and voids in the molding. The molding is then cooled for stable ejection. Mold release agents may be applied to the mold surface to prevent mold sticking. Nonlimiting examples of suitable mold release agents include zinc stearate or polytetrafluoroethylene (PTFE) spray. Release agents with silicone should be avoided because they may cause mold stress cracking.

Injection molding may cover a wide range of melt indexes from approximately 2 to 45 g/10 min. (190° C., 2.16 kg). An upper molding condition limit of 230° C. is preferably observed. Mold coolant temperatures are usually from approximately 15 to 40° C. Injection pressures of 35 to 100 MPa (5,000 to 15,000 psi) are generally used. Nonlimiting examples of suitable commercially available EVA based materials suitable for injection molding include Ateva® 1030, 1070, 1075A, 1231, 1608, 1820, 2020, 2604A, and 2810A from Celanese.

One exemplary injection mold process includes injecting the compounded polymer material between 150 to 200° C. The duration of the process may be approximately 300 to 600 seconds. This process may also include the use of a variety of plastic particles such as adding varying densities and/or pre-dyed plastic particles of different colors. The particles may be injected at different intervals which may correspond to different portions of the polymer material.

Figure 2A:
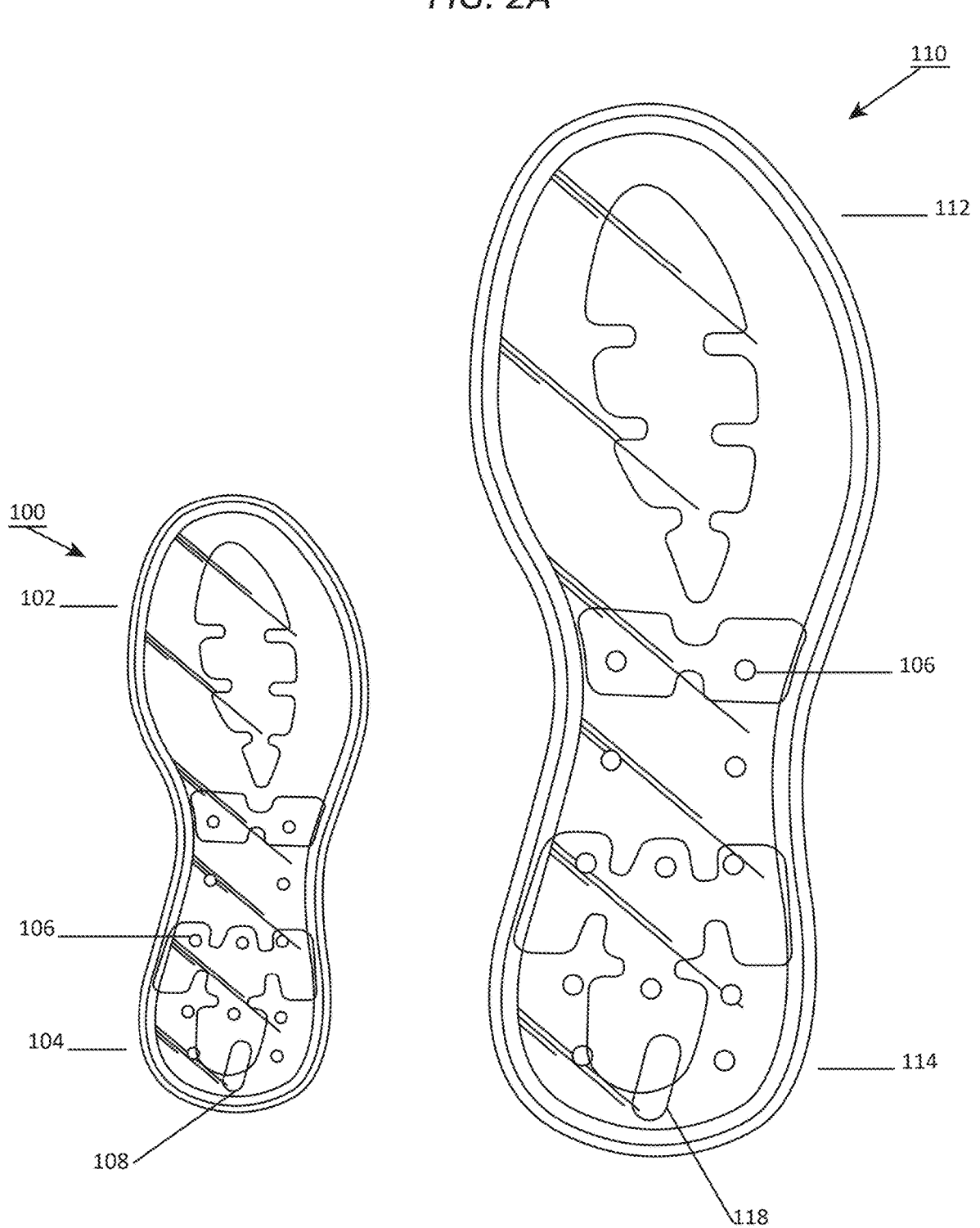
FIG. 2A is a top view of a pre-expanded sole (left) and a top view of an expanded sole (right).

A pre-expanded polymer material may be molded to shape that has proportionately smaller dimensions to a final component of the sole or the final entire sole. In the exemplary embodiment where the pre-expanded polymer material forms the entire sole, the pre-expanded polymer material is shown in FIG. 2A (left) and FIG. 2C-2E as pre-expanded sole 100 which is molded to have the same shape, but smaller dimensions to the final expanded version as shown in FIG. 2A (right). The sole may have portions of varying thickness. The pre-expanded sole 100 has a forefoot portion 102 of the sole being less thick than the heel portion 104. Thickness may range from 15 mm at the forefoot portion to 20 mm at the heel portion. The pre-expanded sole or portion(s) of the pre-expanded sole may be configured for any type of shape and for any type of shoe style. Shoe styles may include, but are not limited to, sneakers, high-top sneakers, running shoes, slip-ons, moccasins, flats, clogs, boat shoes, oxfords, penny loafers, saddle shoes, monk straps, wing tips, skimmers, huaraches, and Mary Jane shoes. Sandal styles may include, but are not limited to, sling-backs, slides, flip-flops, and fisherman sandals. Boot styles may include, but are not limited to, Chelsea boots, harness boots, engineer boots, demi boots, and chukka boots.

The polymer material may have cavities, pockets, and/or openings that may traverse a portion or any length of a dimension of the polymer material. The polymer material may have one or more hollow spaces or cavities such as an interior channel, a chamber, a bladder, and/or a skeleton matrix composed of support walls. In one embodiment, the hollow space may house added components. Such added components may include the addition of a lighting system which may include a power source, integrated circuits, wires, light sources, and/or fiber optics. The hollow space may also house one or more fluid filled bladders, or other cushioning materials such as other foamed materials, including an SCF-expanded component of varying resiliency, or spring elements. Other housed materials may include rigid structural supports which may include shanks, plates, or denser polymer materials than an SCF expanded material.

The mold may be designed to impart textures to the pre-expanded polymer material at any portion of the sole. Exemplary textures include any lines, designs, shapes, or patterns. One exemplary texture may include deep patterned indentations to form lugs or outsole protrusions. Another exemplary texture includes a plurality of recessed studs.

Another exemplary texture includes a plurality of apertures or holes. Textures may be added to the outsole bottom, outsole periphery, midsole, and internal regions where the polymer material may be used as a part of the outsole and midsole.

Figure 2B:
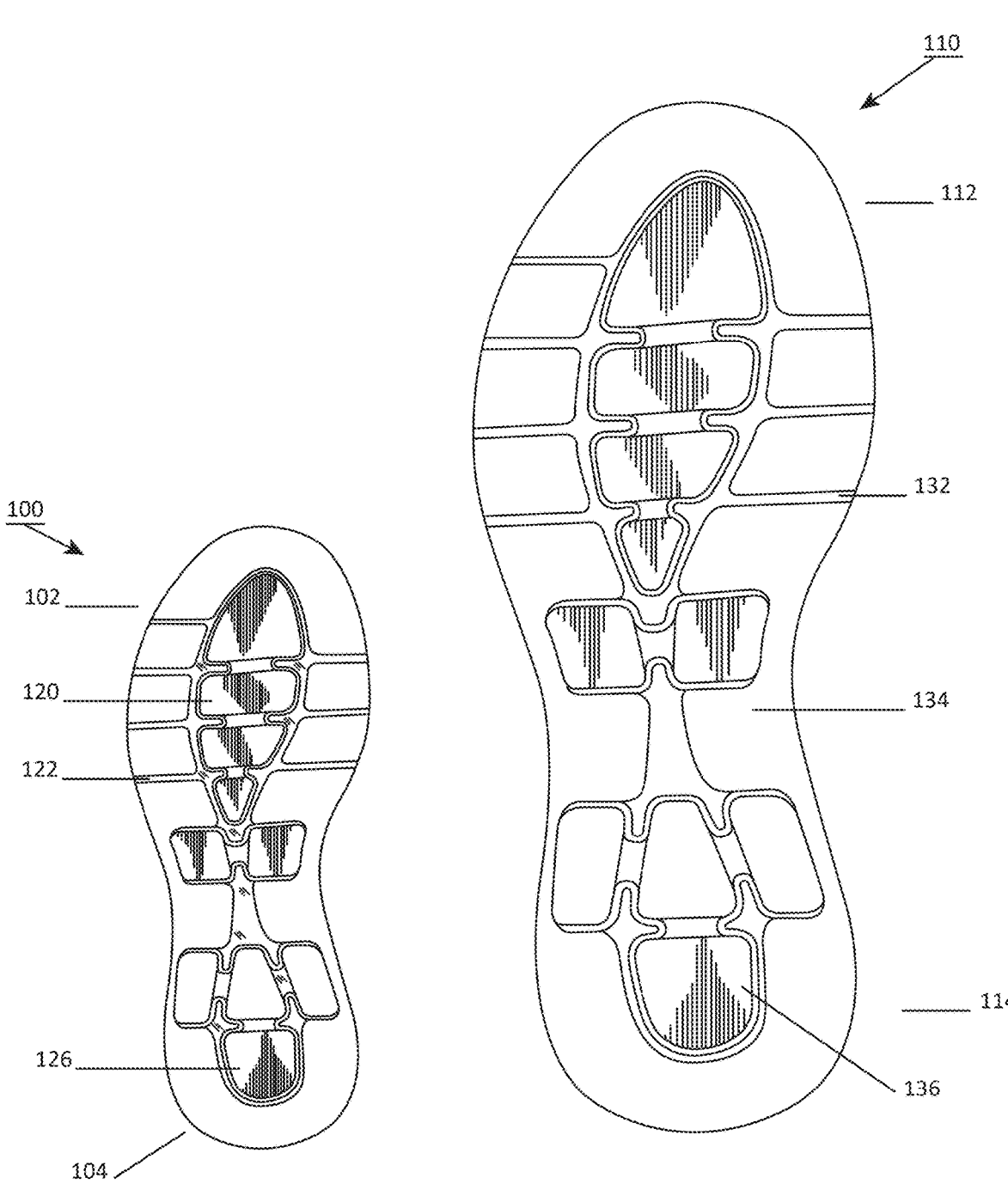
FIG. 2B is a bottom view of a pre-expanded sole (left) and a bottom view of an expanded sole (right).

In one exemplary embodiment, the mold may be designed to impart texture or ornamentation to the bottom of the pre-expanded polymer material, as exemplified in a sole composed entirely of the polymer material, FIG. 2B (left), sole 100. The pre-expanded sole 100 includes a forefoot portion 102 and a heel portion 104. The pre-expanded sole 100 may be textured to include treads 120, deeper grooves 122 or sipes, and ornamental features including graphics and logos 126.

The mold may be designed to impart textures or ornamental features to the periphery of the pre-expanded polymer material. A side wall of the pre-expanded sole may be textured to include indentations and protrusions. The side of the pre-expanded sole may also include a rectangular protrusion. Such ornamentation may also include graphics and logos.

Figure 3A:
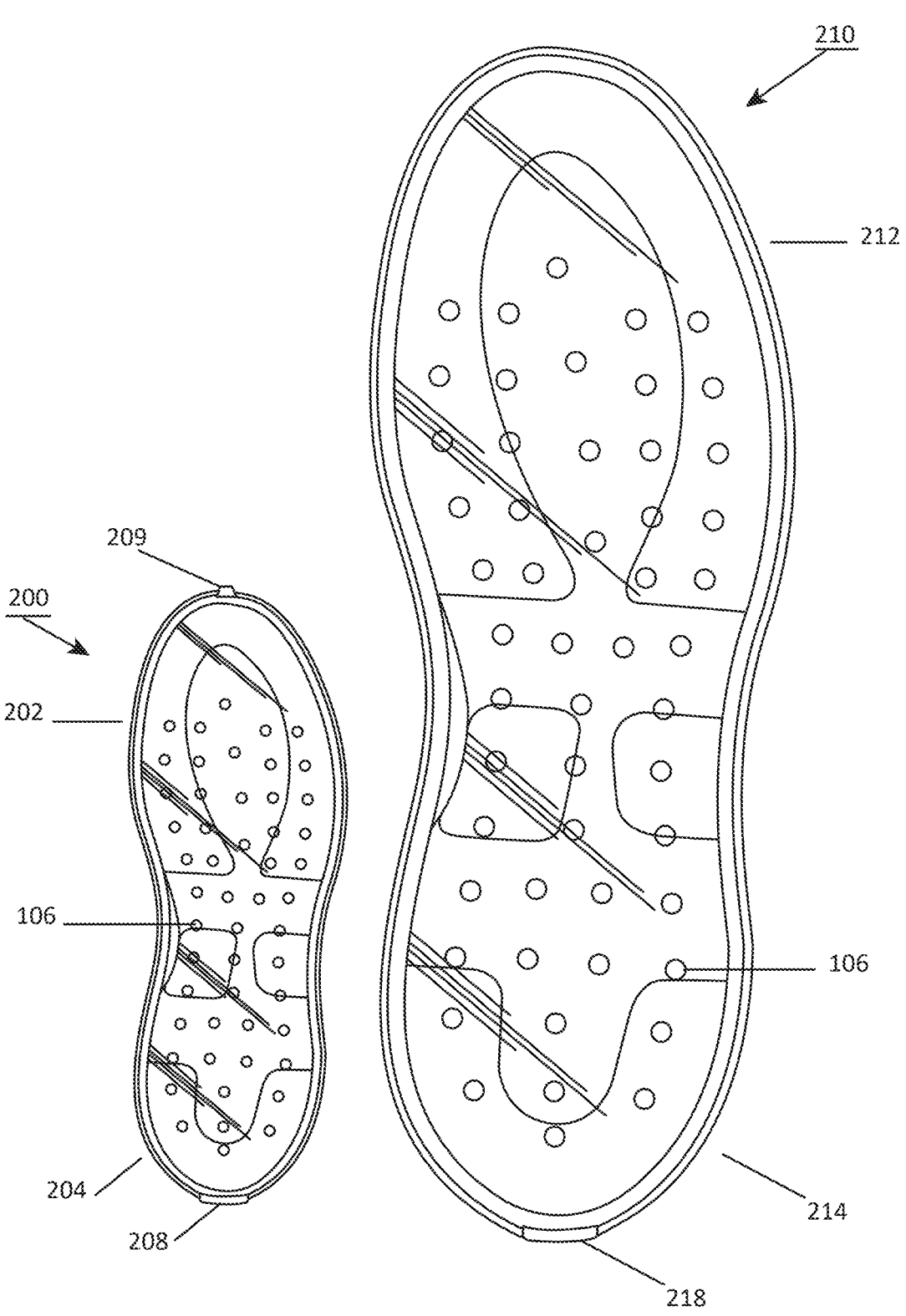
FIG. 3A is a top view of a pre-expanded sole component (left) and a top view of an expanded midsole component (right).

The mold may be designed to impart processing elements to the polymer material, which may be removed after processing. An example of a processing element is shown in FIG. 2A (left) and FIG. 2C-2E, where the processing element is an added expansion member 108 within the heel portion 104 of the pre-expanded sole 100. In another example, as shown in FIG. 3A (left), an expansion member 208 may be the excess polymer material that is formed on the pre-expanded component 200 where the excess polymer material 208, 209 may be associated with polymer material accumulated at the injection port of a mold or a venting port of a mold.

In an example process, the expansion member may serve to allow for the removal of the pre-expanded sole from the mold. The expansion member may also serve to secure the pre-expanded sole during further processing steps such as during SCF expansion. After the polymer material has been foamed via SCF expansion, the expansion member may be removed or retained for additional processing steps such as but not limited to post compression molding steps.

Addition of Apertures to the Pre-Expanded Sole

Another example of a processing element is an aperture 106, such as a hole or cavity, within the pre-expanded sole as depicted in the example embodiment of FIG. 2A. Apertures 106 may be formed either during the molding process of the pre-expanded polymer material or after the molding process of the pre-expanded polymer material. The introduction of an aperture 106 during the formation of the pre-expanded sole 100 enhances the curing of the pre-expanded sole, especially in portions of the sole having a greater thickness or dimension such as in the heel portion 104. Benefits of including apertures in the formation of the pre-expanded polymer material or after the formation of the pre-expanded polymer material may include optimized curing time, enhanced heat penetration and distribution, efficient or desired degree of crosslinking, uniform SCF diffusivity, uniform SCF expansion of the various regions of the pre-expanded polymer material, flexibility, reduction of weight, and desired weight distribution.

Apertures may be created by protrusions in the surface of the mold cavity plate or through the removal of at least a portion of the polymer material to define the dimensions of the aperture 106. The dimensions of the aperture 106 may form a void or any shapes or a combination of shapes such as a cylinder 140 in the upper portion and a hexagonal prism 142 in the lower portion as shown in FIG. 4A and FIG. 4B. The aperture 106 may include remaining inner material such as but not limited to a hexagonal prism 142.

The inner walls of the aperture may be textured. One example of a textured aperture is shown in FIG. 4B, where the inside of the aperture 106 may have indented or inverted striations 146. Apertures or hollow spaces in the polymer material may have any grooved patterns.

In one exemplary process, a plurality of apertures may be added to the pre-expanded polymer material. The plurality of apertures may be configured in any pattern. A larger proportion of apertures may be added in locations of greater thickness or width of the polymer material relative to other portions of the polymer material. In one preferred exemplary process using an EVA based material, a plurality of apertures 106 may be included in the formation or drilled in after the formation when the material has a thickness of 5 mm or more as represented in line a of FIG. 4C. Generally, an aperture may be incorporated into a pre-expanded polymer material having an area of at least 12 mm$^2$ and a thickness of 5 mm or more. In some exemplary sole, such regions include portions of the midfoot portion 154 and heel portion 104. After SCF expansion, such regions may have a thickness of 8-10 mm or more. An aperture 106 may be cylindrical and have a diameter of 1 to 1.5 mm or a surface area of the aperture 106 opening of approximately 0.7 to 1.8 mm$^2$ in the pre-expanded sole. The void formed by the apertures 106 may be of any shape including cuboidal, conical, pyramidal, or cylindrical with a concave bottom. The openings of the apertures may also be selected based on ornamental properties which may include star shapes or hexagons. The location of the apertures may be in any region of the polymer material including the top surface and bottom surface of the polymer material. The dimensions of an aperture and number of apertures may also vary depending on the polymeric composition, e.g. EVA, PEBA, or TPU, of the soles.

The depth of the aperture may extend from one surface of the polymer material to the opposite surface of the polymer material. In some preferred embodiments, the depth of the aperture 106 may have a limited depth in order to maintain the desired bonding of the polymer material to other components such as, but not limited to, an outsole bottom layer of the sole or a sockliner. The apertures may extend to a limited depth such that there is a remaining layer devoid of any apertures. In the pre-expander polymer material, the apertures would extend to a depth such that a layer of an expanded polymer material is located underneath and devoid of any apertures. Such a layer or safety gap 156 has the advantage of improving the bonding score to other components that are co-molded or stock fitted to the polymer material. The safety gap 156 may be uniform for each of the apertures. The safety gap may also be of varying heights which the variance may depend on the composition and/or dimensions of the polymer material at varying locations in the sole component. A safety gap 156 of any aperture 106 may have a thickness of 2 to 5 mm in the pre-expanded material, such as a pre-expanded sole 100, as represented in line b of FIG. 4C. After SCF expansion of polymer material, the safety gap may have an approximate thickness of 4 to 10 mm.

With respect to the plurality of apertures 106 that may be located within a thicker portion of the polymer material, the spacing between each aperture 106 may be as close as approximately 3 mm or more as represented by lines C or C' of FIG. 4C. The spacing of apertures may be less than 3 mm for areas of the sole that require less support to the foot.

In one embodiment, the plurality of apertures 106 may be spaced into rows or in any other patterned configuration depending on the desired expansion and physical properties of any portion of the pre-expanded sole. The pre-expanded sole may have apertures 106 in any combination of one or more of the various regions of the pre-expanded sole, including but not limited to the forefoot and/or heel portion of the sole.

In an alternative embodiment, a polymer material may have one or more hollow spaces such as interior caverns, cavities, chambers, bladders, or skeleton matrix in place or in combination with the use of an aperture or plurality of apertures.

Figure 4D:
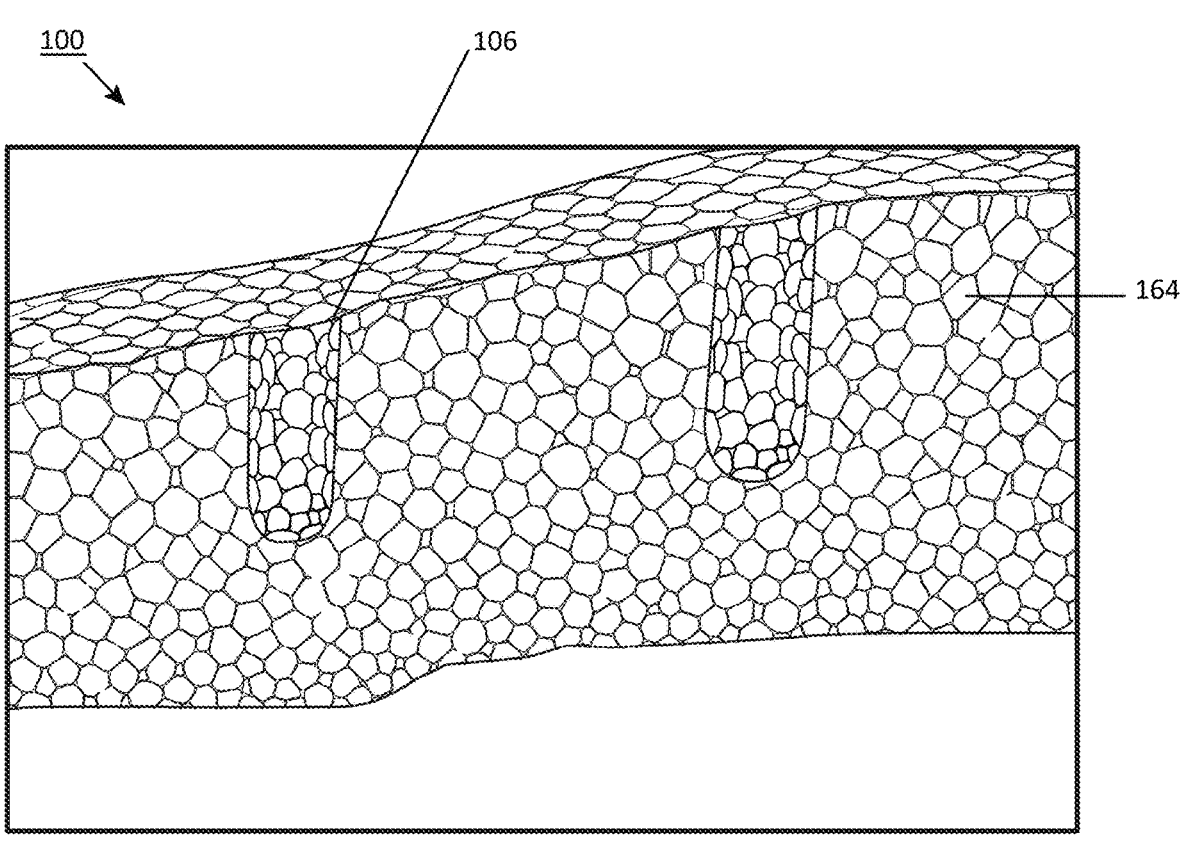
FIG. 4D is a close-up of a cross-section of an expanded sole component with apertures.
Figure 4E:
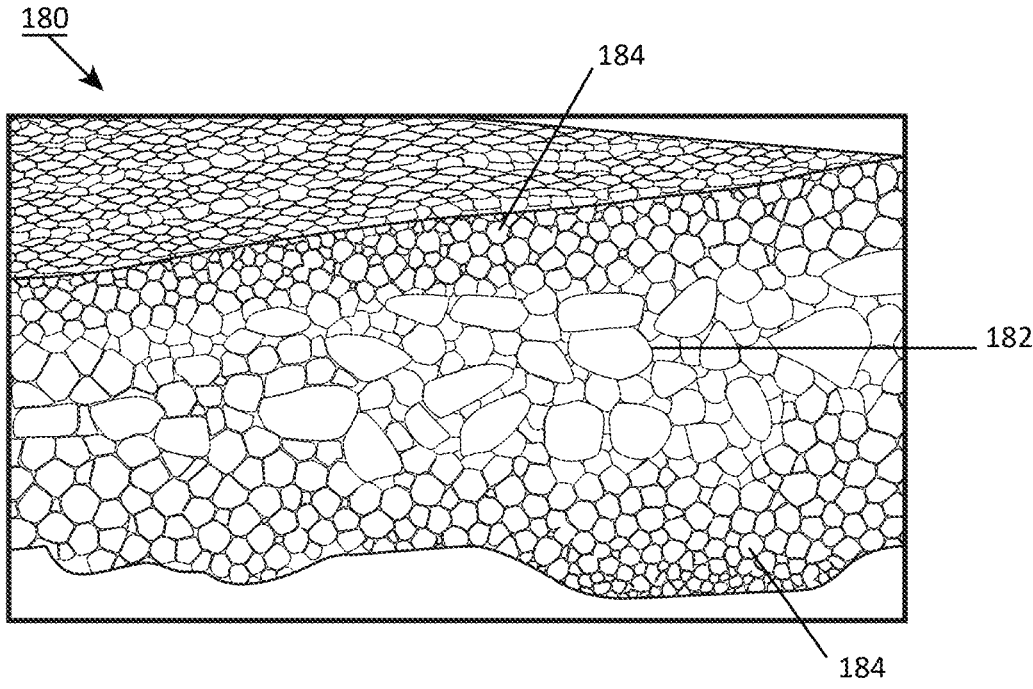
FIG. 4E is a close-up of a cross-section of an expanded sole component without apertures.

FIG. 4D is a close-up of a cross section of an expanded sole component which contained apertures 106 before SCF expansion. Apertures 106 added to a first polymer material during the initial molding of the pre-expanded sole component enhances the curing of crosslinking resins as well as provides for uniform expansion 164. In a preferred embodiment, a pre-expanded EVA based polymer material is formed in an injection mold with a mold temperature of 170° C. and 300-400 seconds with a pressure of 80 bar. In another embodiment, a pre-expanded EVA based polymer material may be formed in a compression mold with a heating process of 140° C. with a cycle time of 350-500 seconds and a cooling process under room temperature water with a cycle time of 350-500 seconds. A second polymer material 180 without apertures having the same overall dimensions as the first polymer material demonstrates larger cells (~6 to 10 or more times when comparing between some average cells) within the interior portion 182 of the material and exhibits non-uniform expansion 166, i.e. greater variance in cell sizes along with larger cell sizes, as shown in the second material's cross-section in FIG. 4E. Only the outer regions 184 adjacent to the exterior surfaces of the polymer material in FIG. 4E have a similar range of expansion to polymer material that includes apertures in FIG. 4D.

Further examples of pre-expanded polymer material having a plurality of apertures 106 are shown in FIGS. 2A, 3A, 6A, 9D, and 10B. With respect to FIGS. 2A and 3A, apertures 106 within the heel portion 104, 204 of the pre-expanded sole 100, 200 may have a greater number of apertures and closer spacing than that of the forefoot or midfoot portion of the pre-expanded sole. The pattern and number of apertures may also be used to provide both ornamental and other functional features such as reducing weight of the sole.

Compression Molding. In compression molding of the pre-expanded polymer material, the polymer compound, typically in the form of pellets, beads, particles, or powders is heat dried and then further heated to near the curing temperature at a particular pressure. Compression molding may use a press having fixed and moving platons. A cavity and plunger are mounted on these plates, with a parting plane that is kept horizontal. The cavity is filled with plastics which are melted by heating the mold under low pressure. When the melting is complete, the mold is closed, and pressure is applied. The molded pre-expanded polymer material is cooled and then removed from the mold once the ejection temperature is reached. The platens may include protrusions which create one or more apertures, or a cavity within the polymer material.

In one embodiment, the polymer material may be transferred into the compression mold machine, and the mold cavity is heated to 140° C. for 350-650 seconds followed by a cooling process under room temperature water with a cycle time of 350-650 seconds.

Extrusion. Extrusion is a continuous process of converting a solid plastic mass, pellets, or powders into a melted form where the melted polymer compound is pushed through a mold, resulting in a specific shape of a constant cross section. At least one type of polymer compound is introduced into the extruder via a hopper, which gravity feeds the polymer compound through the hopper's feed throat and into the barrel. The barrel contains a long, rotating screw, which feeds the plastic forward towards the mold. The polymer compound is melted under high temperatures as it moves through the barrel. The barrel temperature depends on the type of thermoplastic. Some extruders have a barrel that gradually increases the temperature from the loading end to enable gradual melting and minimize plastic degradation. Once the melted polymer compound reaches the end of the barrel, it is forced through a screen or screen pack and fed into the feed pipe that leads to the mold. The screen may be reinforced by a breaker plate because of the high pressures in the barrel. The screen removes possible contaminants in the melted polymer compound. The number of screens, screen porosity, and other factors may be manipulated to improve uniform melting. From the feed pipe, the melted polymer compound is fed into the mold cavity, where it cools and hardens.

Blowing Agents. Blowing agents may include both gas forming chemicals, phase changing chemicals, and SCF. Gas forming chemicals involve gas formed through a chemical reaction. Examples of gas forming chemicals include azodicarbonamide, 5-pheyltetrazole, and triazoles. Other blowing agent reagents may include solubilization of a chemical into a molten thermoplastic polymer, under pressure, to form a molten polymer/gas solution. Examples of blowing agents may be aliphatic hydrocarbons, fluoro- or chloro-derivatives. Chemical foaming may be used in combination with an SCF expansion method to further enhance the foaming process.

Supercritical Fluid. When combining the processing of polymer materials with SCF to create a low density foamed material, carbon dioxide (CO2) may be used as a solvent. Other solvents that may be used in place or in combination with $CO_2$ may include nitrogen ($N_2$), ethylene, ethane, nitrous oxide, butane, propane, ammonia, acetone, methanol, ethanol, tetrahydrofuran (THF), toluene, and water. SCF selection with a selected polymer material depends on the polymer material's Vicat softening point and/or the relative SCF solvent's boiling point (bp), critical temperature (Tc), critical pressure (Pc), and critical density. Other SCF properties considered include the solvent's viscosity and diffusivity into the polymer material where lower viscosity, lower surface tension, and higher diffusivity can make a particular SCF more effective.

Supercritical carbon dioxide ($scCO_2$) is the most commonly used SCF because of its low Tc and purity. $CO_2$ is also less expensive, more abundant than most other solvents, and safer due to its lack of atmospheric photochemical reactivity. The low operating pressure and temperature allow for compatible use with most polymers during the manufacturing processes such as extrusion and injection molding. $scCO_2$ has a Tc of 31.0° C. and Pc of 73.8 bar. scCO2 exhibits densities of 0.2-0.9 g/cm³, viscosities of 0.2-1.0×10⁻³ Poise, and diffusivity of 0.1-3.3×10⁻⁴ (cm²/s).

Supercritical nitrogen ($scN_2$) may also be used alone or in combination with $scCO_2$. Nitrogen has a Tc of −147.0° C. and a Pc of 34 bar.

All SCFs are completely miscible with each other and thus the critical point of the mixture can be estimated through arithmetic means of Tc and Pc of each of the components. For example, the Tc of the mixture may be calculated based on the following example equation for SCF A and SCF B:

$$T_{c(mix)} = (\text{mole fraction } A) \times T_c A + (\text{mole fraction } B) \times T_c B.$$

Other means of determining the critical point of the mixture of the SCF may be determined through equations of state such as the Peng-Robinson method, or other contributing methods. See Peng et al., Ind. And Eng. Chem.: Fund., 15:59-64 (1976).

The foam density, porosity, mean pore size, and pore size distribution may be determined by a variety of parameters that include the foaming process conditions, and the type of SCF agent such as $CO_2$, $N_2$, etc., the temperature and pressure during gas solubilization, the pressure release and temperature cooling profile during and after the expansion process. Other parameters include the intrinsic properties of the foaming material that include the interface, rheological, and thermal properties and the mass transport and absorption of the SCF.

SCF may be formed by starting with the SCF agent in either solid or liquid form in a pressure vessel. In the case of $CO_2$, a solid form of carbon dioxide or "dry ice" may be located within a pressure vessel constructed of aluminum or acrylic. Under such high pressure, the dry ice melts to form both a liquid and gas phase. When the vessel is heated at a controlled rate, the two phases merge to form the SCF phase having both gas diffusivity properties, but with the density of a liquid. In the case of $N_2$ or mixtures of $N_2$ thereof, liquid nitrogen may be placed in a pressure vessel, and the temperature is increased at a controlled rate. The temperature may be set to near or below the Vicat of the polymer material. The pressure is increased to no higher than the maximum rated pressure of the vessel. If necessary, the excess pressure is carefully vented to vacuum. Once the pressure vessel is equilibrated at the desired pressure and temperature, the SCF may be added to the pressure vessel's sample chamber. The existing gas within the sample chamber may be vented as the SCF fills the chamber.

SCF Expansion of Polymer Material

To create the three dimensionally expanded polymer material for a sole or component thereof, pressure and temperature must be adjusted such that the SCF may be absorbed within the pre-expanded polymer material. In a preferred embodiment, the pre-expanded polymer material may be placed within a chamber of an autoclave equipped with a system of valves for SCF injection and pressure and heating control. The autoclave may also be equipped with additional valves for both removal of atmospheric gas, and for venting of SCF for equilibration and depressurization.

Further to this embodiment, the autoclave is sealed with the pre-expanded polymer material without constraints on the polymer material with the exception of the attachment of the polymer material to the pressure vessel's holder by an expansion attachment member. The pressure vessel is then set to a particular temperature and pressure suitable for keeping the SCF solvent in its supercritical state. Under these conditions, SCF is injected into the autoclave chamber until the SCF completely fills the chamber. Once the pre-expanded polymer material sufficiently absorbs the SCF, the pressure may be released at a controlled rate to allow for the expansion of the polymer material. The rate of release may be controlled by a computer-controlled release valve. The temperature may be held constant or be allowed to lower during the expansion process. In one preferred method, the temperature is lowered after the pressure is returned to atmosphere.

Upon depressurization, the pre-expanded polymer material is expanded three-dimensionally as the SCF is converted into the gaseous phase. In one embodiment, the polymer material is not confined at any surface used in the final product by a mold or material. Expansion may occur in all directions giving rise to a three dimensionally expanded product.

The absorbed SCF in the sole forms bubbles within the matrix of the polymers and the polymer matrix may capture the gas bubbles either transiently or permanently thereby forming expanded polymer cells and thus, foaming the material. In one embodiment, the polymer material may have trapped the gas, thereby forming closed cells. In other embodiments, the gas may be released from the polymer material. If the cells are not necessarily sealed, the cells may be filled with ambient air as the gas is released. The polymer material may result in the formation of sealed expanded cells thereby forming a full sole or at least a component of the sole that may be partially impermeable to gases or fluids. The SCF expanded polymer material has a substantially similar shape to the pre-expanded polymer material with dimensions that are proportionately larger than the pre-expanded polymer material.

In one preferred method in which the polymer material comprises the entire sole, the sole is secured in the autoclave through the expansion member 108, 208, 209 as shown in FIGS. 2A and 3A. After the pre-expanded sole 100 is expanded to form the expanded sole 110, the expansion member may be removed.

Expansion member(s) 108, 208, 209 as shown in FIGS. 2A and 3A may be formed on the polymer material at sites that also correspond to the injection and air pressure release ports of a compression mold used to form the pre-expanded polymer material. The expansion member may be the commonly formed excess material of the injection 208 and air pressure release 209 portions of the polymer material. The expansion member may also be used for other purposes such as for the removal of a polymer material from a mold.

The expansion member 108, 208, 209 and other excess appendages may be removed from the polymer material prior to expansion if it is not required for the expansion step or after expansion or other subsequent processes such as a post co-molding step.

An example autoclave temperature may be set to at or approximately less than the Vicat of an EVA based polymer material of 120° C., and an adequate pressure to maintain the SCF solvent in its supercritical state such as above the SCF solvent's Pc, e.g. 73.8 bar for pure $scCO_2$. In one example method, the SCF is a mixture of $CO_2$ and $N_2$ which may reduce the pressure vessel's pressure based on the concentrations of each solute. The polymer material may be held in SCF for any incubation time suitable for sufficiently expanding the polymer material to the desired size. In some exemplary processes, the time may be between 1 to 4 hours. Incubation should not exceed a time that may cause the polymer material to be over expanded or become structurally unstable. The incubation time may vary depending on the type of composition of the polymer material.

The pressure may be released rapidly or slowly, during which time, the SCF is converted to a gas form. Expansion of the gas causes the absorbed gases within the polymer material to expand resulting in the nucleation of cells.

Polymer material may be expanded to any size relative to the pre-expanded sole component. One exemplary method produces an expanded polymer material that may range from 165% to 200% of the pre-expanded polymer material. Higher expansion rates may result in an SCF expanded polymer material that is more lightweight and exhibits a softer hardness than lower expansion rates. Polymer materials with higher expansion rates may require an additional durable layer located at the bottom of the expanded polymer material to lower abrasion to the expanded polymer material from direct contact with the ground. An exemplary embodiment may be an SCF expanded EVA based material with an expansion rate of about 197%. SCF expanded polymer materials having lower expansion rates may not require an additional durable bottom layer. An exemplary embodiment may be an SCF expanded EVA based material with an expansion rate between 170-185%. Also, an SCF-expanded polymer material with a higher expansion rate may be required to enhance the bonding score for soles used for high performance activities such as golf or basketball.

In one embodiment, the resiliency coefficient percent range for the SCF-expanded polymer material as measured by the ASTM D-2632 method is between approximately 50% to 70% for an EVA based material and between approximately 65% to 80% for polyether block amide (PEBA), TPU, or TPEE based material.

The hardness may vary based on the intended purpose of the shoe. Exemplary Asker C (ASTM D 2240) values may include a range of 25 to 51 with SCF expanded material having a hardness of approximately 25 used for sole components designed for a sandal, SCF expanded material having a hardness of approximately 41 for sole components designed for casual shoes, and SCF expanded material having a hardness from 44 to 51 for sole components designed for high impact activities such as running shoes.

In a preferred embodiment, a sole cushioning element may be preferred to have a uniform hardness. SCF-expanded material exhibits a more consistent uniformity of foam expansion than chemically foamed material. In one exemplary embodiment, SCF-expanded material used for sole components may have a surface material with an ASTM D2240 Asker C hardness value of 51 and an interior region with an ASTM D2240 Asker C hardness value of 46, thus resulting in a variance of 11% between the surface and interior regions of the SCF-expanded material. In contrast, a chemically-expanded EVA having a chemically-expanded EVA's surface with an ASTM D2240 Asker C hardness value of 50 and an interior region with a hardness having an ASTM D2240 Asker C hardness value of 40, thus resulting in a variance of 25% between the surface and interior regions of the chemically-expanded EVA. In contrast to SCF-expanded material, another chemically-expanded EVA has a surface material with an ASTM D2240 Asker C hardness value of 51 and an interior region with an ASTM D2240 Asker C hardness value of 35, thus resulting in a variance of 46% between the surface and interior regions of the chemically-expanded EVA. The improved uniformity may also be aided via the inclusion of apertures in the SCF-expanded material.

Table I provides exemplary comparisons of SCF-expanded EVA based materials and chemically foamed (CF) EVA based materials. Generally, SCF-expanded EVA based material compared to CF-expanded EVA based material having similar durometer hardness measurements have a lower density, i.e. specific gravity, and a higher cushioning, i.e. resiliency. For example, see compared to SCF Examples 3 and 4 with CF Examples 1 and 2. Certain SCF-expanded EVA based material examples also exhibit equivalent compression and abrasion strength to some of the CF-expanded EVA based material examples. SCF-expanded polymer material requires less material and is lighter to the user while achieving in some cases higher resiliency and equal if not more long-term wear. CF-expanded EVA based materials may have a similar resiliency to SCF-expanded EVA based materials, but the cell sizes and density are higher. CF-expanded EVA may be 1.75 times denser and exhibit less compression strength, e.g. 10% less than the SCF-expanded EVA based materials. SCF-expanded EVA based materials having 0.14 to 0.21 g/cm$^3$ has demonstrated a resiliency ranging from 52 to 75%.

properties. The translucent property may be due to the formation of polymer bubbles which enables light to pass through the material. Apertures used to enhance the uniform expansion of cells during SCF-expansion will also improve the uniformity in the translucent properties of the SCF-expanded polymer material. In contrast to SCF-expanded polymer material, unfoamed and chemically foamed EVA-material are opaque or less translucent. Composite soles having a portion of the sole having SCF-expanded polymer material and another portion of the sole comprising of an opaque material may exhibit properties in which the opaque material may be visualized through the SCF-expanded material. In an exemplary embodiment, a sole may be a composite sole with an SCF-expanded EVA based material and a carbon fiber material wherein the carbon fiber material may be even visualized through portions of the SCF-expanded EVA based material.

TABLE I

| Physical Properties of EVA Based Foams | | | | |
|---|---|---|---|---|
| | Specific Gravity (g/cm$^3$ ± 0.02) | Durometer (Asker C ± 2) | Compression Set %(max) | Resilience %(min) | DIN Abrasion mm$^3$ (max) |
| SCF Example 1 | 0.18 | 44 | 65 | 52 | 200 |
| SCF Example 2 | 0.18 | 47 | 65 | 52 | 200 |
| SCF Example 3 | 0.16 | 44 | 60 | 60 | >400 |
| SCF Example 4 | 0.16 | 47 | 60 | 60 | >400 |
| CF Example 1 | 0.17 | 45 | 55 | 50 | >400 |
| CF Example 2 | 0.17 | 44 | 60 | 50 | >400 |
| CF Example 3 | 0.28 | 45 | 60 | 45 | 250 |
| CF Example 4 | 0.28 | 45 | 50 | 60 | 150 |
| CF Example 5 | 0.25 | 45 | 60 | 40 | 300 |

In one embodiment, the SCF-expanded EVA based materials recovers to its original thickness within 2 seconds following an external compression force that compresses the expanded sole to 50% of its original thickness for 10 seconds. Under these conditions, no wrinkles in the material appear.

Figure 5:
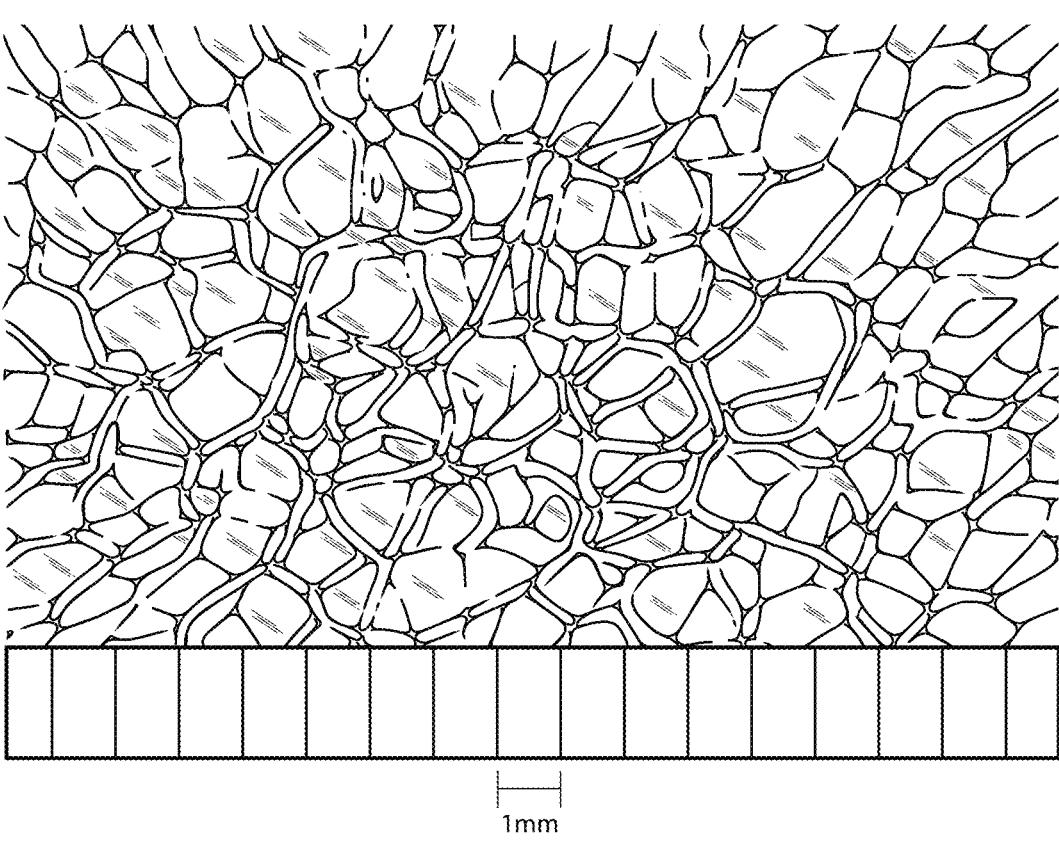
FIG. 5 is a magnified photograph of a polymer material expanded under an exemplary process.

In one embodiment, the SCF-expanded EVA based materials with either an ideal thickness or apertures may have cells with an average pore/cell size diameter range between 200 and 1400 microns as shown in FIG. 5, an example magnified photograph of expanded polymer material against a ruler with 1 mm markings. Without apertures, interior regions within the expanded foam have larger cell sizes where some are almost 6-10 times the diameter in comparison to some of the average sized cells from SCF-expanded EVA based materials with apertures. See FIG. 4E. Such regions without the presence of apertures provide less cushion support and reduced tear strength.

In one embodiment, the SCF-expanded EVA based materials with either an ideal thickness or apertures may have foamed cells with an average pore/cell size diameter range approximately between 660 and 1185 microns as shown in FIGS. 13B and 13D, example photographs taken through a microscope at magnifications of ×20 and ×200, respectively, of expanded polymer material. In contrast to SCF-expanded EVA based materials with either an ideal thickness or apertures, chemically expanded EVA having an approximately equal hardness may have foamed cells with an average pore/cell size diameter range approximately between 40 and 172 microns as shown in FIGS. 13A and 13C.

An additional property of the SCF-expansion of the polymer material is that the material may have translucent After the pre-expanded polymer is foamed, the SCF-expanded polymer material may be attached to other components of footwear such as an upper or outsole materials. In another embodiment, the expansion polymer material may fully form both the sole and portions or all of the upper. The pre-expanded polymer material may also include an upper portion such as a heel cup or a strap. Straps may form the upper of a sandal or slip where the strap was integrally molded with the pre-expanded polymer material. In an alternate embodiment, an upper portion may be a separately molded component that is attached to the SCF-expanded polymer material portion of the sole.

FIG. 2A (right) is an exemplary embodiment of polymer material that is used to form the fully expanded sole 110. The expanded sole 110 may include a forefoot portion 112 and a heel portion 114. The expanded sole 110 may include a plurality of apertures 106 and an expansion member 118. The expansion member 118 may be used to secure the pre-expanded sole in the sample chamber of the autoclave by a clamping device attached to a holding apparatus within the sample chamber of the autoclave. The expansion member 118 may also be removed from the SCF-expanded polymer material following expansion or after further post expansion processing steps.

FIG. 2B (right) shows the bottom view of the SCF-expanded sole 110. The SCF-expanded sole 110 may include a forefoot portion 112 and heel portion 114. The SCF-expanded sole 110 may be textured to include treads 134, deeper grooves 132 or sipes, and ornamental features including graphics and logos 136.

The midsole periphery of the SCF-expanded sole may be textured to include indentations and protrusions. In an alternate method of forming textures, compression molds may be used to form textures on the sole during the expansion process.

FIG. 1 shows a flow chart of an exemplary method of forming a component of the sole or entire sole from the formation of the pre-expanded polymer material with or without apertures to SCF treatment resulting in a three-dimensionally expanded polymer material. After expansion and possible post processing steps of the expanded polymer material, the component of the sole is ready for incorporation with the remaining components of footwear.

Post-Processing of the Expanded Polymer Material

Dying and Printing. After the pre-expanded polymer material is expanded, the SCF-expanded material, whether directly after expansion or following further processing, such as post compression molding, may be dyed with one or more colors. Dyes may include any suitable dye capable of adhering to or absorbed by the sole. The polymer material may be placed in the dye solution for any amount of time. One exemplary submersion time is 20 to 30 minutes. After submersion into a dye solution, the expanded polymer material may be rinsed to wash off the excess dye.

The graphics and logos may also be printed on to the expanded polymer material. Printing processes may include screen printing, hot stamping, or pad printing. Any inks known in the art may be used. Preferred inks have optimal adhesion to the polymeric material.

Protective Coating. The expanded polymer material may be coated to achieve a desired physical property such as abrasion resistance, mold resistance, temperature resistance, or improved surface finish. The coating may impart structural durability to the expanded sole. The coating may act as a sealant. Examples of protective coating may include PDC® foam coatings from Performix, paints, or other known materials in the art.

Refinement. The pre-expanded polymer material or expanded polymer material may be deburred, trimmed, or sanded to further refine certain features or remove any excess material from the sole. In one exemplary process, the attachment member and excess polymer material that escaped at injection and ejection points on the compression mold may be cut after expansion of the pre-expanded polymer material. In another exemplary process, expanded polymer materials and other expanded polymeric shoe components, such as lugs, may be trimmed or rounded for ornamental purposes or to ensure proper fitting. In another exemplary process, the sole textures or patterns may need to be further trimmed or sanded.

Post Molding. The expanded polymer material may be further molded to form additional surface features and functional features such as, but not limited to, textures and grooves.

One exemplary post-molding process is to subject the SCF-expanded polymer material to further compression molding. The expanded polymer material in the mold is heated to 140 to 160° C. for 50 to 500 seconds, cooled to 30 to 35° C. for 50 to 500 seconds, and ejected from the mold. The compression mold may reduce the size of the SCF-expanded material causing the material to have a stiffer hardness and greater density. In one exemplary embodiment, the SCF-expanded polymer material may be expanded to a size of 197% prior to molding. After molding, the SCF-expanded polymer material may have a compression rate of 135 to 145% with a final Asker C hardness of 44 to 47 and a density of 0.165 g/cm$^3$ in some or all locations of the material. Further to this exemplary embodiment, the Asker C hardness may increase to 50 and with a density of 0.18 g/cm$^3$. Lower compression rates are also possible for applications that do not require a higher bonding score for shoe assembly.

Compression rates may vary for certain areas of the SCF-expanded polymer material which results in a sole component having varying hardness and density. In one exemplary embodiment, a midsole component formed of SCF-expanded polymer material may have a higher compression rate along the top perimeter of the midsole to form a harder and denser ridge and/or heel cup along the top perimeter. The increase in hardness and density may provide greater support to the foot's edge and improve the bonding of the upper to the midsole.

Post Expansion Co-Molding. The expanded polymer material may be further co-molded with one or more additional materials such as, but not limited to, another SCF-expanded polymer material, other types of polymer material, plates, or shanks.

In one embodiment, an expanded polymer material and the one or more additional materials may be co-molded together using a compression mold.

The expanded polymer material may be co-molded with one or more additional polymer materials, such as but not limited to, EVA, LDPE, NBR, polychloroprene, polyimide, PP, PS, PU, polyethylene, PVC, silicone, microcellular foam and/or rubber. The additional polymer materials may be in the form of raw material or pellets, beads, or particles which are shaped during the co-molding process.

In another embodiment, the expanded polymer material may be placed at one location within the compression mold cavity, and the additional one or more polymer materials may be placed adjacent to the expanded polymer material. Under compression, the expanded polymer material and the one or more additional polymer materials are bonded together.

Polymer compounds may be molded to form a pre-expanded slab. Choice of polymers, supplementary agents or additives such as plasticizers, stabilizers, antistatic agents, colorants, antioxidants, initiators, flame retardants, biocides, and other additives, may be customized to reach the desired strength, malleability, flexibility, stiffness, appearance, gloss, and color.

The one or more additional polymer materials may be die-cut SCF-expanded polymer foam, as depicted in FIGS. 3C and 3D, a customized shape die-cut from expanded polymer material prior to compression molding to a first SCF-expanded polymer material.

A first SCF-expanded polymer material may be placed at one location within the compression mold cavity, and the one or more additional polymer materials, such as but not limited to die-cut SCF-expanded polymer foam, may be placed adjacent to spaces 260 of the expanded sole configured to fit the die-cut SCF-expanded polymer material. See FIG. 3B. (left) The additional polymer material 220 may have pre-trimmed or rounded areas 222 for proper fitting into the first expanded polymer material as shown in FIG. 3C. The trimmed or rounded areas may allow for proper fitting into the first SCF-expanded polymer material configured to receive the additional polymer material. As shown in FIG. 3E, during compression molding, the first SCF-expanded polymer material 210 and the one or more additional polymer materials 220, such as but not limited to SCF-expanded polymer foam, are bonded to each other. FIG. 3E shows the compression molding process may also include reshaping and/or the formation of textures 250, grooves 252, graphics, and/or logos 256. FIG. 3D shows the bottom surface 230 of a second SCF-expanded polymer material wherein during compression molding with the first SCF-expanded polymer material 210, the additional polymer materials 220 are rounded at the edges with treads 258 and a logo 256 impressed on its exterior surface. See FIG. 3E.

Further to this embodiment, a first expanded polymer material and one or more additional polymer materials, such as but not limited to die-cut SCF-expanded polymer, may be constructed of polymers that vary in chemical composition, coloration and/or physical properties from the expanded sole component.

Figure 3B:
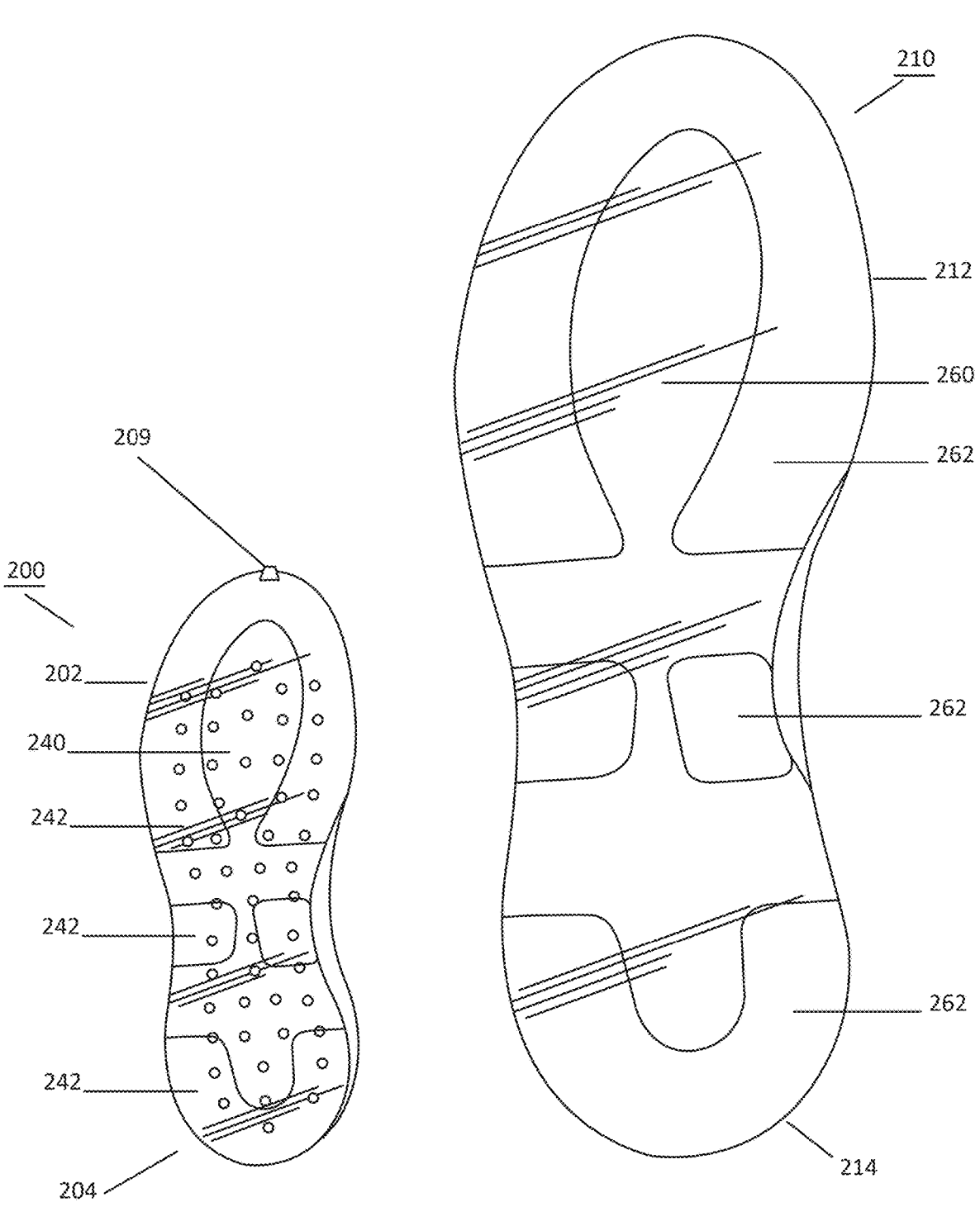
FIG. 3B is a bottom view of a pre-expanded sole component (left) and a bottom view of an expanded midsole component (right).
Figure 3E:
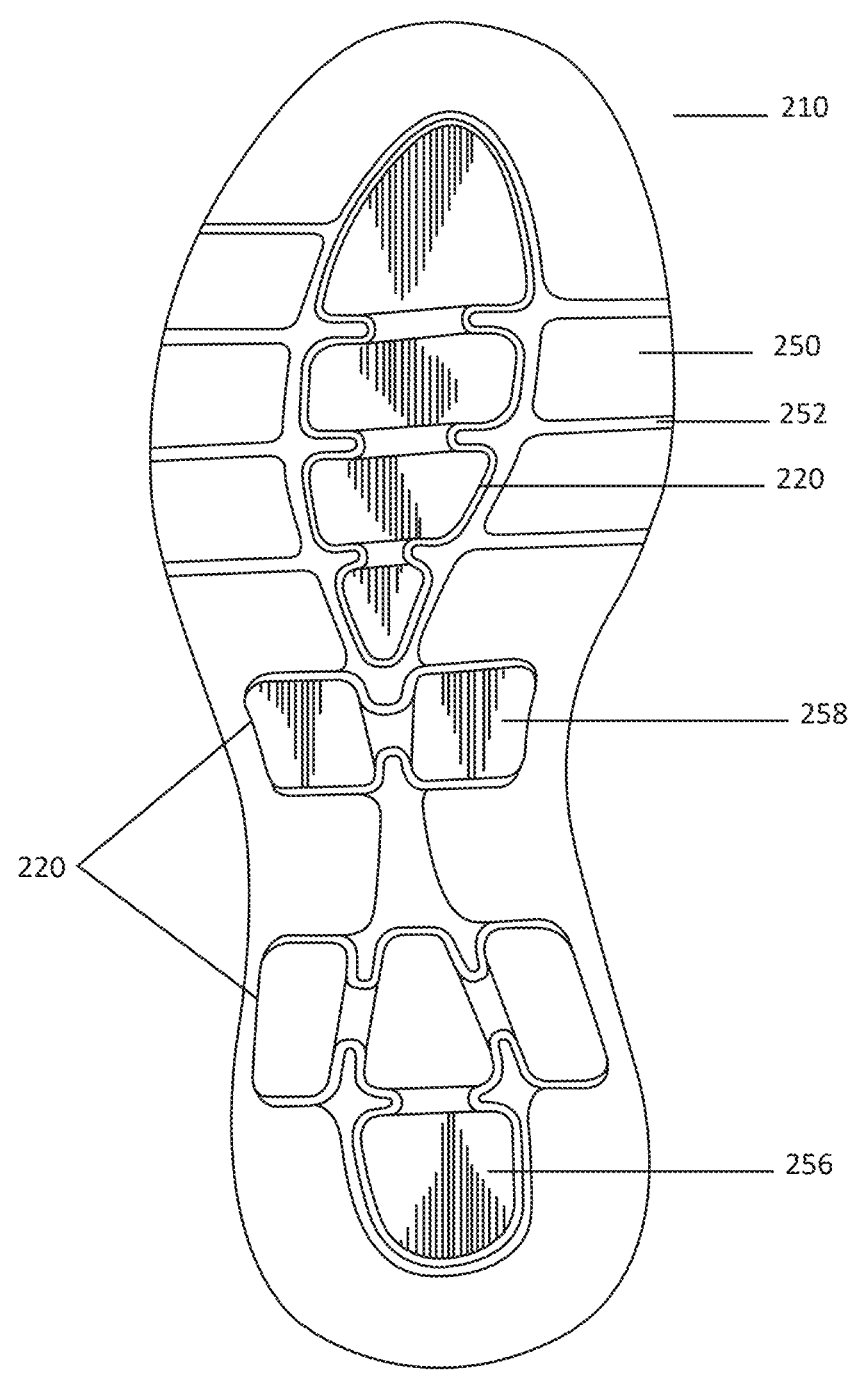
FIG. 3E is a bottom view of an expanded sole component shown in FIG. 3B following compression molding to die-cut expanded polymer materials.
Figure 3F:
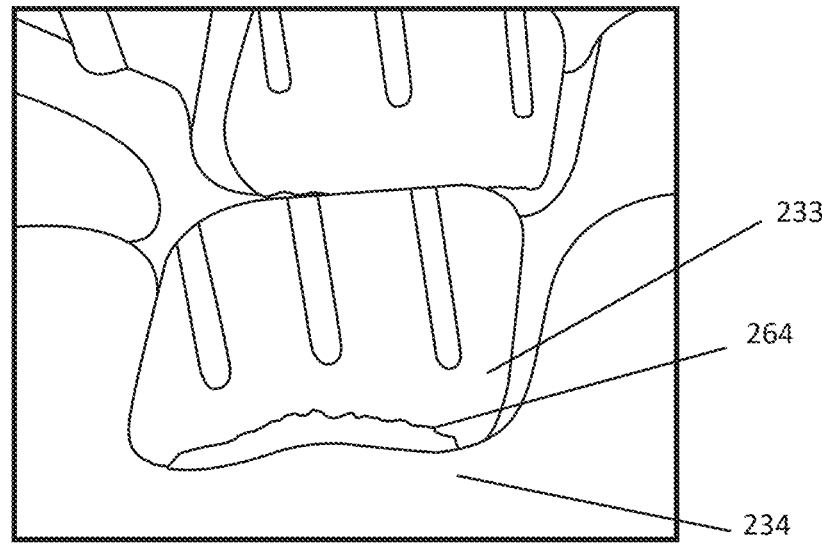
FIG. 3F is a side view of the junction in a co-molded expanded midsole.
Figure 3G:
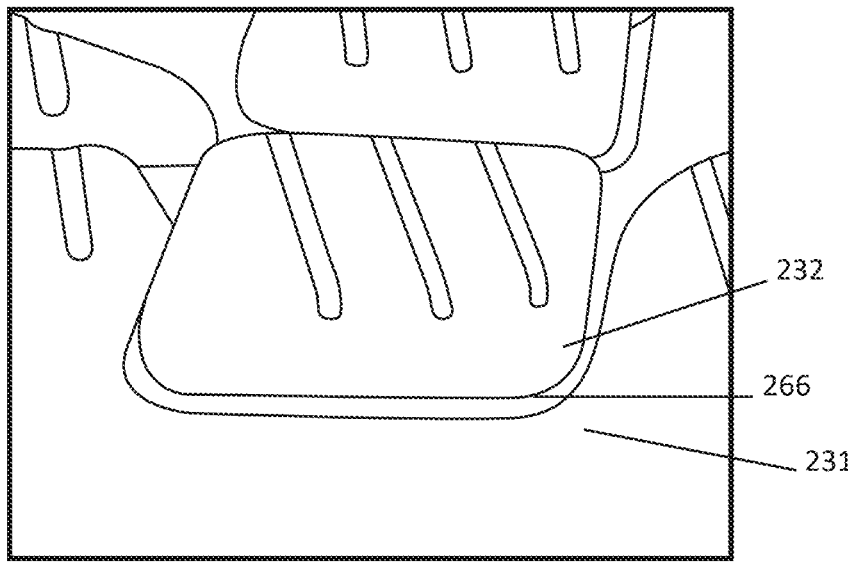
FIG. 3G is a side view of the junction where an expanded midsole component is bonded to a customized shape die-cut from expanded polymer material.

As shown in the preferred embodiment of FIG. 3G, a first expanded polymer material 231 having one distinct color/composition is bonded using a compression mold to a die-cut SCF-expanded polymer material 232, having another distinct color/composition. Such an embodiment has the advantage of reduction or elimination of inter-color contamination or "bleeding" that may occur at the interface 264 if two different polymer materials were first co-molded in a pre-expanded sole and subsequently foamed under SCF expansions. FIG. 3F demonstrates bleeding at an interface 266 between a first SCF-expanded polymer material 233 of one distinct color or composition to second SCF-expanded polymer material 234 of a different color or composition from the first SCF-expanded polymer material.

Further to this embodiment, the die-cut SCF-expanded polymer material may be a lug. The lug may have a chemical composition that produces a higher density and hardness in its expanded form than the first expanded material.

In one embodiment, bonding agents, such as but not limited to primers, adhesives, cements, and/or films, may also be used between a first expanded polymer material and the one or more additional materials during the co-molding process. Use of bonding agents may increase bonding strength for certain materials even when components are compression molded at elevated pressures and/or at elevated to near melting temperatures. For some materials, the co-molding process may not require any additional bonding agents.

In one embodiment, a pre-expanded sole component to be used in the co-molding process that may have portions of varying thickness as exemplified in FIG. 3A (left), a top view of a pre-expanded sole component, and FIG. 3B (left), a bottom view of an injection molded pre-expanded shoe sole without the inclusion of additional materials. The pre-expanded sole component 200 may include a forefoot portion 202 and heel portion 204. The pre-expanded sole component 200 may include protuberances 262 located on the bottom of the sole component, and these protuberances may be configured to receive die-cut SCF-expanded polymer components in the spaces 240, as exemplified in FIG. 3B (left).

In one embodiment, the expanded sole component may be attached through various means, including but not limited to co-molding, to other shoe components, including but not limited to an upper or other footwear components.

In one exemplary embodiment, a pre-expanded or expanded polymer material may be designed to include both the sole and portions of the upper or the entire upper, including but not limited to a heel cup and/or a strap. Straps may form the upper of a sandal or slip where the strap was integrally molded with the sole. In an alternate embodiment, the one or more other components of footwear may be fabricated from separately molded, die-cut SCF-expanded polymeric foam.

After SCF expansion of the sole component, the post compression molding step may impart textures to the pre-expanded polymer material at any portion of the sole. Exemplary textures include lines, circles, or ellipses, lugged soles, deep patterned indentations, recessed studs, or apertures. Textures may be added to the outsole bottom, outsole periphery, midsole, and internal regions of the outsole and midsole. The mold may also have a higher compression rate at selected areas of the expanded foam which would increase the density of the EVA and provide additional structural support. In an exemplary embodiment, the SCF-expanded sole that undergoes post compression molding is reduced in size by approximately 1.3 to 1.5 fold. When subjected to a post compression mold step, areas exhibiting high compression rate regions may have a higher density than other regions. These high-density regions, such as the ridge 340 around the heel cup portion, may also have an improved bonding score along with added structural support. See FIG. 6A.

Using a compression mold, the expanded polymer material may be bonded to one or more other components of footwear such as but not limited to other polymer materials to form a sole or a portion of the sole.

FIG. 3A (right) is a top view of an exemplary embodiment of an expanded sole component 210. The expanded sole component 210 may include a forefoot portion 212 and a heel 214 portion. The expanded sole component 210 may include a plurality of apertures 106 in any or all portions of the expanded sole component 210.

FIG. 3B (right) is a bottom view of the expanded sole component 210. The expanded sole component 210 includes a forefoot portion 212 and heel 214 portion. The expanded sole component 210 may be textured to include protuberances 262 of increased thickness in the forefoot 212 and anterior and posterior heel 214 portions of the sole, surrounding areas of decreased thickness within which customized shapes die-cut from an SCF-expanded polymer 220, as exemplified in FIGS. 3C and 3D, may be inserted and bound, e.g. via compression molding, to the spaces 260 between the protuberances 262 in expanded sole component 210.

One exemplary combination may include 60% by weight EVA and 20% by weight POE such as an ethylene butene copolymer. The EVA may have a melt index (also called a melt flow index or melt flow rate) of from approximately 0.5 to approximately 150 grams/10 min. (190° C., 2.16 kg) as measured using ASTM D1238 procedure. Non-limiting examples of suitable commercially available EVA which may include Ateva® from Celanese and Elvax® from DuPont. Other components may include an elastomer, preferably ethylene propylene diene monomer (EPDM) rubber. Further components may include a thermoplastic elastomer, preferably styrene ethylene butylene styrene (SEBS). The remaining composition may include crosslinkers, initiators, plasticizers, and pigment.

In one embodiment, the pre-expanded polymer slab may be expanded by using an SCF process.

One exemplary injection mold process of expanding the pre-expanded polymer slab involves injecting the polymer compound into a mold at a temperature between 150°-200° C. The duration of the process may be approximately 500-600 seconds. This process may also include the use of a variety of plastic particles such as adding varying densities and or pre-dyed plastic particles of different colors.

A pre-expanded slab may be expanded under SCF conditions to any size relative to the pre-expanded slab. One exemplary expanded slab is 165% to 200% the size of the pre-expanded slab.

Exemplary ASTM D2240 Asker C hardness values used in footwear may range from 25 to 51 and an ASTM D-2632 resiliency of 60%.

In one exemplary embodiment, an SCF-expanded EVA based material may be die-cut to for customized shapes, as exemplified in FIGS. 3C and 3D.

As exemplified in FIGS. 3C and 3D, the die-cut customized shapes may be designed and cut to impart features such as alcoves 224 and projections 226, the inclusion of which may modify the flexibility, weight, and appearance of the final outer shoe sole. The die-cut customized shapes may also be designed and cut to impart softened edges 220. Trimming and rounding edges have the advantage of allowing the customized shapes to melt into the precise position during compression molding for a proper fit into a receiving piece such as receiving pieces that wrap around a portion of the die-cut customized shapes. By trimming the die-cut customized shapes, the reduced amount of material leads to less compression during co-molding, which in turn leads to a softer final product. Trimmed edges may also reduce weight and affect the appearance of the final outer shoe sole.

In one embodiment, the expanded sole component may be bound to the die-cut customized shapes through various means, including but not limited to co-molding.

In one embodiment the expanded sole component and the expanded EVA based material are die-cut into customizable shapes and are co-molded to form the final outer sole part.

In one exemplary embodiment depicted in FIG. 3E, the SCF-expanded sole component 210 may be co-molded with the expanded EVA die-cut customizable shapes 220, using a compression mold. The compression mold may contain a compression mold cavity, in which materials may be bound into a plurality of layers. In one exemplary embodiment, the layers comprise a bottom layer of SCF-expanded EVA based material that is die-cut into customizable shapes 220, and a top layer comprising the expanded sole component 210. The compression mold may include spikes that penetrate the layers near the interfaces of the expanded sole component and expanded EVA die-cut customizable shapes. Advantages of using such spikes include better alignment and restraint of the layers during co-molding, increased heat uniformity, and air release during the compression molding.

In one exemplary embodiment, the mold may be designed to impart textures to any portion of the final outer sole. Exemplary textures include lines, circles, or ellipses. The mold may also impart other features such as the formation of lugs, deep patterned indentations, recessed studs, apertures, or holes. Textures or other features may be added to any portion of the sole including the outsole bottom, outsole periphery, midsole, and internal regions of the outsole and midsole.

Post SCF Expansion Stock fitting. The SCF-expanded polymer material alternatively may be stock fitted with one or more additional materials such as, but not limited to, die-cut expanded EVA foam, by bonding together the expanded sole and one or more additional materials such as, but not limited to, die-cut expanded EVA foam, with bonding agents, such as, but not limited to, adhesives, cements, and/or films.

In one embodiment, bonding agents, such as, but not limited to, adhesives, cements, and/or films may be applied between a first SCF-expanded polymer material and the one or more additional materials, such as but not limited to, EVA, LDPE, NBR, polychloroprene, polyimide, PP, PS, PU, polyethylene, PVC, silicone, microcellular foam and/or rubber.

Bonding agents, such as, but not limited to, adhesives, cements, and/or films may be applied between the SCF-expanded polymer material and the one or more additional materials, such as but not limited to die-cut SCF-expanded EVA foam. Such an embodiment may have the advantage of increased bonding strength as compared to the bonding strength through co-molding using a compression mold.

The one or more polymer materials may be constructed of polymers that vary in chemical composition, coloration and/or physical properties from the first SCF-expanded polymer material. The first SCF-expanded polymer material may have one distinct color/pattern/chemical composition while the one or more additional polymer materials, such as, but not limited to die-cut SCF-expanded EVA based material, may have other distinct color patterns. Such an embodiment has the advantage of eliminating contamination or "bleeding" that may occur during other bonding processes, such as co-molding polymer materials having different colors, patterns, or chemical composition.

Further to this embodiment, the pre-expanded shoe sole component may be molded to include protuberances located on the outsole bottom, outsole periphery, midsole, and internal regions of the outsole and midsole, and said protuberances may border surfaces in which one or more additional polymer materials may be bonded to the expanded sole through a stock fitting process.

In one embodiment, the expanded sole component may be bound to the die-cut customized shapes through various means, including but not limited to stock fitting.

Rigid Plate. At least one rigid plate may be bonded with the SCF-expanded polymer material. The rigid plate may be in areas of the sole that may provide enhanced recovery of energy return during walking or running such as areas on or near the ball joint of the foot. The plate may be constructed of materials comprising carbon fiber plate, PEBA (e.g. PEBAX®), TPU, and/or TPEE (e.g. HYTREL®). In one exemplary embodiment, one or more rigid plates may be located between a top layer and bottom layer of polymer material with at least one layer comprising an SCF-expanded polymer material. The rigid plate may be stock-fitted to the layers. The layers may have different densities, hardness, and/or resiliency. The rigid plate may be located between an SCF-expanded polymer layer and the outsole where the outsole may comprise rubber.

Figure 6A:
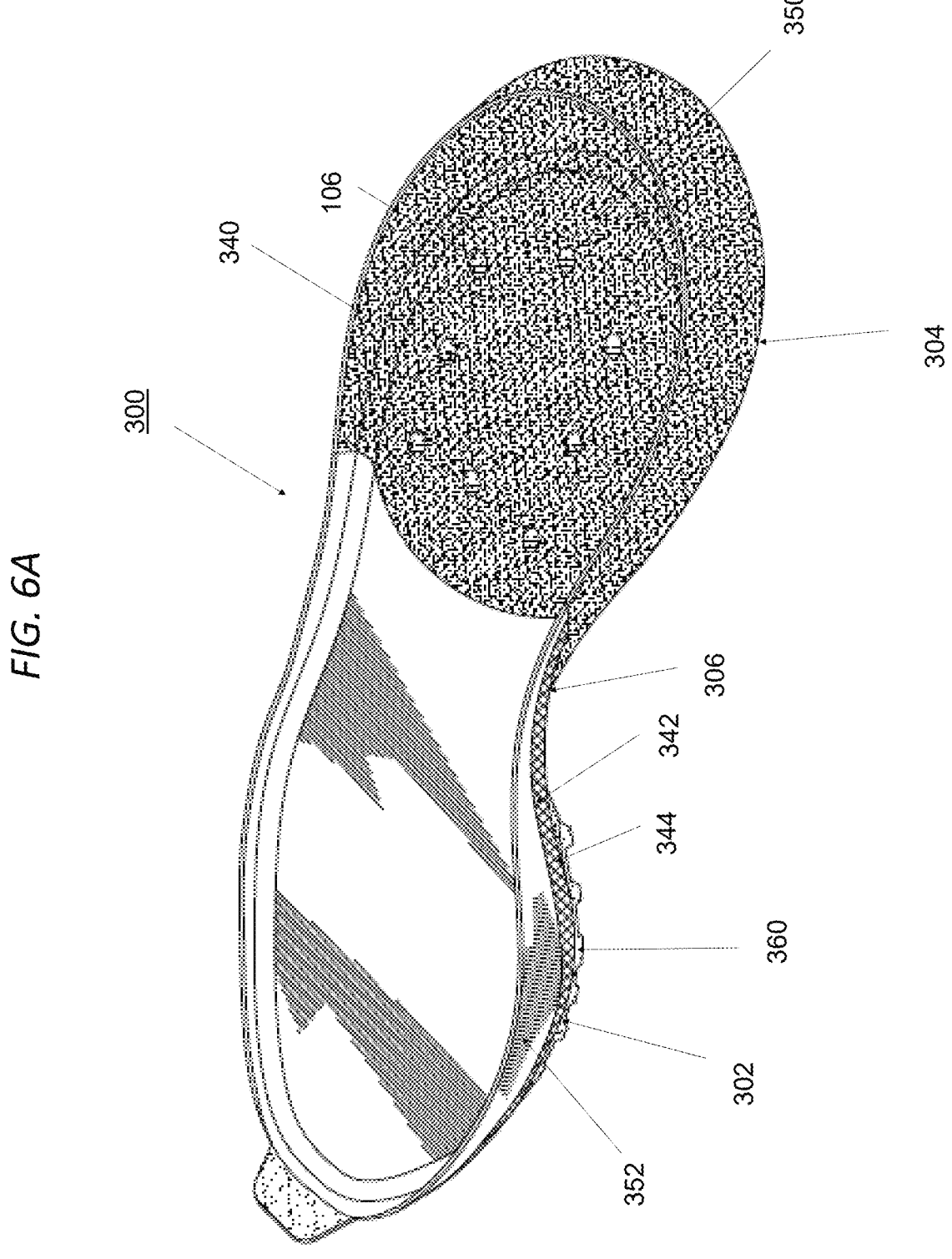
FIG. 6A is a perspective view of a composite sole that includes an expanded polymer material.
Figures 6B, 6C:
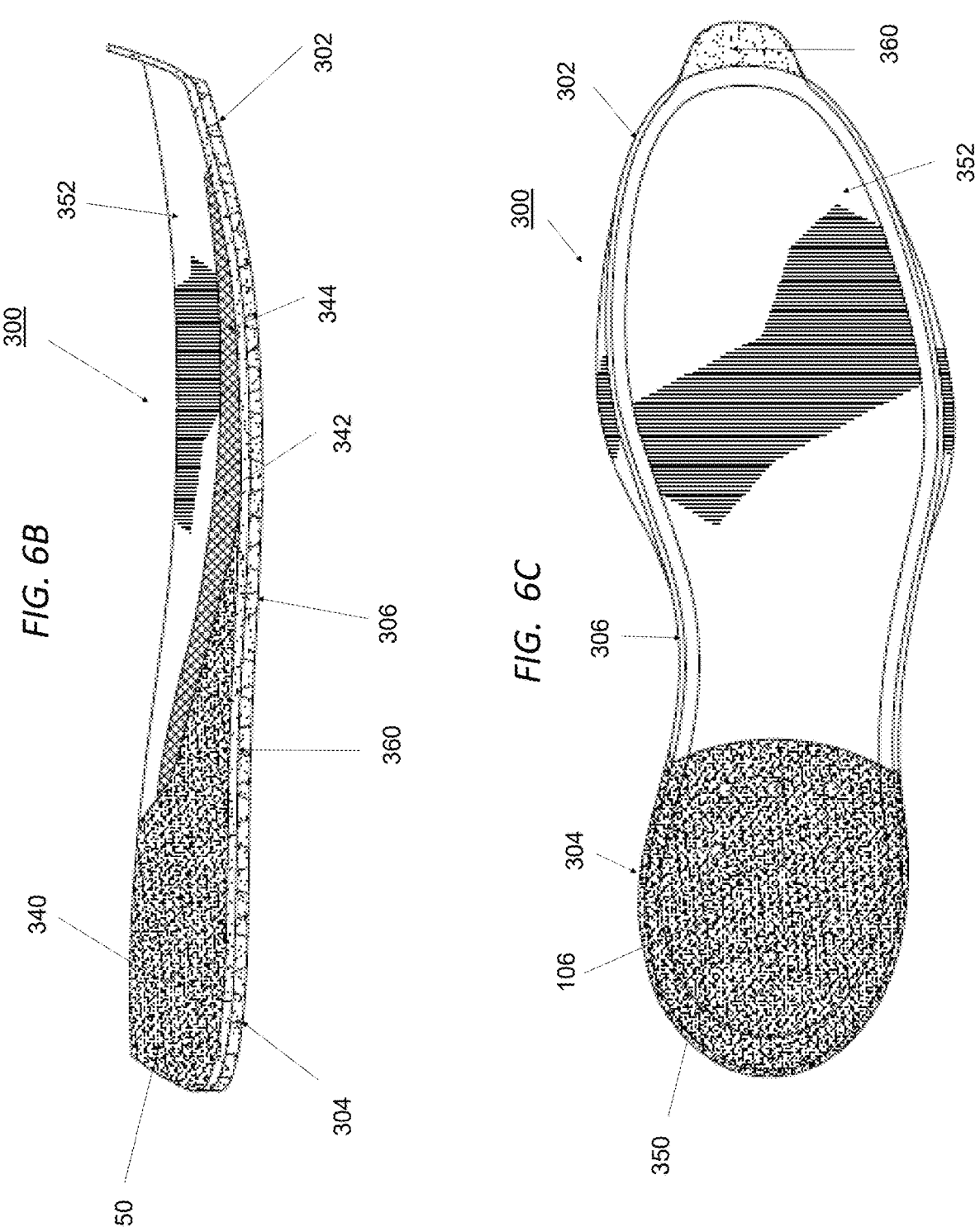
FIG. 6B is a side view of the composite sole of FIG. 6A.
FIG. 6C is a top view of the composite sole of FIG. 6A.

The rigid plate may provide support and a spring force during a walking or running gait by reducing the flexion of the SCF-expanded polymer material. In one preferred embodiment, at least one rigid plate 342 is positioned in or near the midfoot portion 306 and forefoot portion 302 of a sole 300. Sec FIGS. 6A and 6B. The rigid plate may have an elongated structure with a flat planar top and/or bottom surface. The plate may have an overall curved structure configured to provide a spring force return after a foot strike. The rigid plate may encompass a wide area or be localized in certain areas. The rigid plate may have elongated arms that extend along a portion of the lateral and/or medial peripheral sides of the midsole such as the rigid plates 442 shown in FIGS. 7A-7F. The rigid plate or a combination of rigid plates may also extend in a medial to lateral direction across the midsole.

In a preferred embodiment as shown in FIGS. 7A-7F, two rigid plates 442 with convex curvatures may be located on the medial and/or lateral peripheral sides between the top layer 430 and bottom layer 432, each made with SCF-expanded polymer material used to make almost the entire sole 400. The exterior edges of each plate may comprise a vertical wall 444 that is configured to be adjacent to a portion of the side-wall of the midsole. See also the vertical wall 344 of the rigid plate 340 in FIGS. 6A and 6B. Each rigid plate may comprise flat arms sandwiched between the two layers 430, 432 with arms 446 extending in the longitudinal direction of the sole, and an arm 448 extending in a direction that is medial to lateral of the midsole. The arm 448 may extend across a portion of the metatarsophalangeal joint line of a user's foot.

Hybrid Soles. A sole may comprise two or more materials, where an SCF-expanded polymer material may be used in one area of the sole and a non-SCF-expanded material is used at another location. In one exemplary embodiment as shown in FIGS. 6A-6D, the SCF-expanded material may form the portions of the heel area 304 of the sole 300 that is attached and to one or more polymer based materials, such as but not limited to injection molded EVA, Hytrel, PEBA, and/or TPU located at the other regions. Such an embodiment may have the advantage of customizable physical properties, such as but not limited to hardness, among different regions of the midsole.

Further to the embodiment of FIGS. 6A-6D, the SCF-expanded polymer material 350 is co-molded with a pre-molded chemically foamed EVA based material 352 that forms portions of the midsole in the forefoot area 302 and midfoot area 306. In this embodiment, the chemically foamed EVA based material has a higher density and hardness, and a lower resiliency than the SCF-expanded polymer material. In this exemplary embodiment, the SCF-expanded polymer material comprises substantially the entire midsole layer of the heel area 304 as well as portions of the midsole area 306.

Figure 6D:
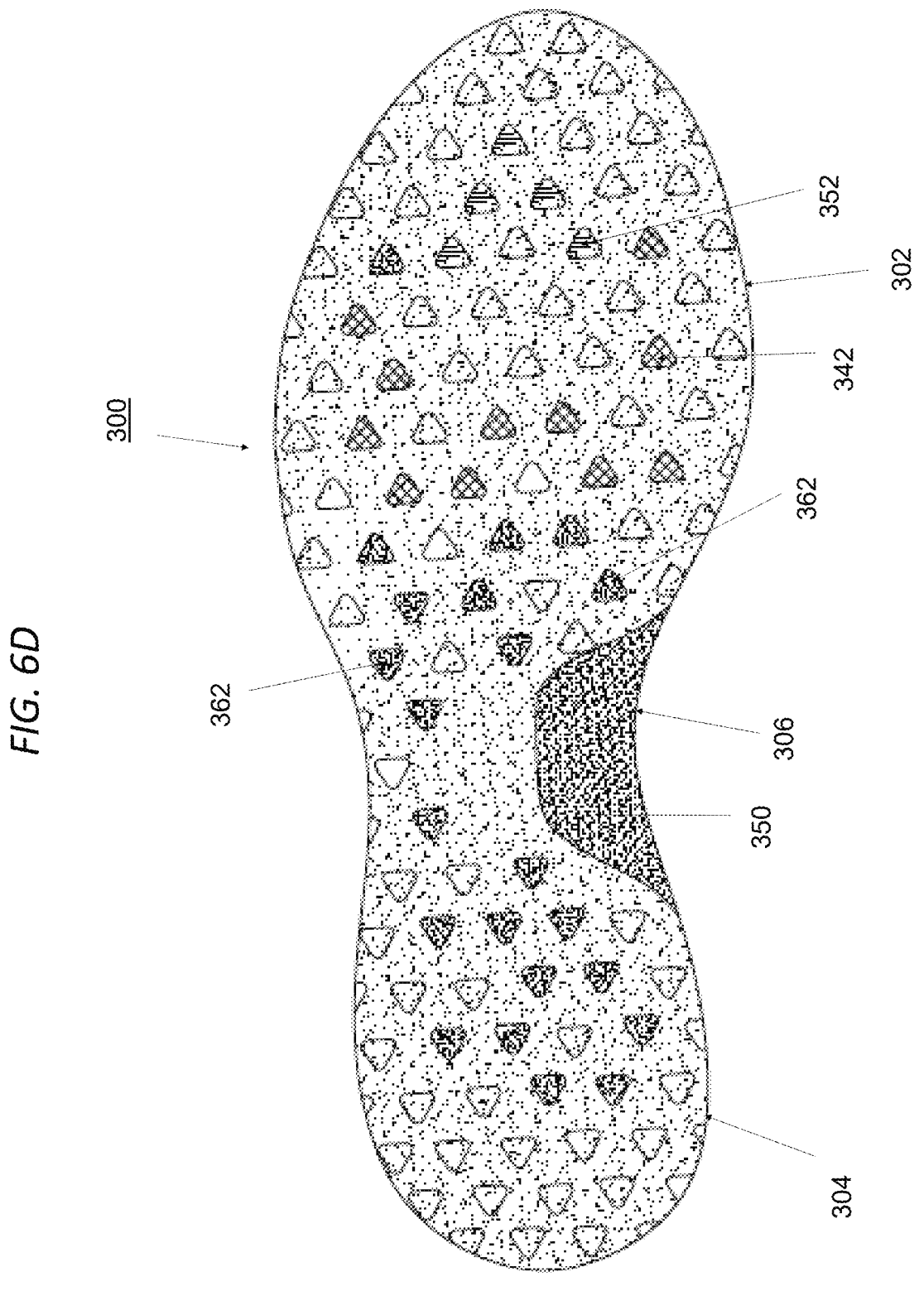
FIG. 6D is a bottom view of the composite sole of FIG. 6A.
Figure 7A:
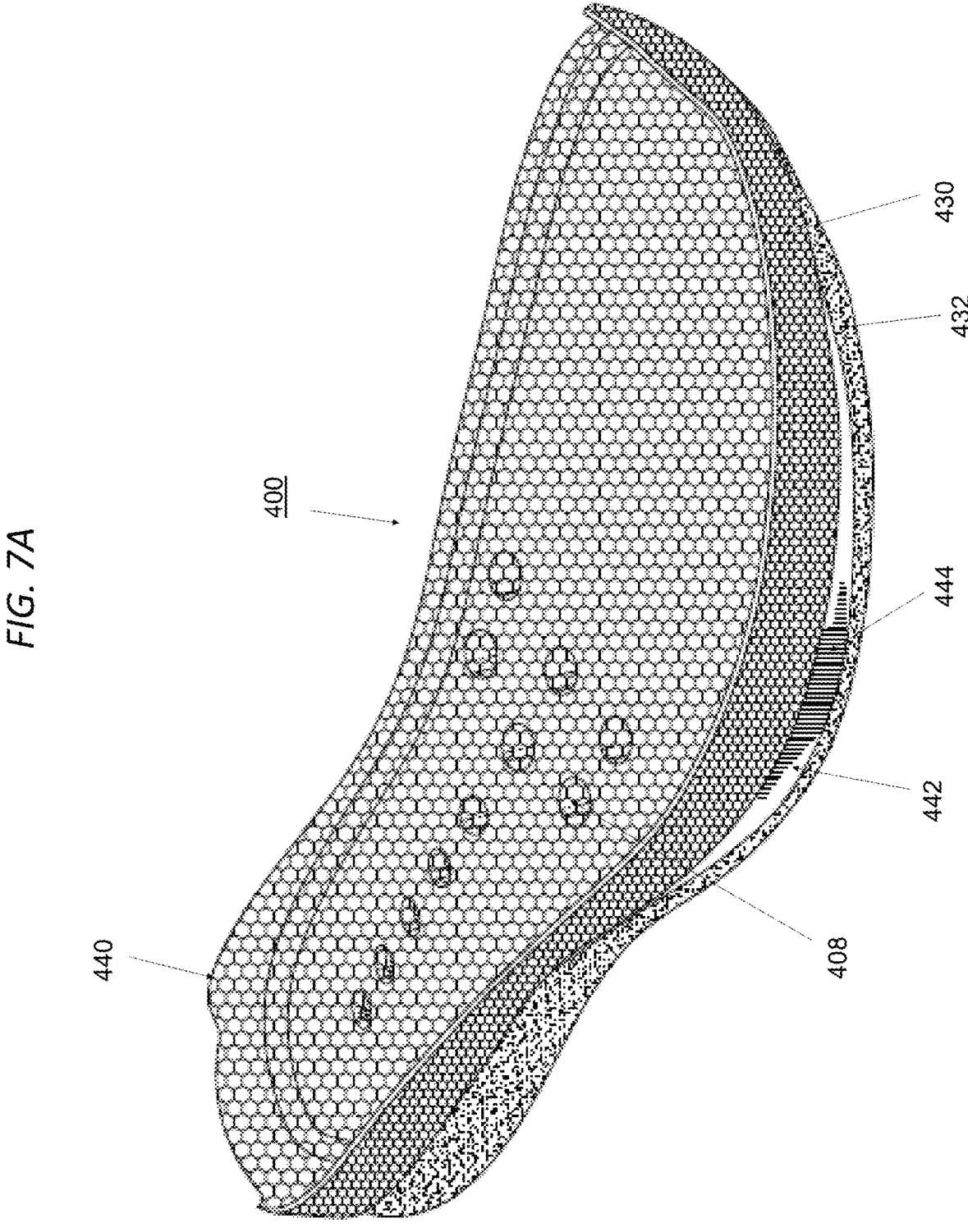
FIG. 7A is a perspective view of a composite sole that includes an expanded polymer material.
Figure 7B:
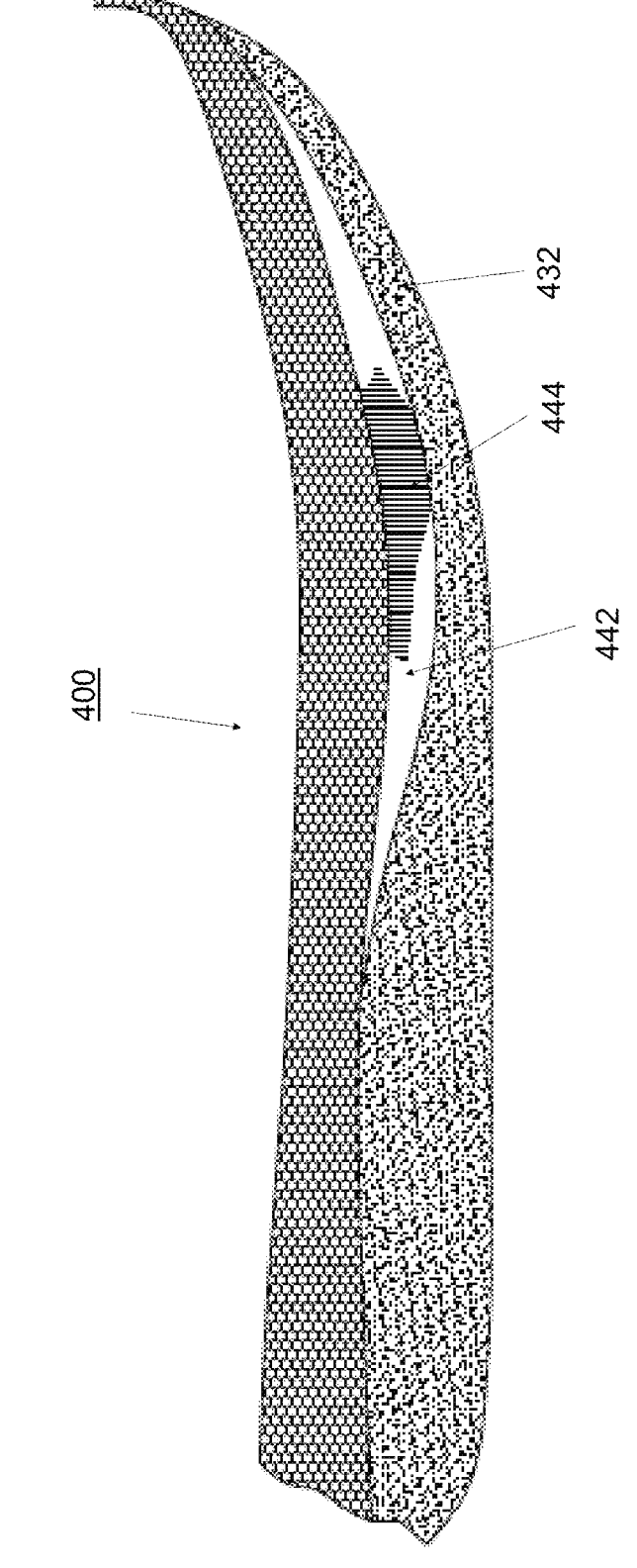
FIG. 7B is a side view of the composite sole of FIG. 7A.
Figure 7C:
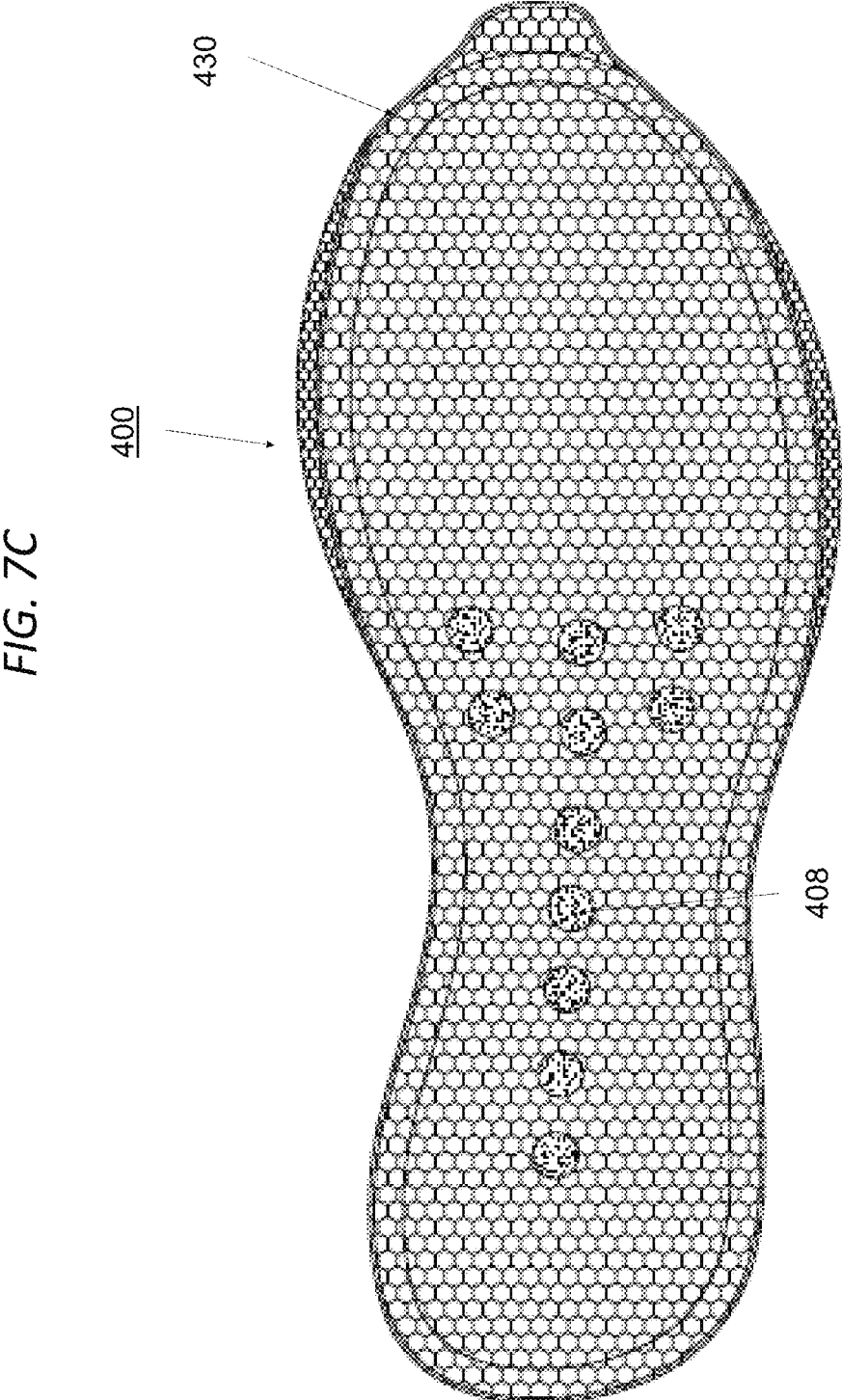
FIG. 7C is a top view of the top layer of the composite sole of FIG. 7A.
Figure 7D:
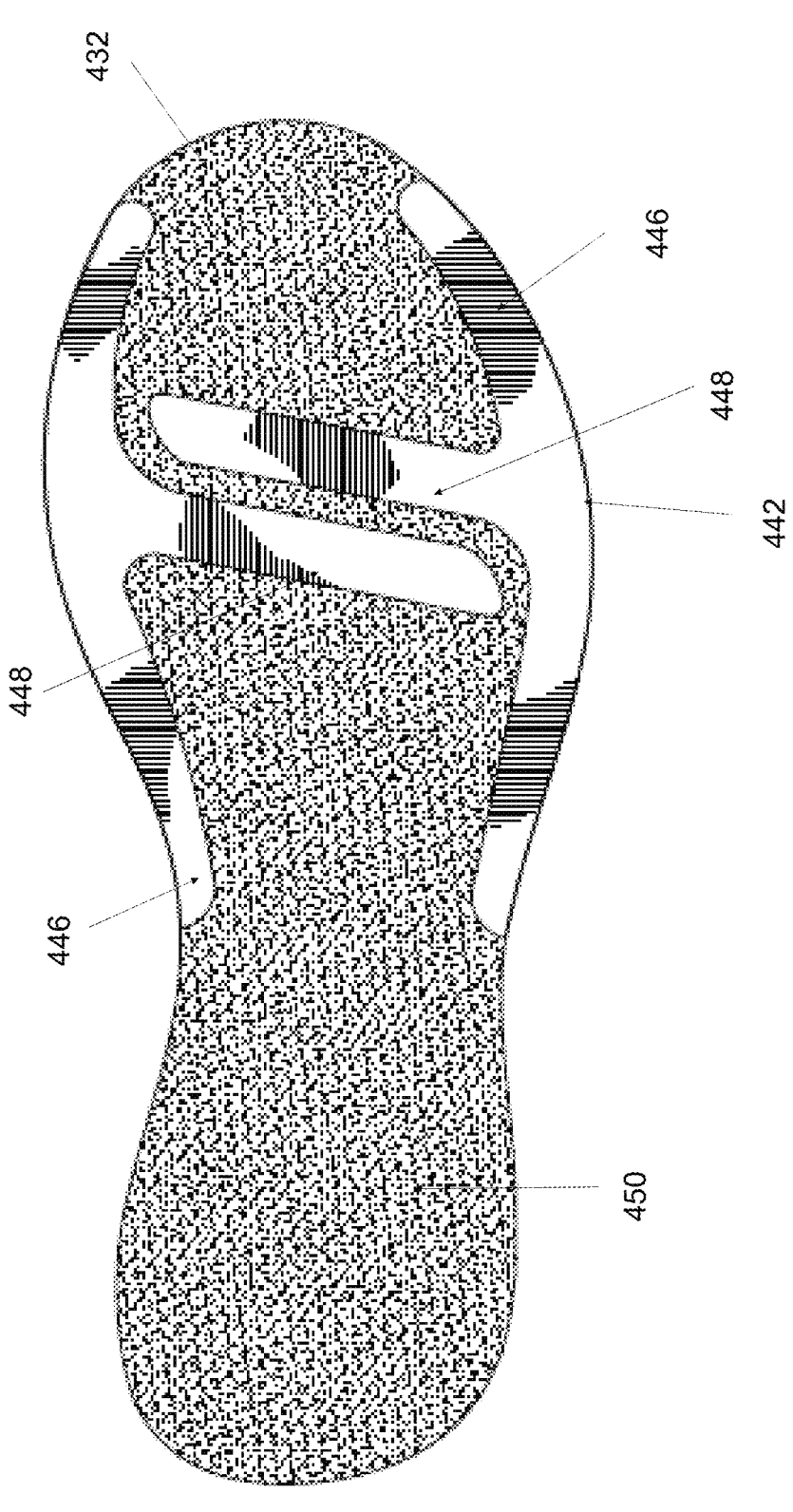
FIG. 7D is a bottom view of the top layer with bonded rigid plates of the composite sole of FIG. 7A.
Figure 7F:
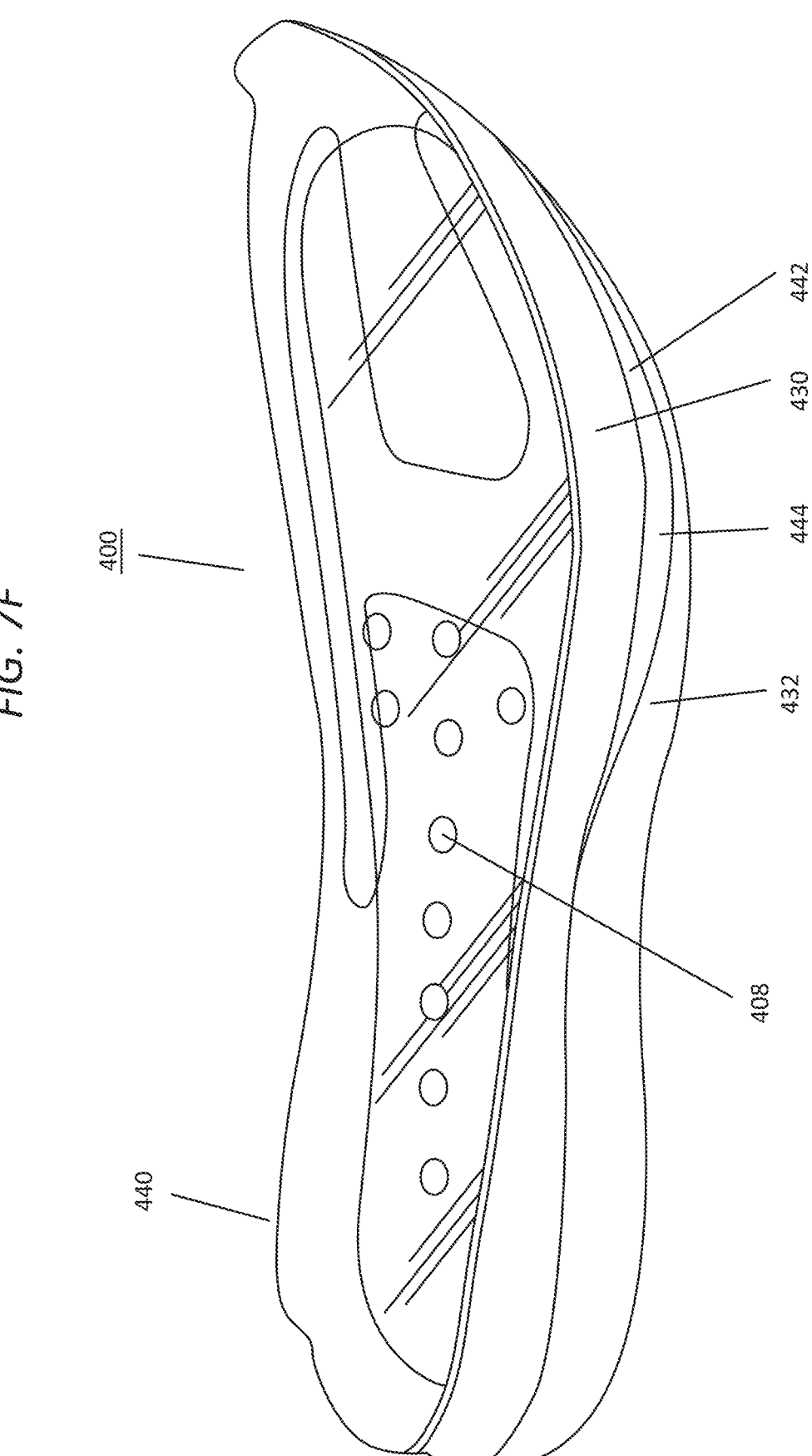
FIG. 7F is a photograph of the composite sole of FIG. 7A.
Figure 8A:
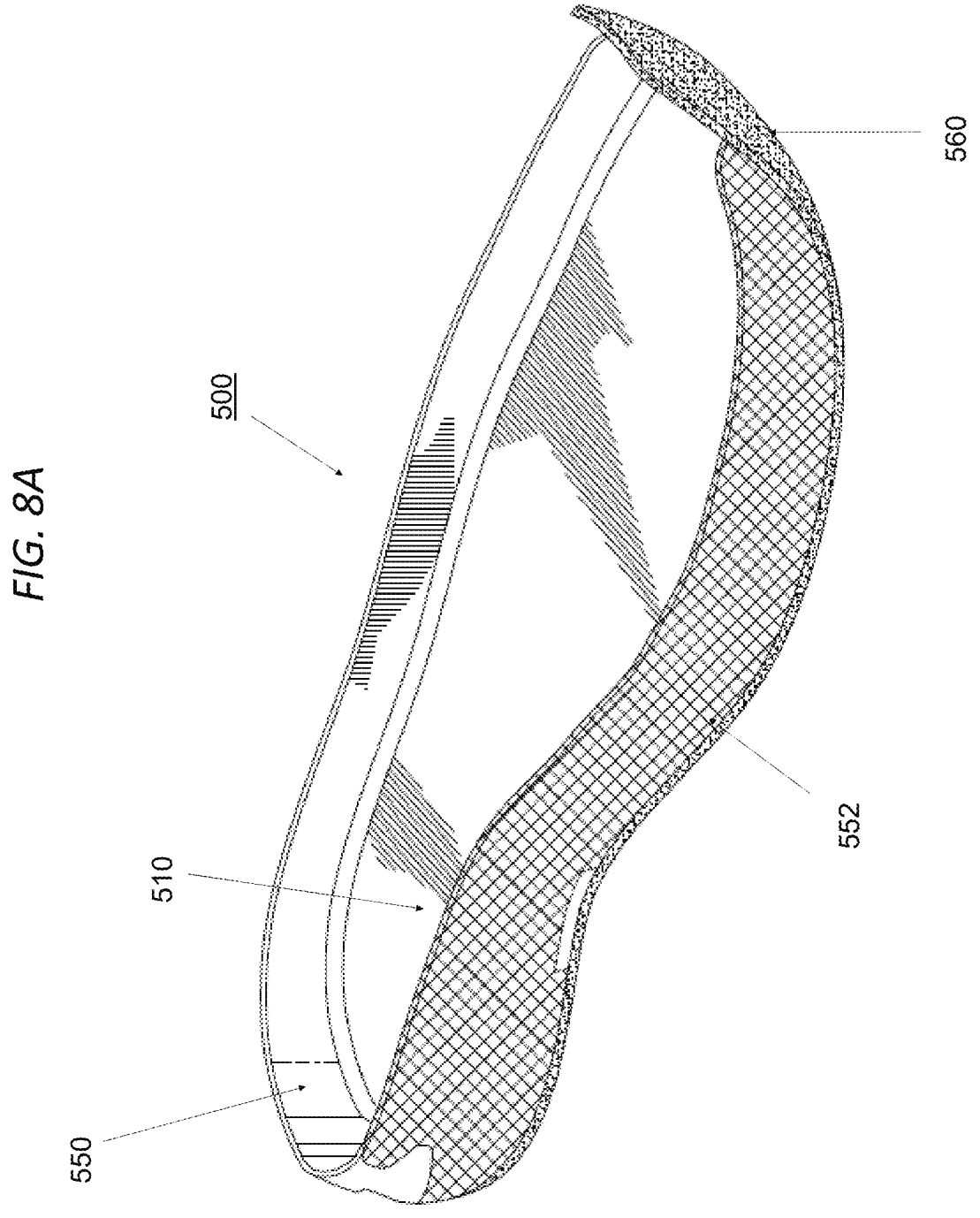
FIG. 8A is a perspective view of a composite sole that includes an expanded polymer material.
Figures 8B, 8C:
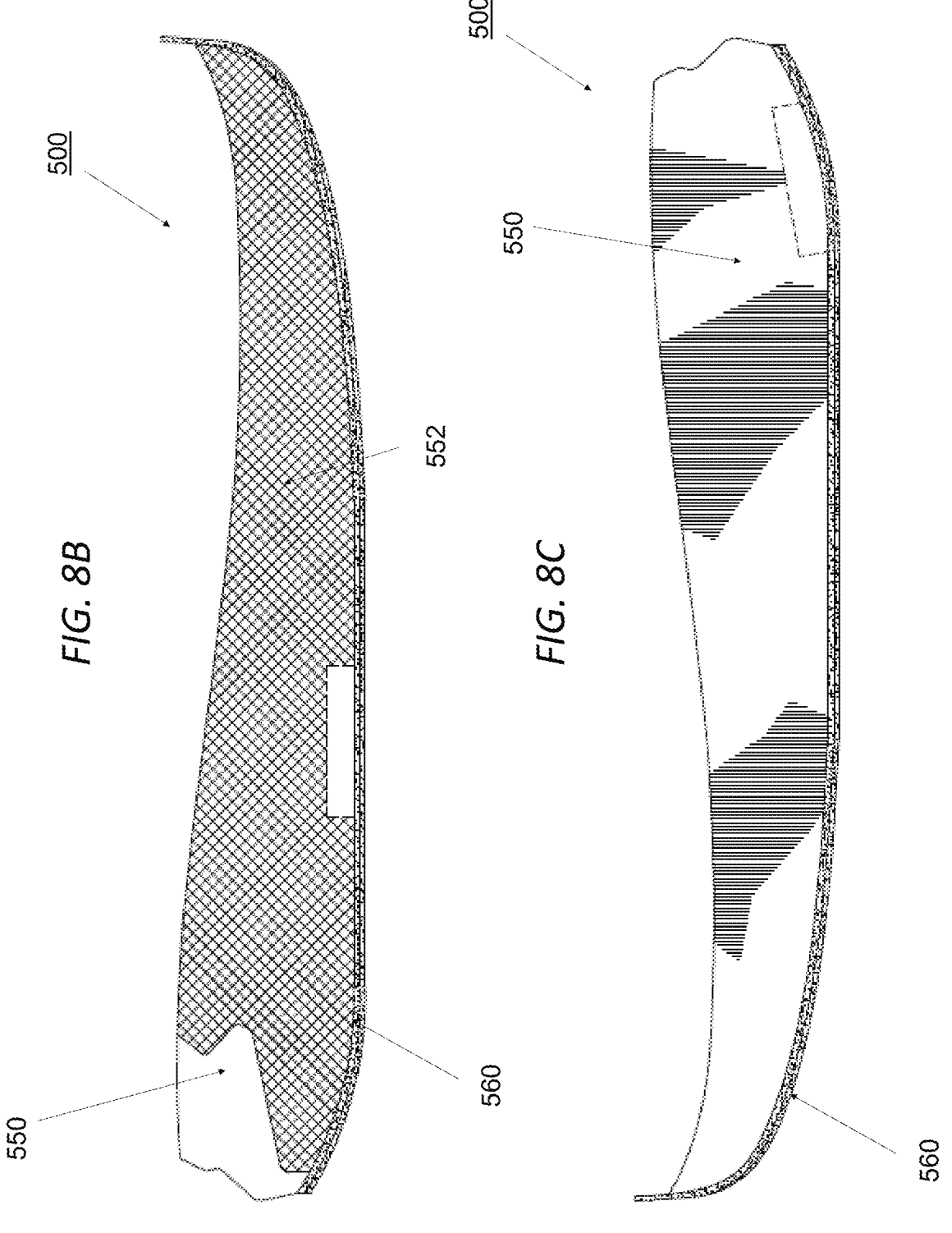
FIG. 8B is a side view of the medial side of the composite sole of FIG. 8A.
FIG. 8C is a side view of the lateral side of the composite sole of FIG. 8A.
Figure 8E:
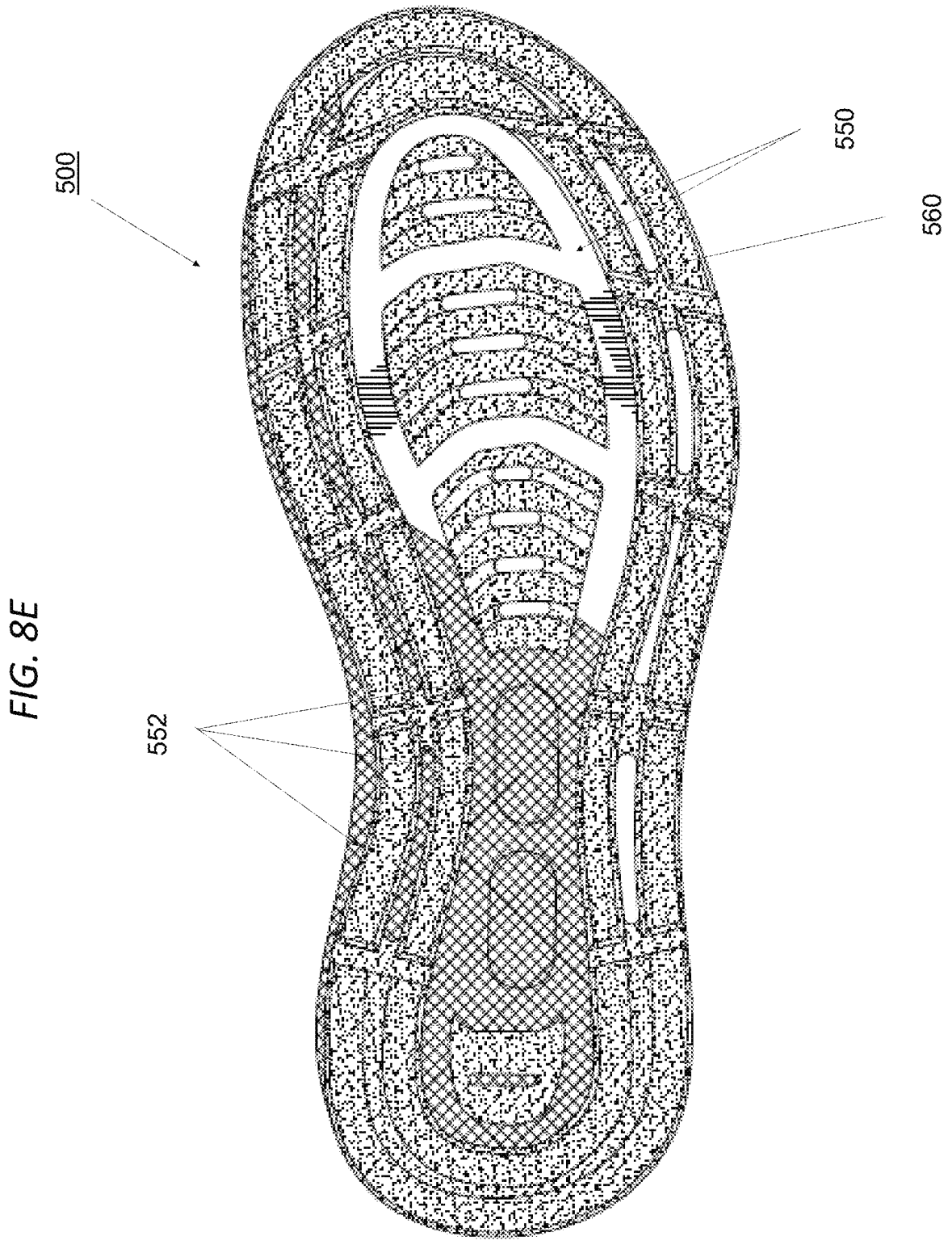
FIG. 8E is a bottom view of the composite sole of FIG. 8A.

The bottom layer of the SCF-expanded polymer material and chemically foamed layers is further bonded to a rubber material forming the outsole bottom layer 360. The outsole bottom layer may be of any material with a preference towards materials exhibiting greater hardness. The rubber bottom material may have apertures 362 or only cover a portion of the outsole bottom as shown in FIG. 6D. Possible reasons for incorporating the apertures in the rubber bottom layer or partial coverage by the rubber bottom layer of the outsole may include, but are not limited to, the reduction of the overall weight of the sole and/or to allow the components in the midsole, such as the SCF-expanded material 350, a rigid plate 342, and the chemically foamed EVA 352 to be visible for ornamental value.

The SCF-expanded polymer material 350 may include a plurality of apertures 106 formed during the initial molding of the polymer material prior to expansion. The benefits of incorporating a plurality of apertures formed during the initial molding may include proper curing of the polymer material and uniform SCF cell expansion as well as a reduction of the weight.

During the post compression mold step(s) to other components, the plurality of apertures may be eliminated or covered as a result of the melting of the SCF-expanded polymer material. In a preferred embodiment shown in FIGS. 8A-8E the composite sole 500 has an SCF-expanded polymer material 550 that is bonded to a chemically foamed polymer material 552 and a rubber outsole bottom layer 560. Prior to post-compression molding, but after SCF expansion, the SCF-expanded polymer material 550 is typically larger than the final molded product. An example fold difference in size between the SCF-expanded EVA based material before a post compression mold step and after the post compression mold step is approximately 1.3 to 1.5 times. With the presence of excess material, post compression molding of the SCF-expanded polymer material 550 may be designed to cause either the apertures to be completely filled or covered by molten SCF-expanded polymer material formed during the compression molding process. In instances where the apertures were covered by molten polymer material, a hollow space may still be present within the SCF-expanded polymer material. This elimination and/or covering of the apertures may improve the bonding score to other components wherein the covered surface is substantially devoid of apertures. In the exemplary embodiment of FIGS. 8A-8E, a plurality of apertures (not shown) was introduced into the top surface 510 of the polymer material prior to SCF expansion. Following SCF expansion and compression molding with other components, the apertures on the top surface 510 may be effectively covered from view by portions of the polymer material melted into or over the apertures. Without limiting other advantages of covering the apertures, a midsole top surface devoid of any apertures may improve the bonding score thereby enhancing the adhesion to a sockliner or portions of an upper.

Further to this embodiment, the SCF-expanded polymer material 510 may have translucent properties. With the ability of light to transmit through the SCF-expanded polymer material 510, opaque material may be visualized through the SCF-expanded material such as the chemically foamed polymer material 552 and a rubber outsole bottom layer 560.

Further to FIGS. 7A-7F, the sole 400 may have multiple layers of SCF-expanded polymer material. The sole 400 may have a first layer 430 and a second layer 432 of SCF-expanded material. Between the layers, one or more rigid plates 442 located between the two layers. The two layers 430, 432 maybe stock-fitted together with the rigid plates 442 sandwiched between. Portions 460 of the outsole bottom layer may comprise a more durable material such as rubber while other portions may be formed by the second layer 432. Post compression molding of the second layer 432 may form treads and grooves on the exposed outsole bottom portions 450 in order to improve the traction. Compression molding may also introduce cavities on the outsole bottom which may be used to insert ornamental features and logos. Compression molding may also increase the density of SCF-expanded foam regions subject to higher compression rates or molding conditions which give rise to rigid portions 440 that may provide added support to the sole 400. The first and second layers may be separately compression molded to add both textures, graphics, and/or grooves, as well as bond outsole bottom layers. Following this step, at least one rigid plate may be stock fitted to a first layer. The second layer may then be stock fitted to the first layer with the rigid plate being positioned between the two layers.

Apertures 408 may be included in the formation of the pre-expand polymer materials used to create the first and second layers or may be included after expansion. If the layers are of sufficient thickness, the apertures may be introduced at the initial molding of the pre-expanded polymer layers to improve at the least curing time and uniform SCF expansion. Apertures 408 may also be used to hold the layers if the composite sole 400 is compression mold with the two or more layers together through the insertion of molding spikes that may extend through the aperture of a first layer and into the material of the second layer position further away from the spiked platen. If the layers are not sufficiently thick to require apertures for curing or SCF expansion, then the apertures may be introduced into a first layer after formation of the pre-expanded layers or after SCF expansion prior to a compression molding of the composite layers.

Further to this embodiment, the SCF-expanded polymer material 410 may have translucent properties. With the ability of light to transmit through the SCF-expanded polymer material 410, opaque material may be visualized through the SCF-expanded material such as the rigid material 442 and a rubber outsole bottom layer 460. See FIG. 7F.

In another exemplary embodiment, a pre-expanded polymer material may be molded into a component for a slide sole 600 such as the example shown in FIGS. 9A-9F. The SCF-expanded polymer material 650 may comprise the formation of textures, graphics, ridges or grooves such as features 652 added to the top surface 664 of the slide sole 600. The SCF-expanded polymer material 650 may also comprise an indented region on any area of the slide sole capable of bonding to an upper such as the midsole periphery 670. An upper may be co-molded or bonded to the slide sole 600 after the SCF expansion of the polymer material. Any textures, graphics, grooves, indentations, or other molded features may be formed after SCF expansion of the polymer material. The SCF-expanded polymer material may have an ASTM D2240 Asker C hardness value ranging from 44-52 to form a slide sandal. Further to this embodiment, a rubber layer or any material preferable made of durable material may be co-molded or bonded and form the outsole bottom 660.

Figure 9A:
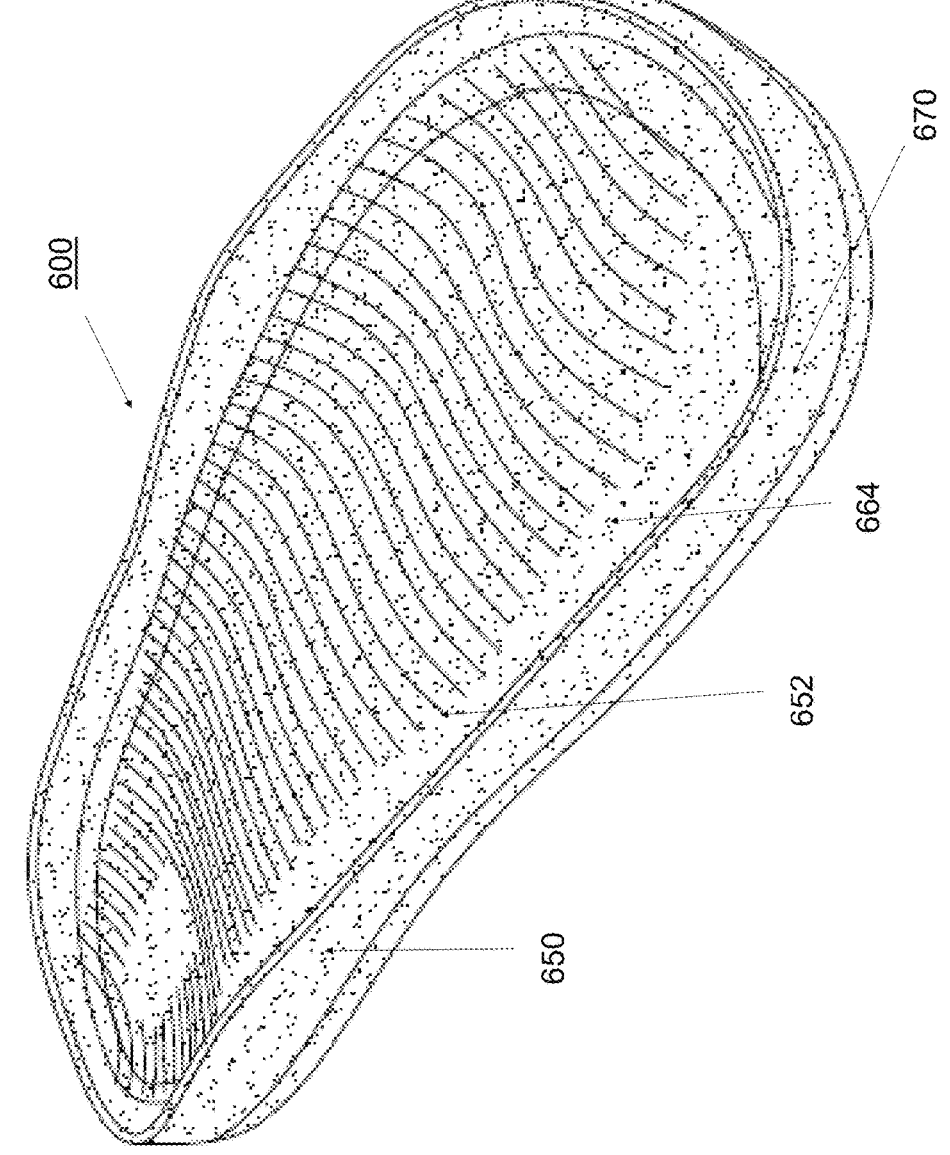
FIG. 9A is a perspective view of the slide sole.
Figures 9B, 9C:
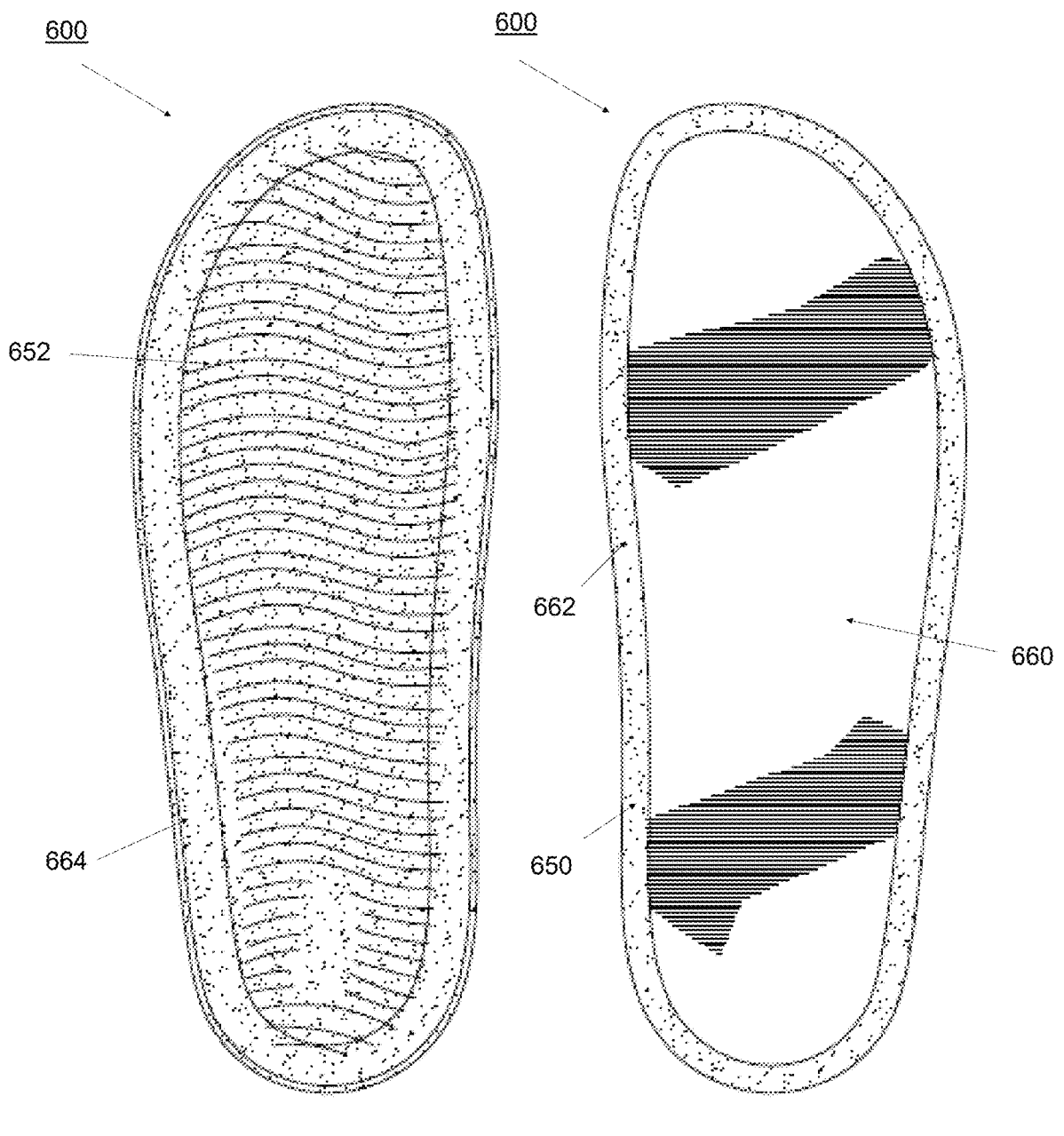
FIG. 9B is a top view of the slide sole of FIG. 9A.
FIG. 9C is a bottom view of the slide sole of FIG. 9A.
Figure 9D:
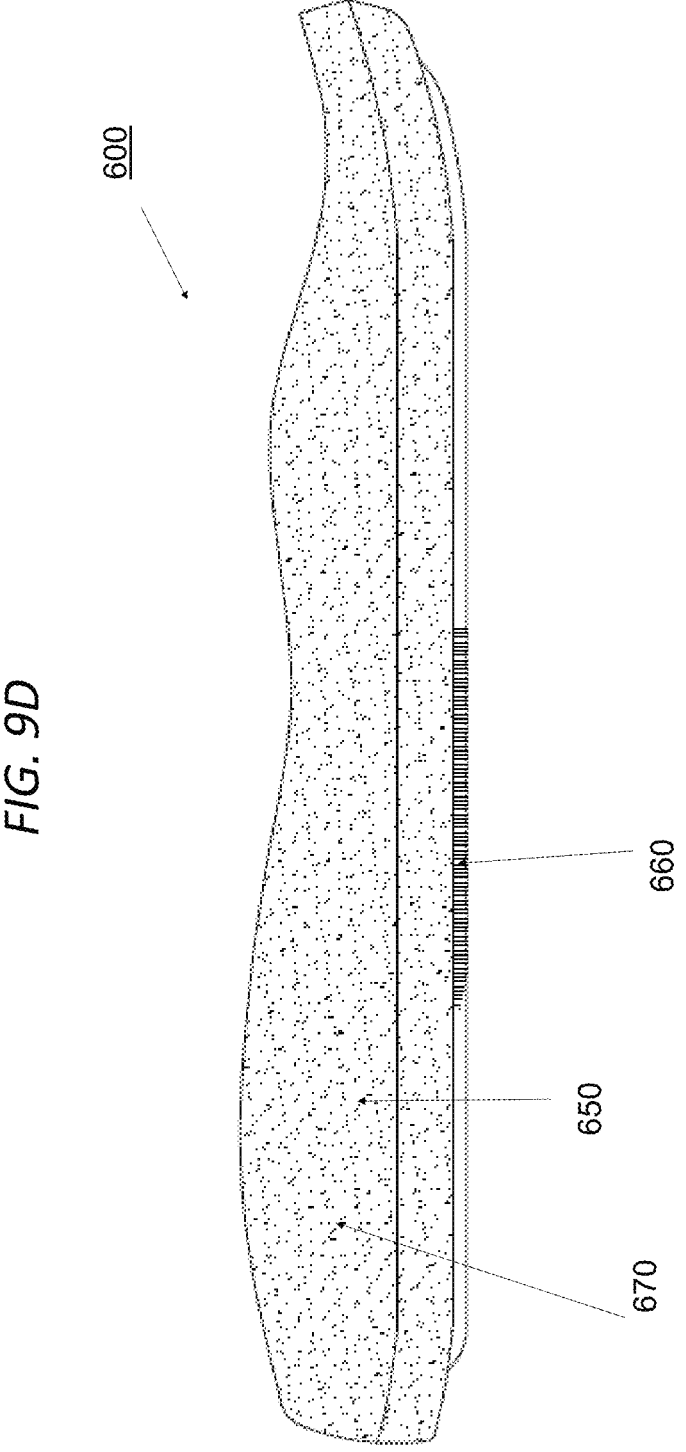
FIG. 9D is a side view of the slide sole of FIG. 9A.
Figure 9E:
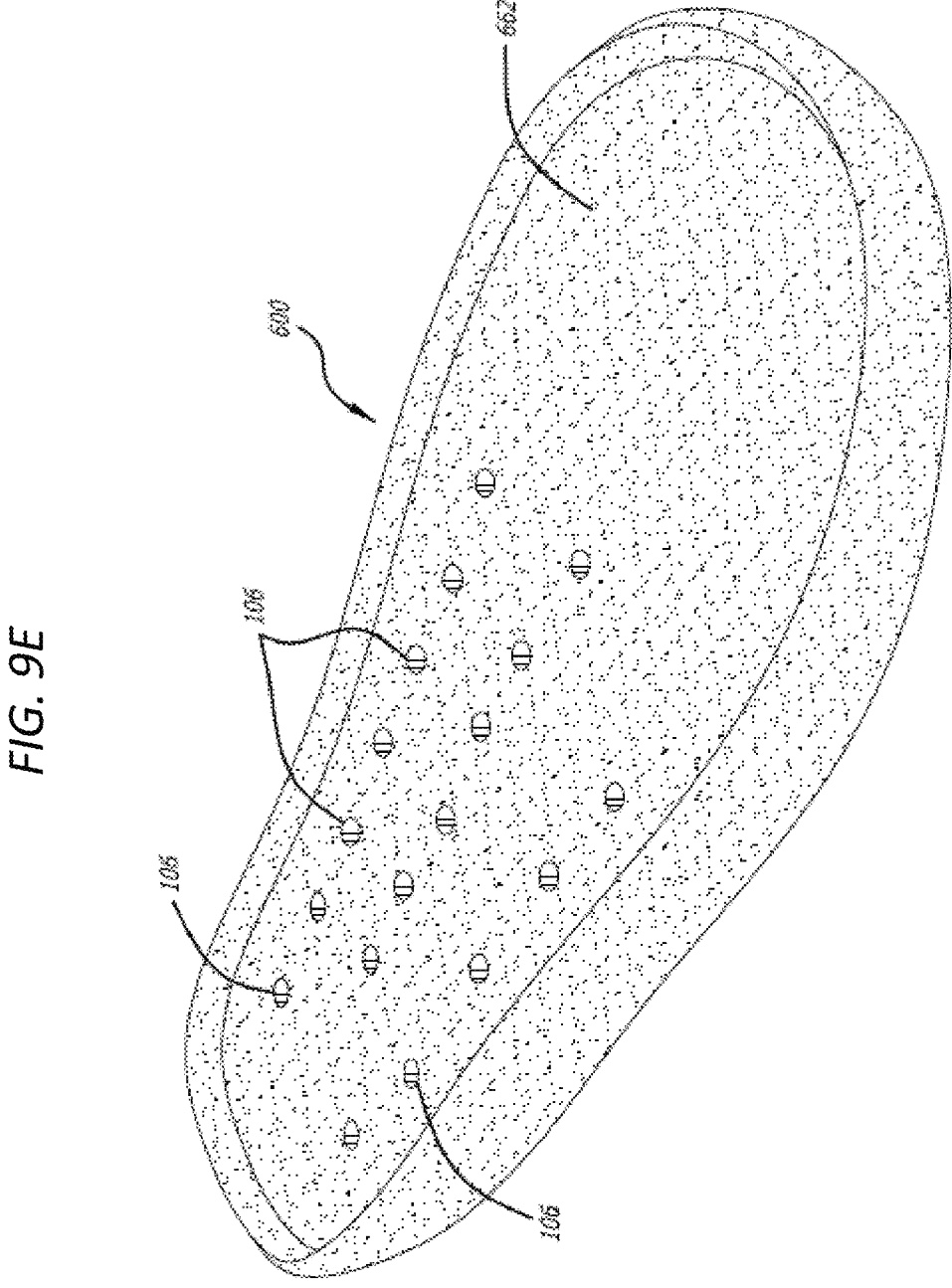
FIG. 9E is a bottom perspective view of the slide sole of FIG. 9A without the outsole component.
Figure 9F:
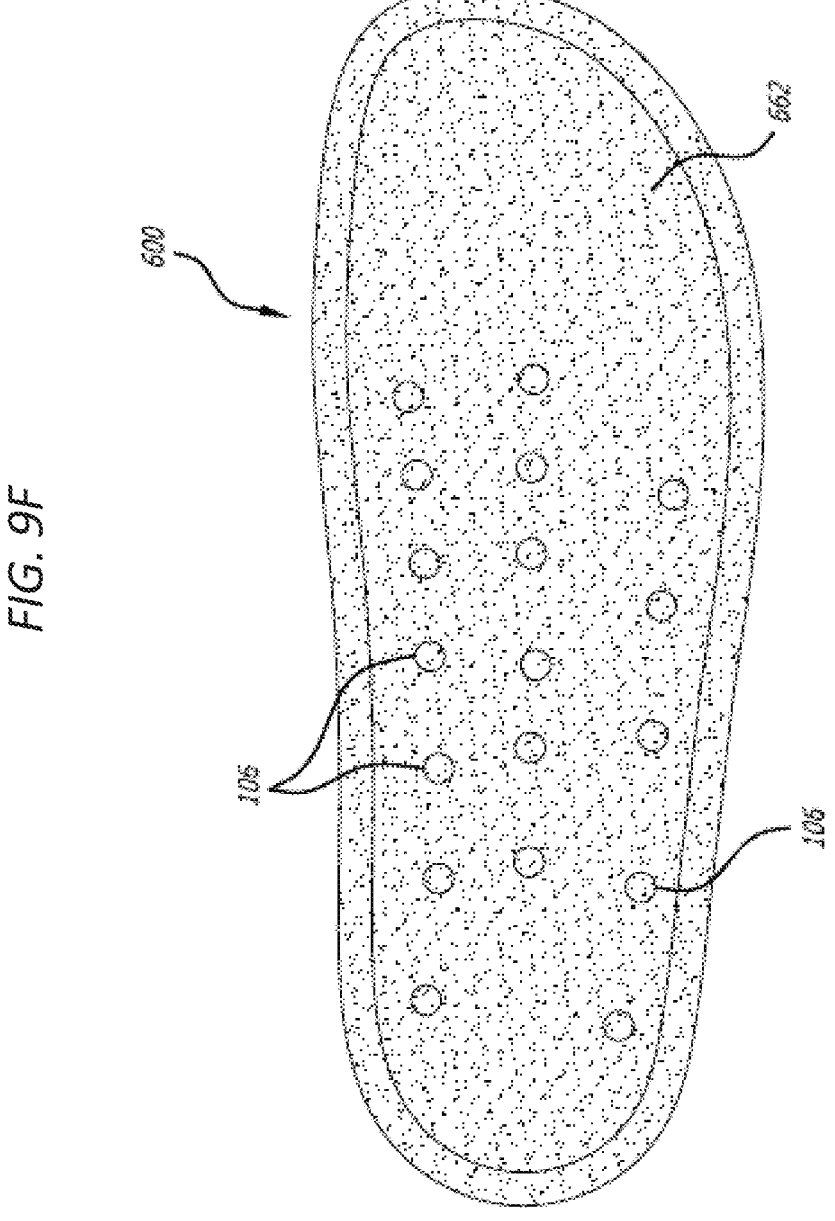
FIG. 9F is a bottom view of the slide sole of FIG. 9A without the outsole component.

Further to this embodiment, the pre-expanded polymer material that forms the midsole 650 may have apertures for proper curing and uniform SCF expansion. The apertures may be located on any surface. In one preferred embodiment shown in FIGS. 9E-9F, apertures 106 may be located on the bottom surface 662 of the polymer material rather than the top surface 664 which may interfere with the feel to the user's foot. The apertures 106 on the bottom surface 662 may be covered by an outsole bottom layer 660 as depicted in FIG. 9C. In an alternative embodiment where apertures are included on the top surface of the slide prior to SCF expansion, the apertures may be retained in the final sole, covered or filled by molten SCF-expanded polymer material during in a post compression step, or covered by a sockliner or insole which the sockliner or insole may also be composed of SCF-expanded material.

In another embodiment of a sole 700 shown in FIGS. 10A-10D, a first SCF-expanded polymer material 750 forming at least a portion of the sole 700 may also have at least one midsole cavity 780. A drop-in component 790 may be configured to fit within the cavity 780. The drop-in component 790 may be a second SCF-expanded polymer material 752. In a preferred embodiment, the drop-in component 790 may have a lower hardness, lower density, and/or higher resiliency from the first SCF-expanded polymer material 750.

Sockliners, Insoles, and Inserts. SCF-expanded polymer materials having any cushioning properties or structural properties may be used to yield the desired cushioning and support in selected areas of the sole. Further to FIGS. 10A-10C, a second SCF-expanded polymer material 752 may form a drop-in component 790, such as a midsole insert and/or a sockliner. See FIGS. 10A and 10B. The insert or sockliner would be configured to fit within one or more cavities 780 of a midsole such as the first SCF-expanded material 750 which serves as both the midsole and outsole. The midsole may be constructed of any material which may include at least the first SCF-expanded polymer material in part or as a whole. The second expanded polymer material piece 752 may have a lower density, lower hardness, and/or higher resiliency than the midsole material if more cushioning is desired. For example, a midsole insert or sockliner may have an ASTM D2240 Asker hardness C value of 20-35 whereas the midsole may be constructed of a first SCF-expanded EVA based material having an Asker C hardness value of 44-52. The sockliner may have a density of 0.14 to 0.15 g/cm$^3$ and a resilience % (min) of 65-66. The second SCF-expanded polymer material may be removable from the midsole or bonded to the midsole by compression molding or adhesive. In an alternative embodiment, the insert or sockliner may be a composite having multiple components or regions of varying densities, hardness, and resiliency. Other embodiments may have multiple regions in the midsole or a sockliner that are configured to fit multiple drop-in components that may require different levels of support and cushioning. A plurality of inserts may be configured to fit within multiple midsole cavities and may have varying densities, hardness, and resiliency depending on its location relative to the user's foot.

CF-expanded materials used in sockliners or insoles with equivalent hardness to the SCF-expanded materials are lower in density, but also exhibit a lower resilience. For example, CF-expanded EVA with an Asker C hardness of 25-42 may have a density of 0.1 g/cm$^3$ with a resilience % (min) 50. Further to these exemplary CF-expanded EVA, the compression set (max) values are also typically higher as well, i.e. 70-80% as compared to 58-63%.

Figure 10A:
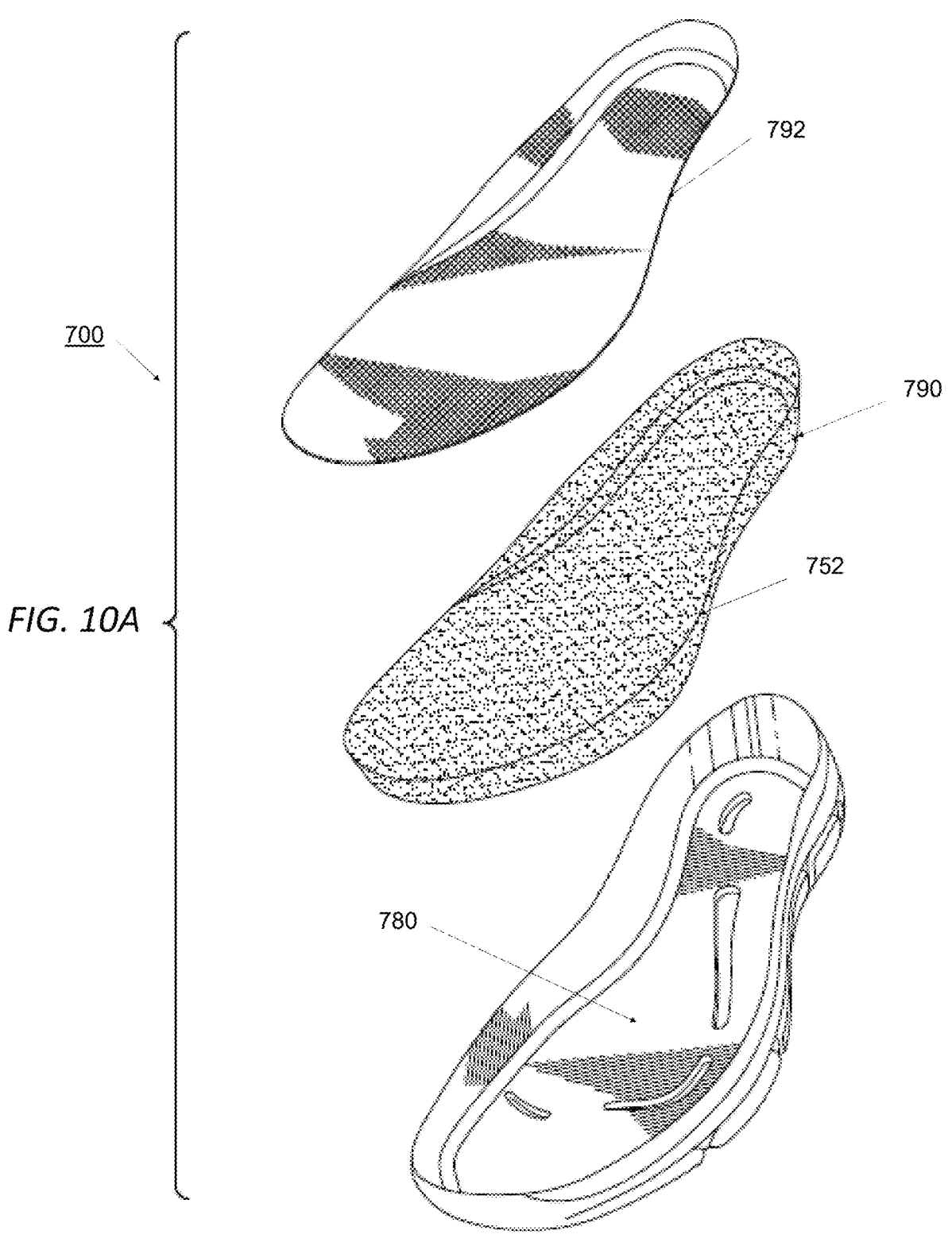
FIG. 10A is an exploded perspective view of the composite sole that includes an expanded polymer material.

The drop-in component 790 may be constructed from an SCF-expanded polymer material, such as but not limited to EVA and/or TPU. For embodiments including a sockliner, insert, and/or insole, the top surface of the SCF-expanded polymer material may be covered by an adjacent layer 792 of cloth or mesh as shown in FIG. 10A. Adjacent layer 792 may be bonded to the drop-in component 790 following SCF expansion of the second polymer material. The adjacent layer may also comprise of other materials, multiple layers, and/or structural components such as, but not limited to, gels, fluid-filled bladders including air-filled bladders, midfoot arch supports, shanks, and tensile fabric structures. Such components may provide the user with additional cushioning, structural support, or spring force.

Figure 10B:
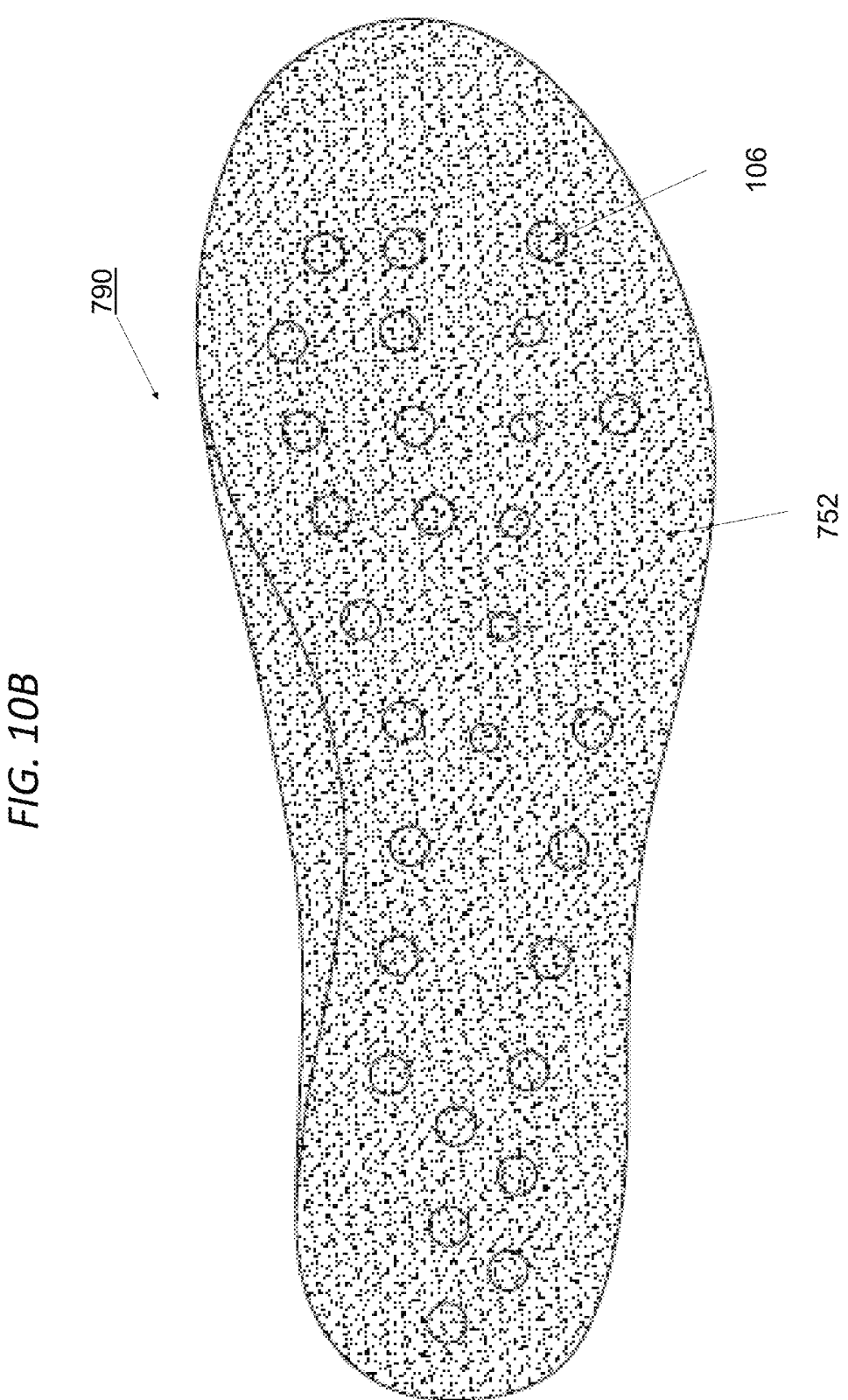
FIG. 10B is a bottom view of the drop-in component of the composite sole of FIG. 10A.
Figure 10C:
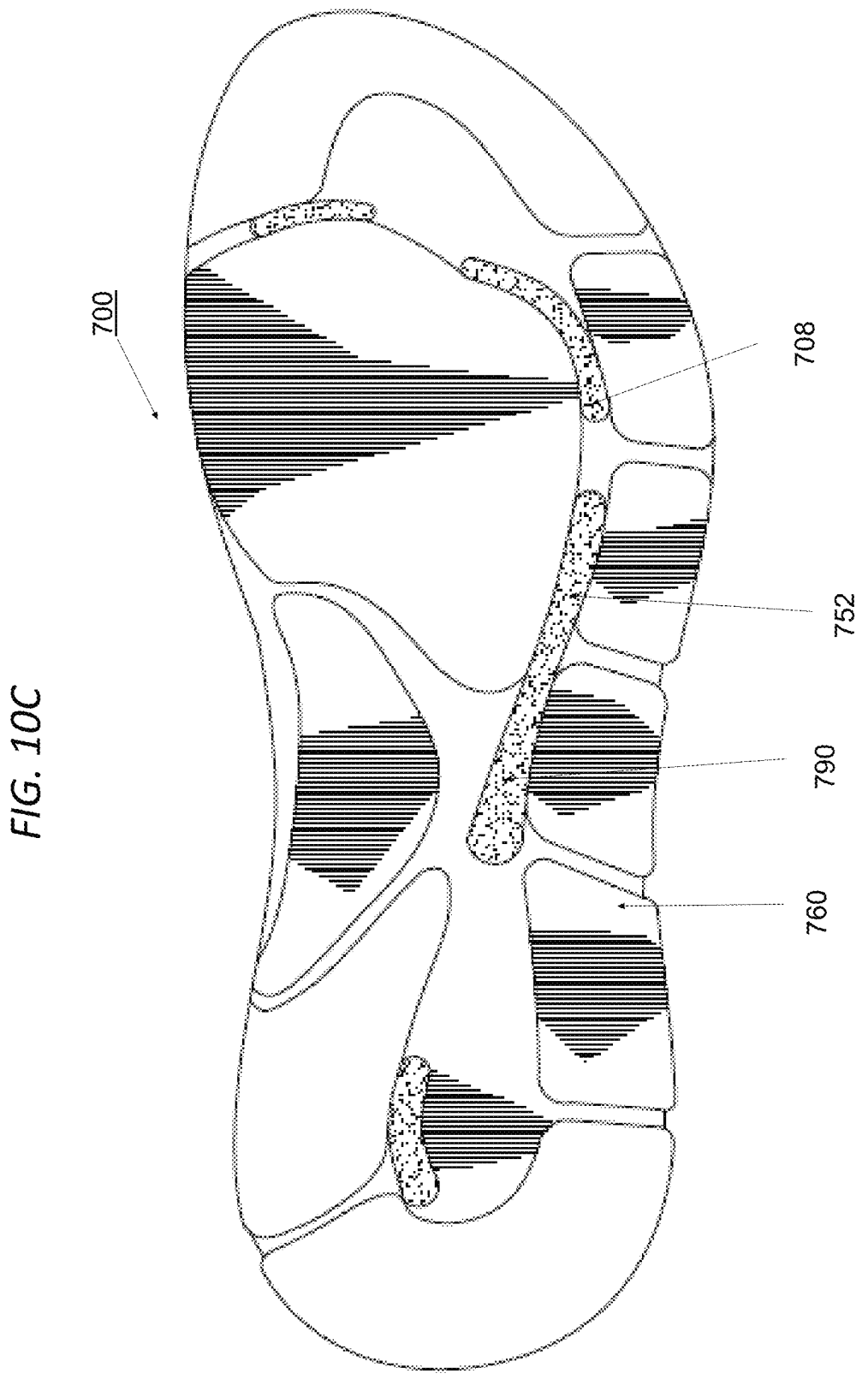
FIG. 10C is a bottom view of the composite sole of FIG. 10A.
Figure 11A:
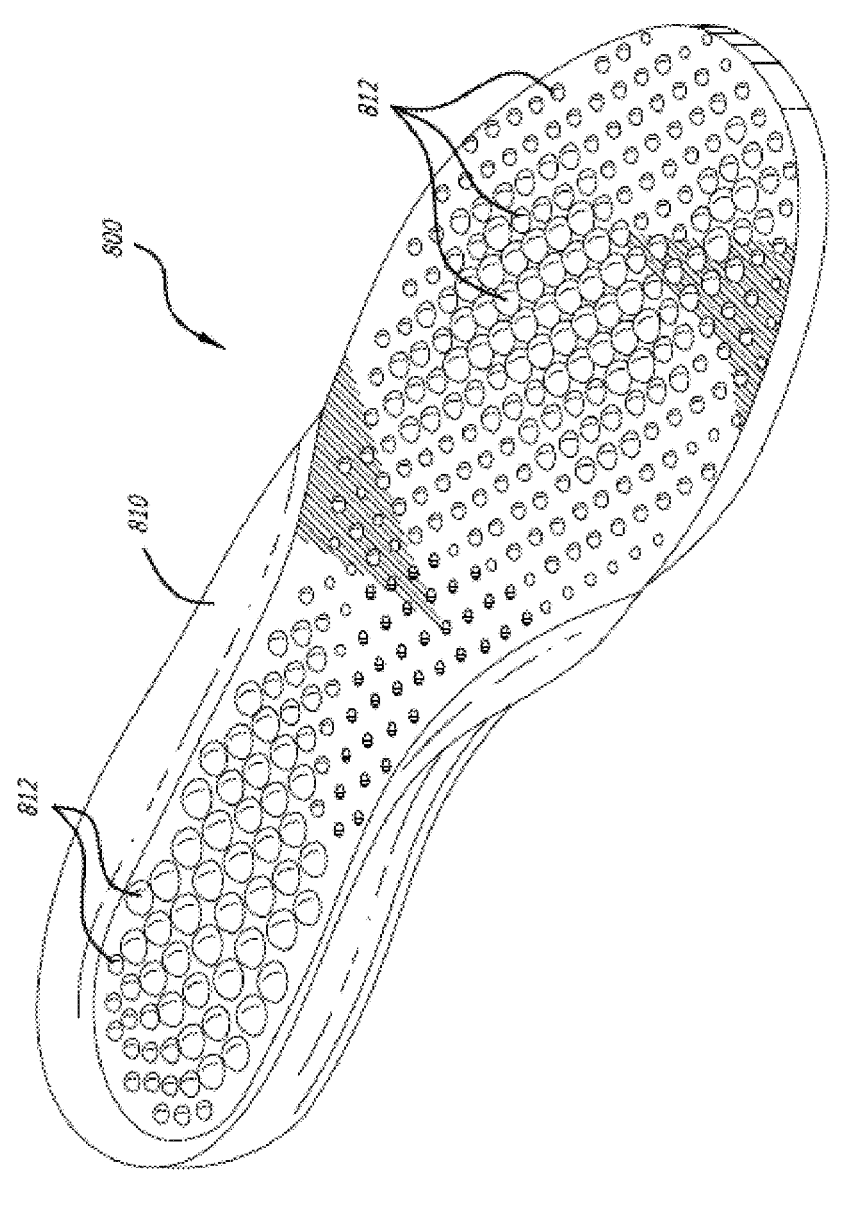
FIG. 11A is a top perspective view of an insole.
Figure 11B:
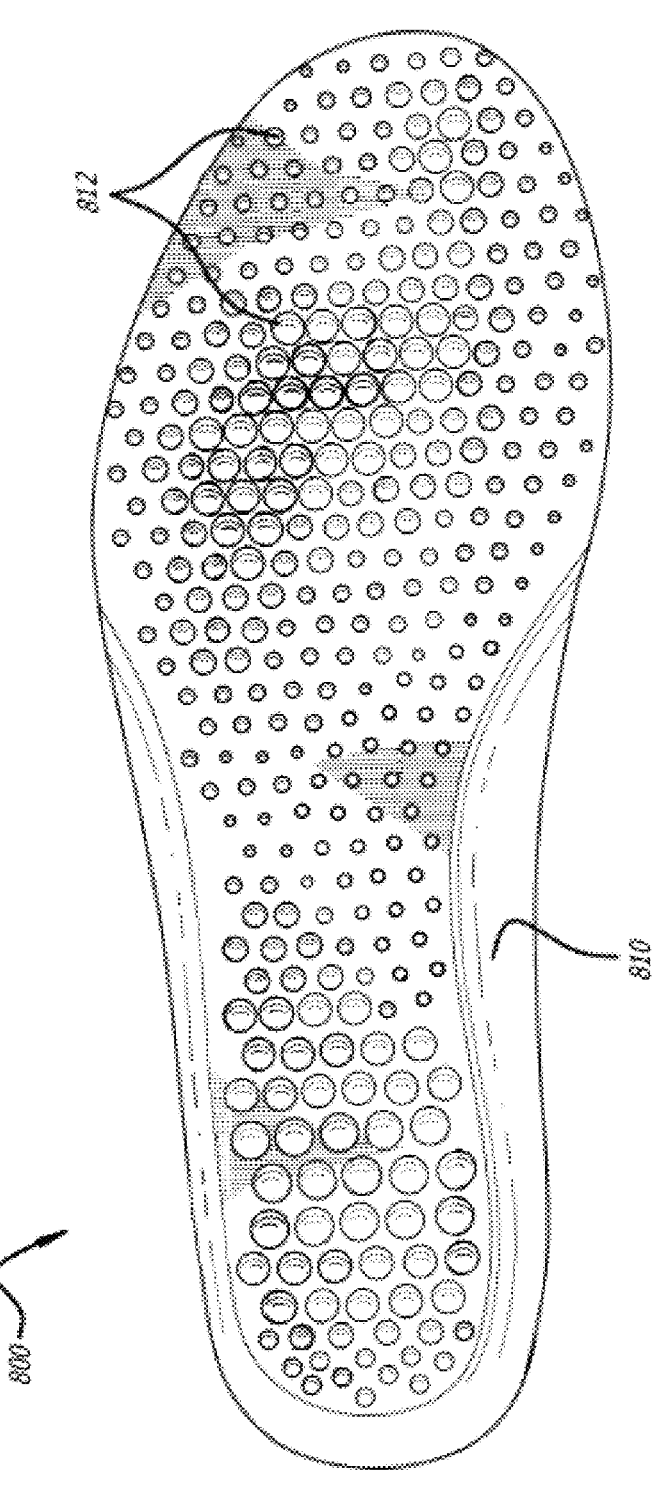
FIG. 11B is a top view of the embodiment of 11A.
Figure 12B:
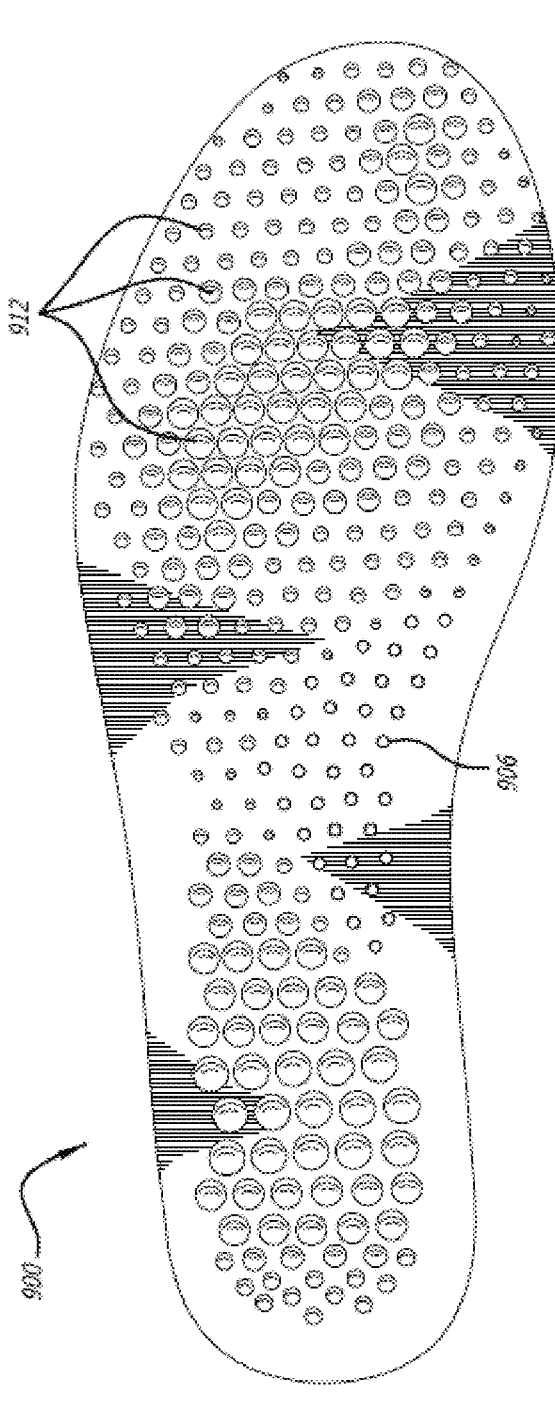
FIG. 12B is a top view of the embodiment of 12B.
Figure 12C:
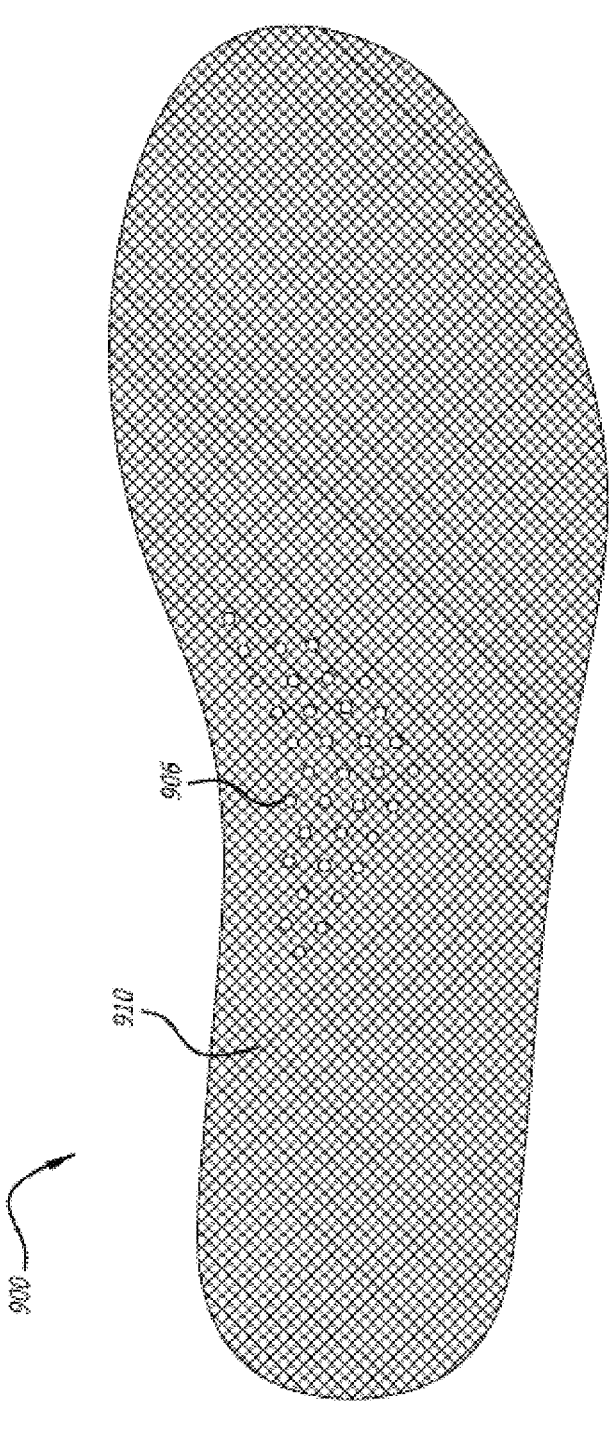
FIG. 12C is a bottom view of the embodiment of 12C.

Further to the exemplary embodiment in FIG. 10B, the drop-in component 790 may have apertures 106 which may be necessary for proper curing and uniform expansion of the second SCF-expanded polymer material 752. The apertures 106 may be spaced apart from each other. The apertures 106 may also extend a depth that does not exceed a safety gap. The apertures 106 may be located on the bottom surface of the drop-in component 790 such that the opposite surface is devoid of any apertures which may improve the bonding score to an adjacent layer. The outsole bottom 760 may also have patterned openings 708 or apertures such that the second SCF-expanded polymer material 752 is visible when viewing the sole 700 from the bottom as shown in FIG. 10C. Since the drop-in component 790 may be exposed to water and debris, the bottom surface of the drop-in-component 790 may be coated with a protective coating.

In another embodiment shown in FIGS. 11A-C and FIGS. 12A-C, the SCF-expanded polymer material such as EVA or TPU based material may be used as an insole 800. The insole may be first molded into shape and expanded by SCF. In the alternate, a polymer slab may be expanded and die-cut into shape. An example insole 800, 900 may have a plurality of hemispheres 812, 912 of varying thickness protruding away from the top surface 810, 910 of the insole at any region of the component. Further to this embodiment, hemispheres with greater thicknesses are positioned at the heel to midfoot portions of the insole component where such portions may be subject to higher compression forces, whereas hemispheres with smaller thicknesses are positioned in areas subject to lower compression forces. The inclusion of hemispheres provides increased cushioning for a better underfoot feeling. In a preferred embodiment of the insole, the insole 900 may have a plurality of apertures 906 such as, but not limited to, the midfoot arch portion. Such apertures may improve airflow to the foot. The hemispheres and apertures may be molded in the pre-expanded material or formed after SCF expansion such as using a compression mold.

Although the present invention has been described above by referring to particular embodiments, it should be understood that modifications and variations could be made to the sole or sole component without departing from the intended scope of the invention.

References

Klingender et al., *Handbook of Specialty Elastomers,* pg 345. CRC Press 2008.

Fink et al., *Handbook of engineering and specialty thermoplastics.* Volume 1, Polyolefins and styrenics, pgs. 187-188, Wiley, 2010.

K. Matyjaszewski et al., *Handbook Of Radical Polymerization,* pg. 301-330, Wiley-Interscience, 2002.

K. Matyjaszewski et al., *Handbook Of Radical Polymerization,* pg. 117-186, Wiley-Interscience, 2002.

K. Matyjaszewski et al., *Handbook Of Radical Polymerization,* pg. 339-341, Wiley-Interscience, 2002.

Rosato et al., *Plastic product material and process selection handbook.* Elsevier, 2004.

https://en.wikipedia.org/wiki/Polyolefin https://www.azom.com/article.aspx?ArticleID=1960 https://pslc.ws/macrog/mcene.htm http://digilib.k.utb.cz/bitstream/handle/10563/18679/theravalappil_2012_dp.pdf?sequence=1

Rapra Technology Limited, *European Plastics News. TPE 2000: a two-day conference held at Crowne Plaza Hotel,* Amsterdam, 6th & 7th March 2000. Rapra Technology Ltd. 2000.

https://en.wikipedia.org/wiki/Thermoplastic_elastomer https://www.accustandard.com/assets/Plastic_Add_Guide.pdf Alger, Mark, *Polymer Science Dictionary.* Springer Science+business Media Dordrecht, 2017.

Whelan, Tony, *Polymer technology Dictionary.* Chapman & Hall, 1994.

https://www.accustandard.com/assets/Plastic_Add_Guide.pdf https://en.wikipedia.org/wiki/Polymer_blendhttps://content.schweitzeronline.de/static/catalog_manager/live/media_files/representation/zd_std_orig_zd_schw_orig/002/067/296/97 80470714201_content_pdf_2.pdf Simon, George, *Polymer Blends and Alloys.* CRC Press. 1999.

Wilkes et al., *PVC Handbook 5 Plasticizers,* Hanser, 2005.

http://www.bpf.co.uk/plastipedia/processes/Injection_Moulding.aspx

Rosato et al., *Injection Molding Handbook.* Spring US, 2000.

*Engineered Materials Handbook Desk Edition.* ASM International, 1995.

Z. Tadmor et al., *Principles of Polymer Processing,* pgs. 811-816, Wiley-Interscience 2006.

https://en.wikipedia.org/wiki/Plastics_extrusion https://www.milacron.com/mblog/2018/02/14/what-is-plastic-extrusion/ https://www.thomasnet.com/articles/plastics-rubber/plastic-extrusions

Rosato et al., *Plastic product material and process selection handbook.* Pgs. 337 Elsevier, 2004.

Goodship, et al., *Polymer Processing with Supercritical Fluids; Rapra Review Reports Effect Of Thermal History On The Rheological Behavior Of Thermoplastic Polyurethanes,* 33:6. 2000.

Sapkale, et al. *Supercritical Fluid Extraction,* Int. J. Chem. Sci. 8(2); 729-43, 2010.

Clause 1. A sole for footwear comprising:

a. a foam comprising a polymer material expanded by supercritical fluid (SCF);

b. the foam comprising a first surface and a second surface wherein the first surface is opposite of the second surface; and c. the foam having a plurality of holes or cavities introduced into the first surface of the polymer material prior to supercritical fluid expansion, wherein a relative proportion of the plurality of holes or cavities increases with a thickness of the polymer material.

Clause 2. The sole of clause 1 wherein the plurality of holes or cavities are in a first portion of the polymer material having a greater thickness between the first surface and the second surface than a second portion of the polymer material, and the second portion is devoid of any apertures introduced into the first surface.

Clause 3. The sole of clause 2 wherein the plurality of holes or cavities partially extend between the first surface and the second surface.

Clause 4. The sole of clause 2 wherein the plurality of holes or cavities have openings with an area between 3 mm$^2$ to 7 mm$^2$.

Clause 5. The sole of clause 1 wherein the foam comprises average cell diameters ranging from between 600 to 1400 microns.

Clause 6. The sole of clause 1, wherein the polymer material comprises EVA content ranging from 40 to 60 parts per hundred (phr) among other components including POE, EPDM, SEBS, crosslinkers, initiators and plasticizers.

Clause 7. The sole of clause 1, further comprising:

at least one skeleton matrix composed of support walls within the foam.

Clause 8. The sole of clause 1, further comprising:

at least one fluid-filled bladder within the foam.

Clause 9. The sold of clause 1, wherein the plurality of holes or cavities comprise cylindrical upper portions and hexagonal prism lower portions.

Clause 10. A sole for footwear comprising:

a. a foam comprising a polymer material expanded by a supercritical fluid (SCF) to form the foam;

b. the foam comprising a first surface and a second surface wherein the first surface is opposite of the second surface;

c. the foam comprising a plurality of holes or cavities introduced into the first surface prior to the expansion by the SCF, wherein a relative proportion of the plurality of holes or cavities increases with a thickness of the polymer material; and d. the foam having density range of 0.14 to 0.16 g/cm$^3$ and resiliency range of 60-66% (ASTM D-2632).

Clause 11. The sole of clause 10 wherein the foam comprises average cell size diameters ranges from at least 600 to 1400 microns.

Clause 12. The sole of clause 10 wherein at least a portion of the foam having the least one hole or cavity is translucent.

Clause 13. The sole of clause 10 wherein the sole comprises a composite structure with the foam being an SCF-expanded polymer material and another portion of the sole comprising an opaque material.

Clause 14. The sole of clause 13 wherein the opaque material is visualized through the SCF-expanded polymer material.

Clause 15. The sole of clause 14 wherein the opaque material comprises a carbon fiber material.

Clause 16. A sole for footwear comprising:
  a. a foam comprising polymer material expanded by supercritical fluid (SCF) to form the foam;
  b. the foam comprising a first surface and a second surface wherein the first surface is opposite of the second surface;
  c. the foam having a plurality of holes or cavities introduced into the first surface of the polymer material prior to supercritical fluid expansion, wherein a relative proportion of the plurality of holes or cavities increases with a thickness of the polymer material;
  d. wherein the plurality of holes or cavities have an opening with an area between 3 mm$^2$ to 7 mm$^2$; and
  e. wherein at least a portion of the foam having the least one hole or cavity is translucent.

Clause 17. The sole of clause 16 wherein the polymer material comprises ethylene vinyl acetate (EVA).

Clause 18. The sole of clause 17 wherein the foam comprises average cell size diameters ranges from at least 600 to 1400 microns.

Clause 19. The sole of clause 16 wherein the sole comprises a composite structure with the foam being an SCF-expanded polymer material and another portion of the sole comprising an opaque material.

Clause 20. The sole of clause 16 where in the opaque material is visualized through the SCF-expanded polymer material.

Clause 21. The sole of clause 16 where in the opaque material comprises a carbon fiber material.

Clause 22. The sole of clause 16 wherein the polymer material comprises ethylene vinyl acetate (EVA).

Clause 23. The sole clause 22 where a carbon fiber material is visualized through portions of an SCF-expanded polymer material comprising EVA.

Clause 24. The sole of clause 16 wherein the polymer material comprises EVA, the foam has a plurality of holes or cavities, each hole or cavity is spaced away from another hole or cavity by at least 3 mm prior to supercritical fluid expansion, each aperture has an opening with an area between 3 mm$^2$ to 7 mm$^2$, the foam has average cell size diameters ranging from at least 600 to 1400 microns, and the polymer material has a density range of 0.14 to 0.16 g/cm$^3$ and a resiliency range of 60-66%.

We claim:
1. A sole for footwear comprising:
  a. a foam comprising a polymer material expanded by a supercritical fluid (SCF);
  b. the foam comprising a first surface and a second surface wherein the first surface is opposite of the second surface; and
  c. the foam having a plurality of holes or cavities introduced into the first surface of the polymer material prior to supercritical fluid expansion, wherein a relative proportion of the plurality of holes or cavities increases with a thickness of the polymer material.

2. The sole of claim 1 wherein the plurality of holes or cavities are in a first portion of the polymer material having a greater thickness between the first surface and the second surface than a second portion of the polymer material, and the second portion is devoid of holes or cavities introduced into the first surface.

3. The sole of claim 2 wherein the plurality of holes or cavities partially extend between the first surface and the second surface.

4. The sole of claim 2 wherein the plurality of holes or cavities have openings with an area between 3 mm$^2$ to 7 mm$^2$.

5. The sole of claim 1 wherein the foam comprises average cell diameters ranging from between 600 to 1400 microns.

6. The sole of claim 1, wherein the polymer material comprises EVA content ranging from 40 to 60 parts per hundred (phr) of the polymer material.

7. The sole of claim 1, further comprising:
  at least one skeleton matrix composed of support walls within the foam.

8. The sole of claim 1, further comprising:
  at least one fluid-filled bladder within the foam.

9. The sole of claim 1, wherein the plurality of holes or cavities comprise cylindrical upper portions and hexagonal prism lower portions.

10. A sole for footwear comprising:
  a. a foam comprising a polymer material expanded by a supercritical fluid (SCF) to form the foam;
  b. the foam comprising a first surface and a second surface wherein the first surface is opposite of the second surface;
  c. the foam comprising a plurality of holes or cavities introduced into the first surface prior to the expansion by the SCF, wherein a relative proportion of the plurality of holes or cavities increases with a thickness of the polymer material; and
  d. the foam having density range of 0.14 to 0.16 g/cm$^3$ and resiliency range of 60-66% (ASTM D-2632).

11. The sole of claim 10 wherein the foam comprises average cell size diameters ranges from at least 600 to 1400 microns.

12. The sole of claim 10 wherein at least a portion of the foam having the plurality of holes or cavities is translucent.

13. The sole of claim 10 wherein the sole comprises a composite structure with the foam being an SCF-expanded polymer material and another portion of the sole comprising an opaque material.

14. The sole of claim 13 wherein the opaque material is visualized through the SCF-expanded polymer material.

15. The sole of claim 14 wherein the opaque material comprises a carbon fiber material.

16. A sole for footwear comprising:
  a. a foam comprising polymer material expanded by supercritical fluid (SCF) to form the foam;
  b. the foam comprising a first surface and a second surface wherein the first surface is opposite of the second surface;
  c. the foam having a plurality of holes or cavities introduced into the first surface of the polymer material prior to supercritical fluid expansion, wherein a relative proportion of the plurality of holes or cavities increases with a thickness of the polymer material;
  d. wherein the plurality of holes or cavities have an opening with an area between 3 mm$^2$ to 7 mm$^2$; and
  e. wherein at least a portion of the foam having the plurality of holes or cavities is translucent.

17. The sole of claim 16 wherein the polymer material comprises ethylene vinyl acetate (EVA).

18. The sole of claim 17 wherein the foam comprises average cell size diameters ranges from at least 600 to 1400 microns.

19. The sole of claim 16 wherein the sole comprises a composite structure with the foam being an SCF-expanded polymer material and another portion of the sole comprising an opaque material.

20. The sole of claim 19 wherein the opaque material is visualized through the SCF-expanded polymer material.

21. The sole of claim 19 wherein the opaque material comprises a carbon fiber material.

22. The sole of claim 21 wherein the carbon fiber material is visualized through portions of an SCF-expanded polymer material comprising EVA.

23. The sole of claim 16 wherein the polymer material comprises EVA, the foam has a plurality of holes or cavities, each hole or cavity is spaced away from another hole or cavity by at least 3 mm prior to supercritical fluid expansion, each hole or cavity has an opening with an area between 3 $mm^2$ to 7 $mm^2$, the foam has average cell size diameters ranging from at least 600 to 1400 microns, and the polymer material has a density range of 0.14 to 0.16 $g/cm^3$ and a resiliency range of 60-66%.

\* \* \* \* \*